United States Patent [19]
Gur et al.

[11] Patent Number: 5,627,907
[45] Date of Patent: May 6, 1997

[54] COMPUTERIZED DETECTION OF MASSES AND MICROCALCIFICATIONS IN DIGITAL MAMMOGRAMS

[75] Inventors: David Gur; Bin Zheng; Yuang-Hsiang Chang, all of Pittsburgh, Pa.

[73] Assignee: University of Pittsburgh, Pittsburgh, Pa.

[21] Appl. No.: 352,169

[22] Filed: Dec. 1, 1994

[51] Int. Cl.$^6$ .................................................. G06K 9/00
[52] U.S. Cl. ............................................ 382/132; 128/754
[58] Field of Search ................................. 382/128, 130, 382/132, 170, 203; 364/413.13, 413.17, 413.19, 413.22, 413.23; 378/99; 358/111; 128/634, 754

[56] References Cited

U.S. PATENT DOCUMENTS

| | | | |
|---|---|---|---|
| 4,515,165 | 5/1985 | Carroll | 128/664 |
| 4,839,807 | 6/1989 | Doi et al. | 364/413.13 |
| 4,851,984 | 7/1989 | Doi et al. | 364/413.13 |
| 4,907,156 | 3/1990 | Doi et al. | 364/413.13 |
| 5,133,020 | 7/1992 | Giger et al. | 382/128 |
| 5,197,484 | 3/1993 | Kornberg et al. | 128/754 |
| 5,212,637 | 5/1993 | Saxena | 364/413.26 |
| 5,289,374 | 2/1994 | Doi et al. | 364/413.13 |
| 5,343,390 | 8/1994 | Doi et al. | 364/413.13 |
| 5,349,954 | 9/1994 | Hemann et al. | 128/634 |
| 5,353,804 | 10/1994 | Kornberg et al. | 128/754 |

OTHER PUBLICATIONS

Karssemeijer, et al, Spatial Resolution in Digital Mammography, Investigative Radiology, May 1993, vol. 28, pp. 413–419.

Nishikawa, et al, Effect of Case Selection on the Performance of Computer–aided Detection Schemes, Medical Physics, Feb., 1994, vol. 21, No. 2, pp. 265–269.

Nishikawa, et al, Computer–aided Detection and Diagnosis of Masses and Clustered Microcalcifications From Digital Mammograms, SPIE, vol. 1905, pp.422–432.

Wu, et al, Computerized Detection of Clustered Microcalcifications in Digital Mammograms Applications of Artificial Neural Networks, Med. Phys. May/Jun. 1992, vol. 19(3), pp. 555–560.

Zhang, et al, Computerized Detection of Clustered Microcalcifications in Digital Mammograms Using a Shift–Invariant Artificial Neural Network, Med. Phys. Apr. 1994, vol. 21, No. 4, pp. 517–524.

Stafford, et al, Application of Neural Networks to Computer Aided Pathology Detection in Mammography, SPIE 1993, vol. 1896, pp. 341–352.

Nishikawa, et al, Computer–aided Detection of Clustered Microcalcifications: An Improved Method for Grouping Detected Signals, Med. Phys. Nov./Dec. 1993, vol. 20(6), pp. 1661–1666.

Chan, et al, Digitization Requirements in Mammography: Effects on Computer–aided Detection of Microcalcifications, Med. Phy. Jul. 1994, vol. 21(7), pp. 1203–1210.

(List continued on next page.)

*Primary Examiner*—Jose L. Couso
*Attorney, Agent, or Firm*—Cushman Darby & Cushman IP Group of Pillsbury Madison & Sutro LLP

[57] ABSTRACT

Method and apparatus for detecting abnormal regions such as masses and microcalcifications in living tissue depicted in radiographs such as mammograms is presented by digitizing the radiograph to produce a digitized radiograph, and, by computer, identifying, according to predetermined criteria, any suspected abnormal regions; and for each identified suspected abnormal region, extracting multiple topographic layers of the region from the digitized radiograph; and evaluating the extracted multiple topographic layers' abnormal regions to determine whether the region is an abnormal region; and displaying the abnormal regions in a version of the radiograph. Layers are extracted by thresholding the digital radiograph at a particular threshold value for each topographic layer. The threshold value for each other layer is based on the threshold and contrast values in a previous layer.

83 Claims, 31 Drawing Sheets

OTHER PUBLICATIONS

Shen, et al, Application of Shape Analysis to Mammographic Calcifications, IEEE: Transactions on Medial Imaging Jun. 1994, vol. 13, No. 2, pp. 263–274.

Yin, et al, Comparison of Bilateral–Subtraction and Single–Image Processing Techniques in the Computerized Detection of Mammographic Masses, Investigative Radiology 1993, vol. 28, No. 6, pp. 473–481.

Yin, et al, Computerized Detection of Masses in Digital Mammograms: Investigation of Feature–Analysis Techniques, Journal of Digital Imaging 1994, vol. 7, No. 1, pp. 18–26.

Yin, et al, Computerized Detection of Masses in Digital Mammograms: Analysis of Bilateral Subtraction Images, Med. Phys. Sep./Oct. 1991, vol. 18(5), pp. 955–963.

Lai, et al, On Techniques for Detecting Circumscribed Masses in Mammograms, IEEE Transactions on Medical Imaging Dec. 1989, vol. 8, No. 4, pp. 377–386.

Brzakovic, et al, An Approach to Automated Detection of Tumors in Mammograms, IEE Transactions on Medical Imaging Sep. 1990, vol. 9, No. 3, pp. 233–241.

Lucier, et al, Wavelet Compression and Segmentation of Digital Mammograms, Journal of Digital Imaging, Feb. 1994, vol. 7, No. 1, pp. 27–38.

Carl J. Vyborny and Maryellen L. Giger, Computer Vision and Artificial Intelligence in Mammography, AJR:162, Mar. 1994, pp. 699–708.

Philip Strax, M.D., Detection of Breast Cancer, Cancer 1990, vol. 66, pp. 1336–1340.

Heang–Ping Chan, Ph.D., Kunio Doi, Ph.D., Carl J. Vyborny, M.D., Ph.D., Kwok–Leung Lam, Ph.D., and Robert A. Schmidt, M.D., Computer–Aided Detection of Microcalcifications in Mammograms Methodology and Preliminary Clinical Study, Invest Radiol 1988, vol. 23, pp. 664–670.

Maryellen L. Giger, Fang–Fang Yin, Kunio Doi, Charles E. Metz, Robert A. Schmidt, Carl J. Vyborny, Investigation of Methods for the Computerized Detection and Analysis of Mammographic Masses, SPIE 1990, vol. 1233, pp. 183–184.

W. Phillip Kegelmeyer, Jr., Computer Detection of Stellate Lesions in Mammograms, SPIE 1992, vol. 1660, pp. 446–454.

D.H. Davies and D.R. Dance, Automatic Computer Detection of Clustered Calcifications in Digital Mammograms, Phys. Med. Biol. 1990, vol. 35, No. 8, pp. 1111–1118.

D.H. Davies and D.R. Dance, The Automatic Computer Detection of Subtle Calcifications in Radiographically Dense Breasts, Phys. Med. Biol. 1992, vol. 37, No. 6, pp. 1385–1390.

Bahaa W. Fam, M.S., Sherry L. Olson, M.S., Peter F. Winter, M.D., Francis J. Scholz, M.D., Algorithm for the Detection of Fine Clustered Calcifications on Film Mammograms, Radiology 1988, vol. 169, pp. 333–337.

Shun Leung Ng and Walter F. Fischof, Automated Detection and Classification of Breast Tumors, Computers and Biomedical Research 1992, vol. 25, pp. 218–237.

Heang–Pin Chan, Kunio Doi, Simranjit Galhotra, Carl J. Vyborny, Heber MacMahon, and Peter M. Jokich, Image Feature Analysis and Computer–Aided Diagnosis in Digital Radiography. I. Automated Detection of Microcalcifications in Mammography, Med. Phys. Jul./Aug. 1987, vol. 14(4), pp. 538–547.

M.L. Giger, P. Lu, z. Huo, U. Bick, K. Doi, C.J. Vyborny, R.A. Schmidt, W. Zhang, C.E. Metz, D. Wolverton, R.M. Nishikawa, W. Zouras, CAD in Digital Mammography: Computerised Detection and Classification of Masses – Abstract.

R.M. Nishikawa, K. Doi, M.L. Giger, H. Yoshimura, Y. Wa, C.J. Vyborny, R.A. Schmidt, Use of Morphological Filters in the Computerized Detection of Microcalcifications in Digitized Mammograms, Abstract.

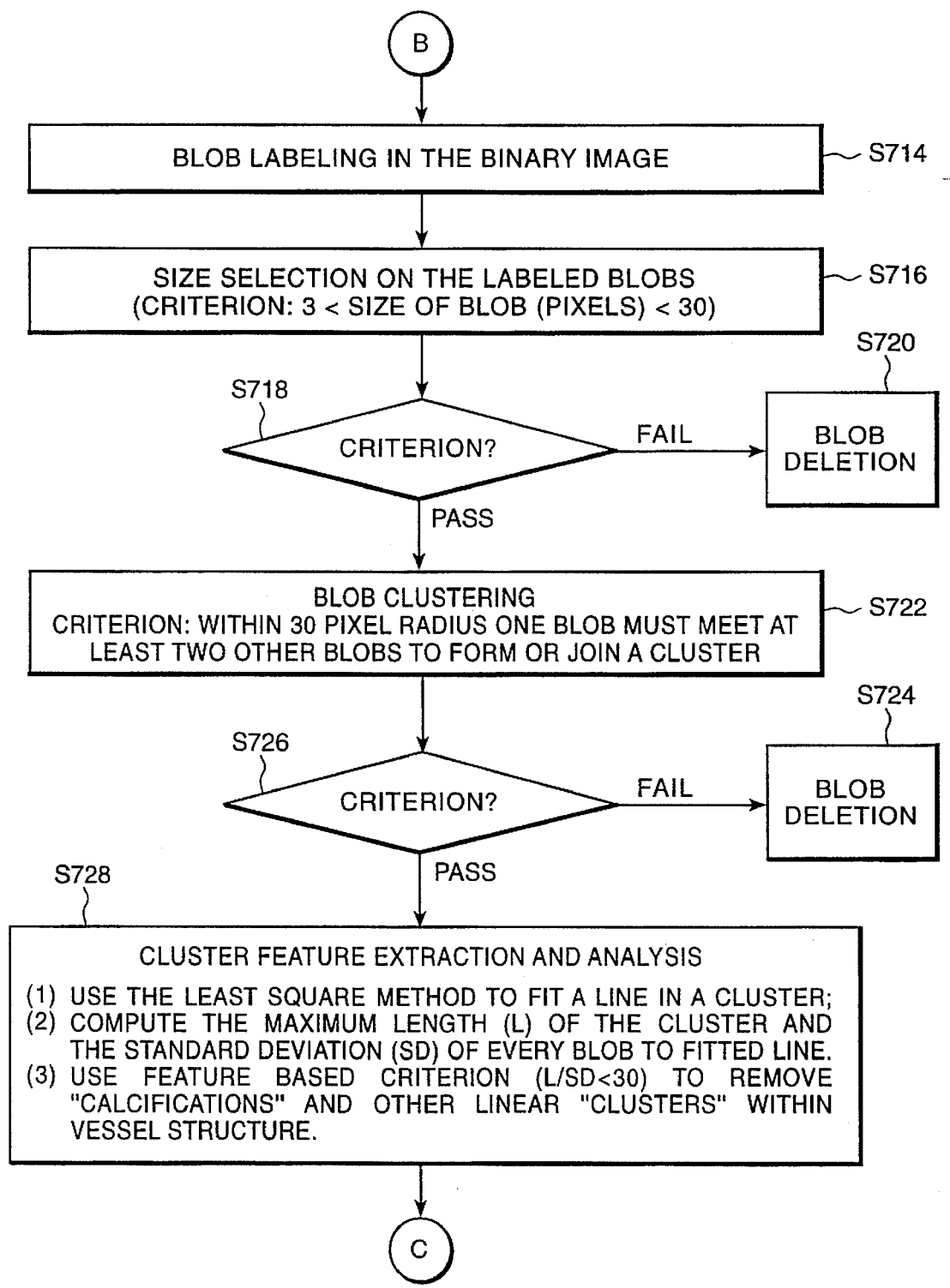

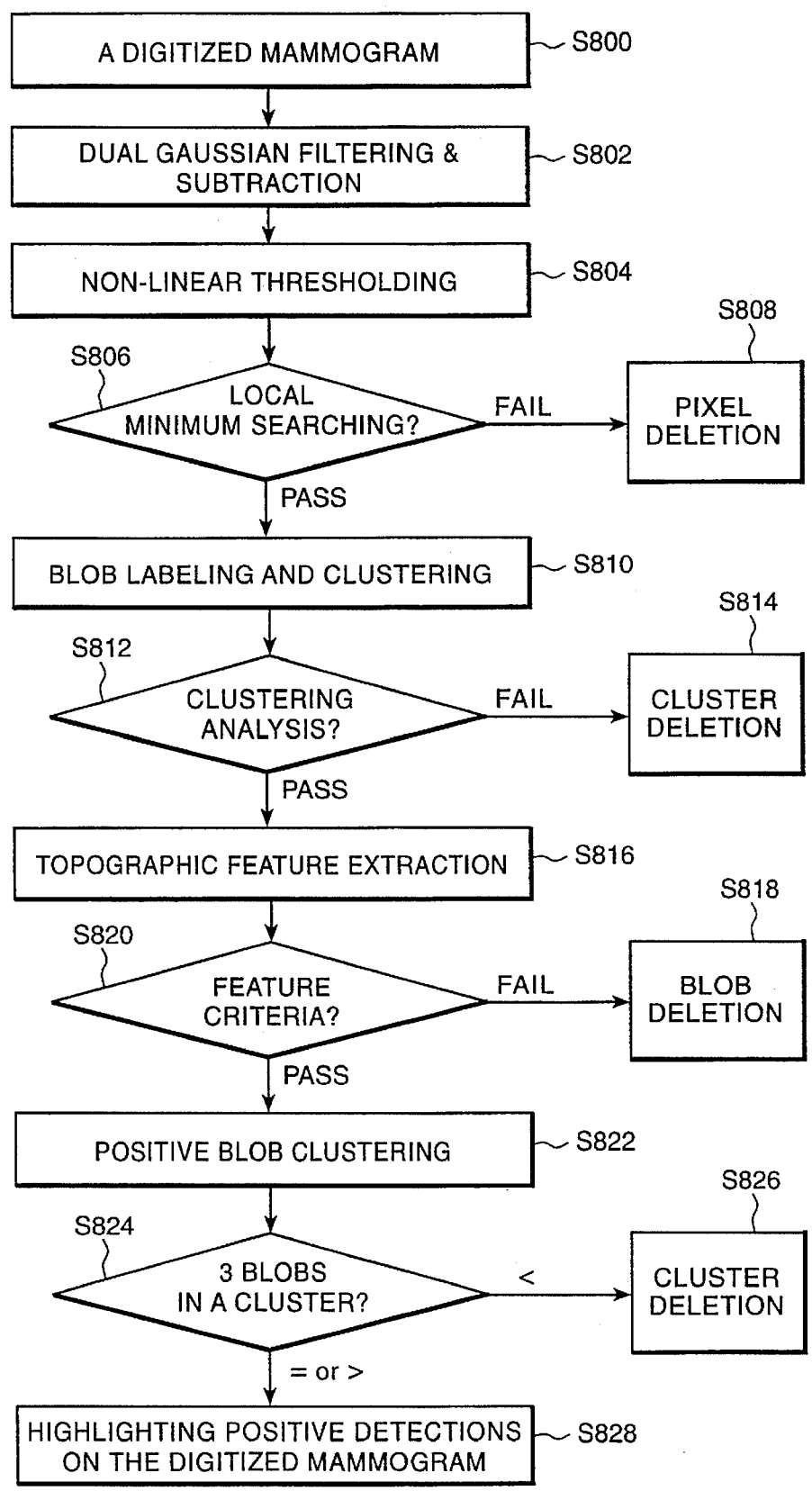

COMPUTERIZED DETECTION OF MASSES AND MICROCALCIFICATIONS IN DIGITAL MAMMOGRAMS

BACKGROUND OF THE INVENTION

1. Field of the Invention

This invention relates to detection of abnormal anatomical regions in radiographs, and, more particularly, to the detection of masses and microcalcifications in digital mammograms.

2. Background

Detection and diagnosis of abnormal anatomical regions in radiographs, such as masses and microcalcifications in womens' breast radiographs, so-called mammograms, are among the most important and difficult tasks performed by radiologists.

Microcalcifications are small-sized (25 micrometers to a few millimeters) calceous formations.

Breast cancer is a leading cause of premature death in women over forty years old. There is a great deal of evidence to show that early detection, diagnosis and treatment of breast cancer significantly improves the chances of survival, reducing breast cancer morbidity and mortality. Many methods for early detection of breast cancer have been studied and tested, among them mammography. To date X-ray mammography has proven the most effective means of providing useful information to diagnosticians regarding abnormal features in the breast and potential risks of developing breast cancer (*Detection of Breast Cancer*, Strax, P. *Cancer* 1990, Vol. 66, pp. 1336–1340). The American Cancer Society currently recommends the use of mammography for screening of asymptomatic women over the age of forty with annual examinations after the age of fifty. Mammography will eventually constitute one of the highest volume X-ray procedures routinely interpreted by radiologists.

Between thirty and fifty percent of breast carcinomas detected radiographically demonstrate microcalcifications on mammograms, and between sixty and eighty percent of breast carcinomas reveal microcalcifications upon microscopic examination. Therefore, any increase in the detection of microcalcifications by mammography may lead to further improvements in its efficiency in the detection of early breast cancer.

Currently acceptable standards of clinical care are that biopsies are performed on five to ten women for each cancer removed. With this high biopsy rate is the reasonable assurance that most mammographically detectable early carcinomas will be resected. Given the large amount of overlap between the characteristics of benign and malignant lesions on mammograms, computer-aided detection of abnormalities will have a great impact in clinical care.

At present, mammogram readings are performed visually by mammographlnic experts, that is, physicians and radiologists. Unfortunately, visual reading of mammograms has two major disadvantages. First, it is often possible to miss the breast cancer in its early stages. This is because, unlike many other cancers, there is as yet no way to detect premalignant changes in the breast. This results partly from the relative inaccessibility of breast tissue. A second disadvantage of visual reading of mammograms is that these readings are both labor intensive and time consuming. Multiple readings of a single mammogram may be necessary in order to increase the reliability of the diagnosis.

Therefore, it would be advantageous and useful to have computer-assisted or aided detection (CAD) systems to help radiologists and physicians obtain quicker and more precise results when analyzing mammograms. Such CAD systems would aid in cancer detection and improve the efficiency of large-scale screening.

Various computer assisted detection systems have been investigated to assist diagnosticians in their diagnosis of breast cancer. While some of these systems tend to be overly conservative, thereby having a higher false-positive detection ratio, studies show that computer assisted detection systems can provide a useful "second opinion" to diagnosticians, and, under the help and guidance of computer assisted detection systems, the accuracy of diagnosis of mammography has improved.

Systems that alert a diagnostician to the location of possible breast masses and microcalcifications should reduce the number of false positive and false negative diagnoses, which, in turn, should lead to earlier detection of primary breast cancers and a better prognosis for the patients.

A mass shown in a mammogram is a very important sign in the diagnosis of breast cancer, and therefore, computerized detection of masses in digitized mammograms is basic to any computer assisted detection system. However, because masses in digitized mammograms demonstrate a large variation in their image features and because they can be obscured by normal breast parenchyma in the mammogram, the computer assisted detection of masses in mammograms is very difficult.

A typical system of computerized mass detection in mammograms involves two steps (or stages), namely image segmentation and image feature analysis. Some computer assisted detection systems use single-image segmentation in their first or image segmentation stage in order to search for suspicious regions of masses by analyzing a single input image (see, for example, *An approach to automated detection of tumors in mammograms*, Brzakovic, D., et al., *IEEE Trans. Med. Imaging*, Vol. 9(3), pp. 233–241, 1990; and *On techniques for detecting circumscribed masses in mammograms*, Lai, S. M., et al. *IEEE Trans. Med. Imaging*, Vol. 8, pp. 377–386, 1989). Other computer assisted detection systems use bilateral-image subtraction in their first or segmentation stage in order to select possible mass regions based on the asymmetry in left and right image pairs (see, for example, *Investigation of methods for the computerized detection and analysis of mammographic masses*, Giger, M. L., et al., *Proc. SPIE*, 1233, pp. 183–184, 1990; and *Computerized detection of masses in digital mammograms: analysis of bilateral subtraction images*, Yin, F. F., et al., *Med. Phys.*, Vol. 18, pp. 955–983, 1991).

Having performed image segmentation in order to obtain an over-inclusive list of suspected regions in the input image, different feature analyses are then applied to the image in the suspected regions in order to distinguish positive or negative masses (see, for example, *Computerized detection of masses in digital mammograms: investigation of feature-analysis techniques*, Yin, F. F., et al., *J. of Digital Imaging*, Vol. 7, pp. 218–237, 1994).

A single-image segmentation technique uses a local thresholding algorithm to process the image, and as a result, it usually selects more suspicious areas than a bilateral-image subtraction technique. Without an effective method of feature analysis in the second stage, however, the computer assisted detection system will produce a high rate of false-positive detection. Thus, using single-image segmentation, current techniques are usually limited to detect particular types of masses, namely those which show certain well defined characteristics, such as uniform density inside an area, an approximately circular shape of varying size, and fuzzy edges (see *Automated detection and classification of breast tumors*, Ng, S. L., et al., *Computers & Biomedical Research*, Vol. 25, pp. 218–237, 1992; and *Computer detection of stellate lesions in mammograms*, Kegelmeyer, W. P., *Proc. SPIE*, 1660, pp. 446–454, 1992).

Techniques of alignment and subtraction of bilateral-images reduce the number of possible mass regions selected in the first stage of a computer assisted detection. Computer assisted detection systems using bilateral-image subtraction have been tested to detect wide varieties of mass in digitized mammograms. (Yin, et al., *Comparison of bilateral-subtraction and single-image processing techniques in the computerized detection of mammographic masses, Invest. Radiol.*, Vol. 6, pp. 473–481, 1993), show that because bilateral-image subtraction uses asymmetry in the left-right image pair, it produces better results than single-image segmentation in computerized mass detection systems. However, bilateral-image subtraction has drawbacks, including that a left-right image pair of mammograms is not always available. Further, even when a pair of mammograms is available, it is sometimes difficult to align the images in them. Alignment involves matching angles, positions, size, etc.

Microcalcifications are ideal targets for computer-aided detection schemes because of their clinical relevance, their potential subtlety, and, until reaching the actual noise level in the image, the lack of coexisting normal structures with similar appearance (Vyborny, C. J., et al. *Computer vision and artificial intelligence in mammography, AJR* 1994; 162:699–708.). Several CAD methods have been developed to detect clustered microcalcifications. The first step of these methods is to segment possible microcalcifications within the image from the normal tissue and image noise. Different methods, such as image-subtraction (Chan, H. P., et al., *Image feature analysis and computer-aided diagnosis in digital radiography: 1. Automated detection of microcalcifications in mammography, Med. Phys* 1987; 14:538–548; and Chan, H. P. et al, *Computer-aided detection of microcalcifications in mammograms: methodology and preliminary clinical study, Invest Radiol* 1988; 23:664–671), local area thresholding (Davies, D. H., et al., *Automatic computer detection of clustered calcifications in digital mammograms, Phys Med Biol,* 1990; 35:1111–1118; and Davies, D. H., et al. *The automatic computer detection of subtle calcifications in radiographically dense breasts, Phys Med Biol,* 1992; 37:1385–1390), and pixel-based feature testing (Fam, B. W., et al., *Algorithm for the detection of fine clustered calcifications on film mammograms, Radiology*, 1988; 169:333–337) are used for this purpose. If segmentation is implemented with high sensitivity (i.e., to include as many true microcalcifications as possible), most approaches routinely yield a large number of suspected microcalcifications. Therefore, a feature analysis method is followed to classify actual positive or negative detection. Many features, such as area, mean gray level, gray level deviation, contrast, shape factor, and edge strength (Shen, L., et al., *Application of shape analysis to mammographic calcifications, IEEE Trans. Imaging,* 1994; 13:263–274.11; Zhao, D., *Rule-based morphological feature extraction of microcalcifications in mammograms, Proc. SPIE,* 1993; 1905:702–715; and Woods, K.S., et al., *Comparative evaluation of pattern recognition techniques for detection of microcalcifications, Proc. SPIE,* 1993; 1905:841–852) have been used for this feature analysis, with varying degrees of success.

The difficulty in attaining simultaneously both high sensitivity and specificity in the detection of clustered microcalcifications needed to be clinically useful has attracted a significant research effort.

Some research has focused on yielding high sensitivity by increasing the quality of digitization (Chan, H. P., *Digitization requirements in mammography: Effects on computer-aided detection of microcalcifications, Med. Phys.,* 1994; 21:1203–1210). Other research has focused on reducing the rate of false-positive detection, through the use of morphological filters (Nishikawa, R. M., et al., *Use of morphological filters in the computerized detection of microcalcifications in digital mammograms*, (abstr), *Med. Phys.* 1990; 17:524), different clustering methods (Nishikawa, R. M., et al., *Computer-aided detection of clustered microcalcifications: An improved method for grouping detected signals, Med. Phys.* 1993; 20(6):1661–1666), and artificial neural networks (Stafford, R. G., et al., *Application of neural networks to computer-aided pathology detection in mammography, Proc. SPIE,* 1993; 1896:341–352; Wu, Y., et al., *Computerized detection of clustered microcalcifications in digital mammograms: Applications of artificial neural networks, Med. Phys.* 1992; 19:555–560; and Zhang, W., et al. *Computerized detection of clustered microcalcifications in digital mammograms using a shift-invariant artificial neural network, Med. Phys.,* 1994; 21:517–524). Using these techniques, the false positive detection rate can be reduced to below 1.5 clusters per image in limited image sets (Nishikawa, R. M., et al., *Computer-aided detection and diagnosis of masses and clustered microcalcifications from digital mammograms, Proc. SPIE,* 1993; 1905:422–432).

To date, research in computerized detection systems for masses and microcalcifications in digital mammograms has largely been based on thresholding methods or neural networks. For example, U.S. Pat. No. 5,331,550 uses neural networks as an aid in medical diagnosis and general anomaly detection.

Doi, U.S. Pat. No. 4,907,156, uses varying threshold levels to detect nodules for enhancement and detection of abnormal anatomic regions in a digital image. The difficulties of detection of such regions is noted by Doi, who states that "several investigators have attempted to analyze mammographic abnormalities with digital computers. However, the known-studies failed to achieve an accuracy acceptable for clinical practice." (Col. 2, lines 24–27) U.S. Pat. No. 5,289,374 discloses a method and system for analysis of false positive produced by the system of Doi '156 to reduce the false positive found by the latter system.

Giger et al, U.S. Pat. No. 5,133,020, uses a thresholding technique to locate abnormal regions in a digital image of a radiograph, and then uses classification processing to determine whether the detected abnormal region is benign or malignant. Giger's classification is based on the degree of spiculation of the identified abnormal regions.

U.S. Pat. No. 5,319,549 uses texture analysis on a number of small regions of interest in order to determine a classification of normal or abnormal of a patient's lungs.

Doi, U.S. Pat. No. 5,343,390, discloses a method and system for automated selected of regions of interest and detection of septal lines in digital chest radiographs. Doi uses a large number of adjacent regions of interest selected corresponding to an area on a digital image of a patients lungs. The regions of interest each contain a number of square or rectangular pixel arrays and are selected to sequentially fill in the total selected area of the lungs to be analyzed. The regions of interest are analyzed to determine those exhibiting sharp edges, that is, high edge gradients. A percentage of the sharp edge regions of interest are removed from the original sample based on the edge gradient analysis, the majority of which correspond to rib edge containing regions of interest. After removal of the sharp edge regions of interest, texture measurements are taken on the remaining sample in order to compare such data with predetermined for normal and abnormal lungs.

The above methods and systems have various disadvantages and deficiencies, including that they use absolute measurements only, they are not as robust as image quality variations, and either their sensitivity is too low or they tend to result in too many false positives.

Although a computer assisted detection system using bilateral-image subtraction can improve the performance of detection by reducing the rate of false-positive detections, its sensitivity and versatility is also decreased. These inventors' studies have found that improved methods of single-image segmentation can achieve a higher detection sensitivity and will be more versatile in future clinical applications. Unfortunately, because of the lack of effective methods of feature analysis, many computer assisted detection systems using single-image segmentation have high rates of false-positive detection if they select more suspicious mass regions.

It is therefore useful and necessary to balance the high detection sensitivity of computer assisted detection systems with true-positive and low rates of false-positive detection.

SUMMARY OF THE INVENTION

This invention is directed in part to a method and apparatus for detecting abnormal regions in living tissue depicted in a radiograph. The radiograph may be a mammogram and the abnormal regions may contain masses or microcalcifications in a human breast, as depicted in the mammograms.

This invention finds suspected regions and then uses several top view layers of each suspected region to determine whether or not that region looks like an abnormal region. A rule-based selection of changes in features is used to select and evaluate suspicious regions.

In this invention, a digitized radiograph is subjected to two stages of processing. In the first or identifying stage, a set of suspicious regions are found in the digitized radiograph. This set of suspicious regions contains some regions that may not contain actual abnormal regions. That is, suspected abnormal regions are identified in the digital radiograph. The second or pruning stage removes false-positive suspected regions found in that first stage. That is, the pruning stage removes suspected regions that are not actual abnormal regions. In the pruning stage, for each identified suspected abnormal region that was found in the identifying stage, multiple topographic layers of that region are extracted from the digitized radiograph and evaluated to determine whether the suspected region is an actual abnormal region.

Various features of the digitized radiograph are determined for each suspected region. These features are then analyzed and compared to predetermined criteria to determine whether a suspected region is an actual abnormal region. Preferably, at least two adjacent, top-view topographic layers are used.

The features determined and compared include the size, contrast, shape factor and digital value fluctuation of each suspected abnormal region. The feature analysis includes comparing ratios between the determined features of different layers and evaluating changes between features of different layers.

This invention may include a generated rule-based criteria database, for use in evaluating suspected regions.

The first or identifying stage may use single-image, bilateral-image subtraction, or blob clustering to find the list of suspected regions.

The apparatus of this invention detects abnormal regions in living tissue depicted in a radiograph. If the image is not in digital form, a digitizer digitizes the radiograph to produce a digitized radiograph. Means are provided for identifying, according to predetermined criteria, any suspected abnormal regions in the digitized radiograph. Extracting means extracts multiple topographic layers of each identified suspected abnormal region from the digitized radiograph. Evaluating means evaluates the extracted layers to determine whether the region is an abnormal region.

This invention is directed in part to a method and apparatus for extracting topographic layers from a digital radiograph. Topographic layers are extracted by thresholding the digital radiograph at a particular threshold value for each topographic layer. This threshold value for each other layer is based on the threshold value and contrast value in a previous layer. The threshold value $T_j$ for layer j is a function of threshold value $T_{j-1}$ and contrast value $C_{j-1}$ in layer j-1 as given by $T_j = T_{j-1} + 256 \times C_{j-1}$.

Topographic feature analysis can be easily implemented in different kinds of computer assisted detection systems and can be applied to find different kinds of abnormalities, e.g., masses and microcalcifications in a human breast.

BRIEF DESCRIPTION OF THE DRAWINGS

FIG. 8 is a flow diagram of the computerized detection scheme for clustered microcalcifications;

DESCRIPTION OF THE PREFERRED EMBODIMENTS

Figure 1:
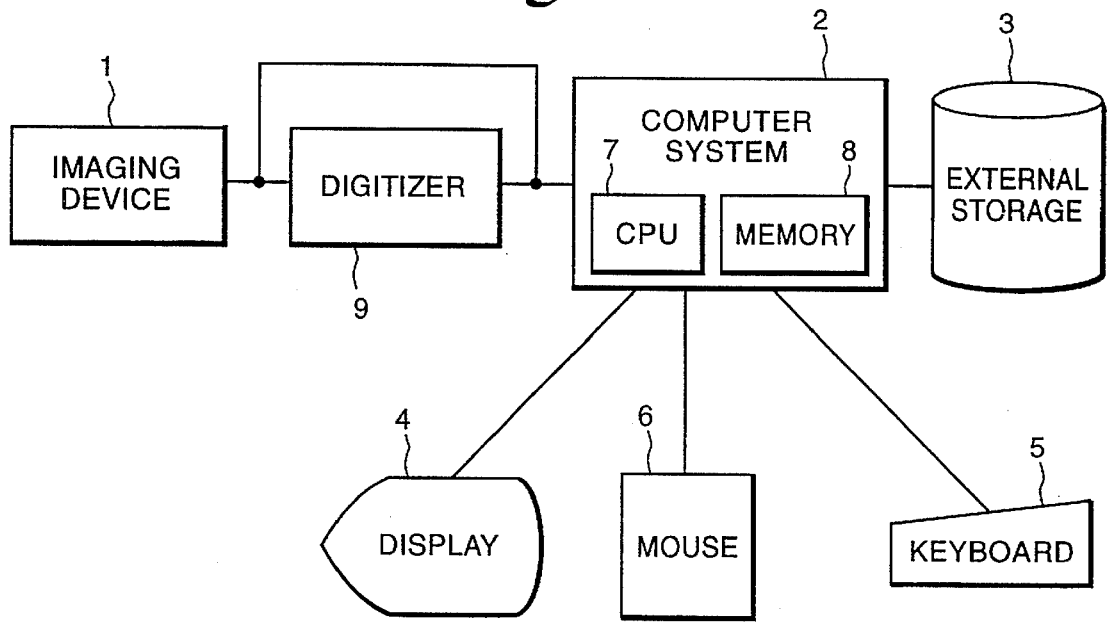
FIG. 1 is a block diagram illustrating an embodiment of the system of this invention.

With reference to FIG. 1, an imaging device 1 such as an X-ray mammogram device is connected directly or indirectly to a computer system 2 in order to provide the computer system 2 with digitized mammograms. The computer system 2 has a central processor (CPU) 7 and a random access memory (RAM) 8. Associated with computer system 2 is a secondary storage 3, such as optical disks, hard disks, etc., for storing programs and images obtained by imaging device 1. Connected to computer system 2 are various input and control devices, such as keyboard 5 and mouse 6. Display 4 is connected to computer system 2 to display commands, images, and other information produced by the computer system. Various enhanced co-processor chips may be installed into computer system 2 to work in conjunction with the CPU 7 in order to increase the processing power of the computer. An image digitizer 9 is connected either directly or indirectly to computer system 2 in order to provide it with digital images from the images produced by the imaging device 1.

In operation, the imaging device 1 obtains images of the appropriate anatomical area or part of a human body. In some embodiments, the imaging device 1 is a radiographic or X-ray imaging device capable of producing X-ray mammograms. The imaging device 1 is capable of producing top-view X-ray mammograms with a resolution of at least 500×500 pixels. Imaging device 1 can generate a direct digital image or provide means to digitize films. Imaging device 1 may have a separate computer system (not shown) to control its operations for producing radiographs.

Computer system 2 is connected directly or indirectly to the imaging device 1 in order to obtain, store, and analyze the images produced by the imaging device 1. If imaging device 1 does not produce digital images, then digitizer 9, capable of digitizing an image produced by imaging device 1 can be used to provide digital images to the computer system 2.

In view of the high resolution required in order to evaluate digital radiographs, typically, storage device 3 is a high capacity storage device, and display 4 is able to display digital radiographic images at a resolution sufficient to enable and assist in their analysis and diagnosis.

In the presently preferred embodiments (at the time this application is being written) a SUN Sparcstation is used as computer system 2. The storage device is either an eight millimeter magnetic tape (for example, 3M 8 mm data tape) or an optical disk (for example, LaserMemory DEC-702 rewritable optical disk, available from Pioneer Communications of America, Upper Saddle River, N.J.). The display is a 21 inch Sun color monitor with a screen resolution of 1100×850 pixels. While the computer system 2 may be directly connected to the imaging device 1, it is also possible for the imaging device 1 to be separated from the computer system 2 and for digital images to be transferred between the two systems by means of some intermediate storage device such as a portable disk (not shown).

A LUMISYS Model 100 laser film digitizer is used as digitizer 9. The scanning pixel size of LUMISYS digitizer is selectable in the range 50×50 µm² to 400×400 µm², and the gray level of the digitization is twelve (12) bits. For the embodiments described herein, the size of the laser focal spot and scanning pixel were set to 100×100 µm².

The software of the present invention implemented on computer system 1 can be written in any suitable high level computer language. In the present embodiment, the software is written in a combination of the programming languages C and C++.

General Embodiment

Figure 2:
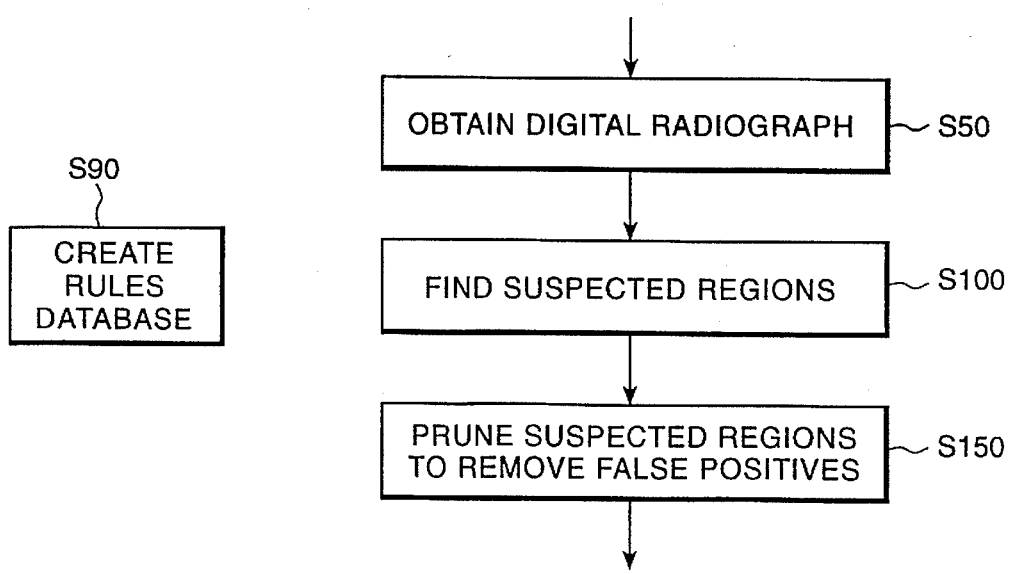
FIGS. 2–7 are flow charts showing the operation of various preferred embodiments of this invention.
Figure 3:
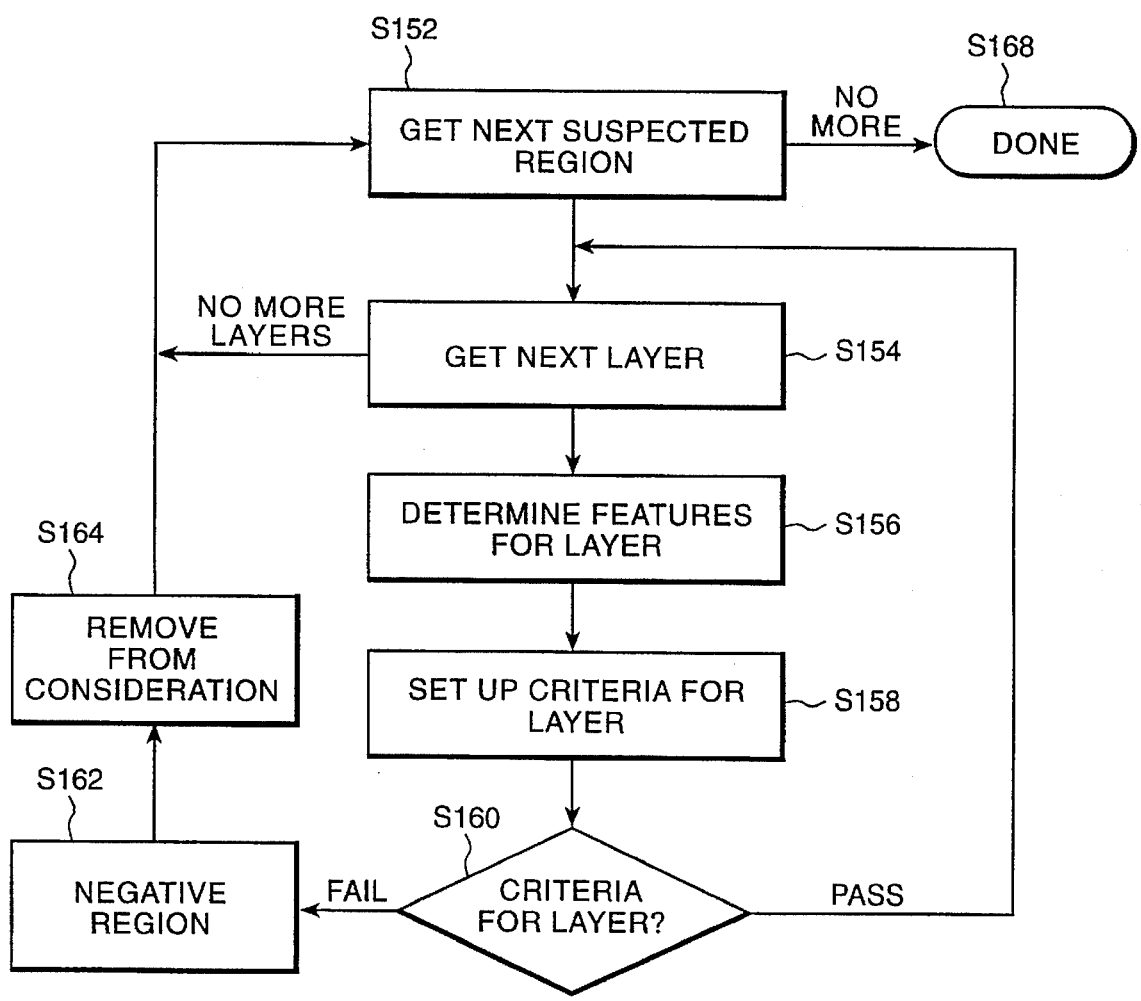

The invention is described in its most generic embodiment with reference to FIGS. 2 and 3.

Referring to FIG. 2, first a radiograph of a body part or region is obtained (step S50). Next, suspect regions are found and the image is segmented accordingly (step S100). Because the criteria for finding suspect regions in this stage are not generally strict, these found suspect regions may contain false-positive regions, that is, regions which do not contain a mass or any microcalcifications. Next, the suspect regions are-pruned using multilayered topographic feature analysis to remove false-positive regions (step S150). The pruning stage (step S150) uses a rule-based criteria database in order to determine whether or not a particular suspected region is a true positive region. The rule-based criteria database is calculated separately (step S90) and prior to using the system for a particular diagnosis. The database is stored in the computer system 2, although it can be stored elsewhere (for example, in a ROM) or built into the program. Rules can be added to the database, and rules in the database can be modified as more accurate tests are determined.

The process of finding the suspect regions, the segmenting stage, (step S100), has been described above for one general embodiment. In different embodiments, various techniques of finding the first list of suspected regions can be used. For example, in one preferred embodiment, only one of the input radiographs is used to find the suspected regions. In another preferred embodiment, two input radiographs are used. That is, one preferred embodiment uses single image segmentation techniques, whereas another preferred embodiment uses bilateral-image subtraction techniques.

Similarly, the pruning stage (step S150) has been described in general. In different embodiments, different layers and different inter-layer and intra-layer criteria are applied to determine whether or not a suspected region (found in the segmentation stage) is a true positive.

Referring to FIGS. 2 and 3, the suspect regions found in the segmentation stage are pruned to remove false-positive regions (step S150) as follows:

The segmentation stage produces a list of suspected regions which are now processed one at a time. The next suspected region, now the current suspected region, is taken for consideration and evaluation from the list of suspected regions (step S152). If there are no more suspected regions in the list (either there were none to begin with or all of them have been processed), processing (pruning) is complete (step S152), otherwise, consideration of the current suspected region continues. The next layer of the current suspected region (starting with the first layer) is examined (step S154). If there are no more layers to be examined for the current suspected region, then the current region has not been determined to be a false positive region, and it is left in the list of suspected regions and another suspected region is examined (step S152). On the other hand, if there is another layer to be examined in the current suspected region, then a feature analysis for that layer is performed (step S156). Criteria for limitations of the features and their correlations are set up (step 158), and the criteria for that layer are checked (step 160). If the features for the current suspected region in the current layer fail, then a negative region has been found (step S162). This negative region can be removed from consideration (that is, the current suspected region is removed from the list of suspected regions) (step S164), and another suspected region is examined (step S152). Otherwise, if the features for the current suspected region are determined to pass the criteria for the current layer, then the next layer of the current suspected region is considered (step S154).

Figure 4A:
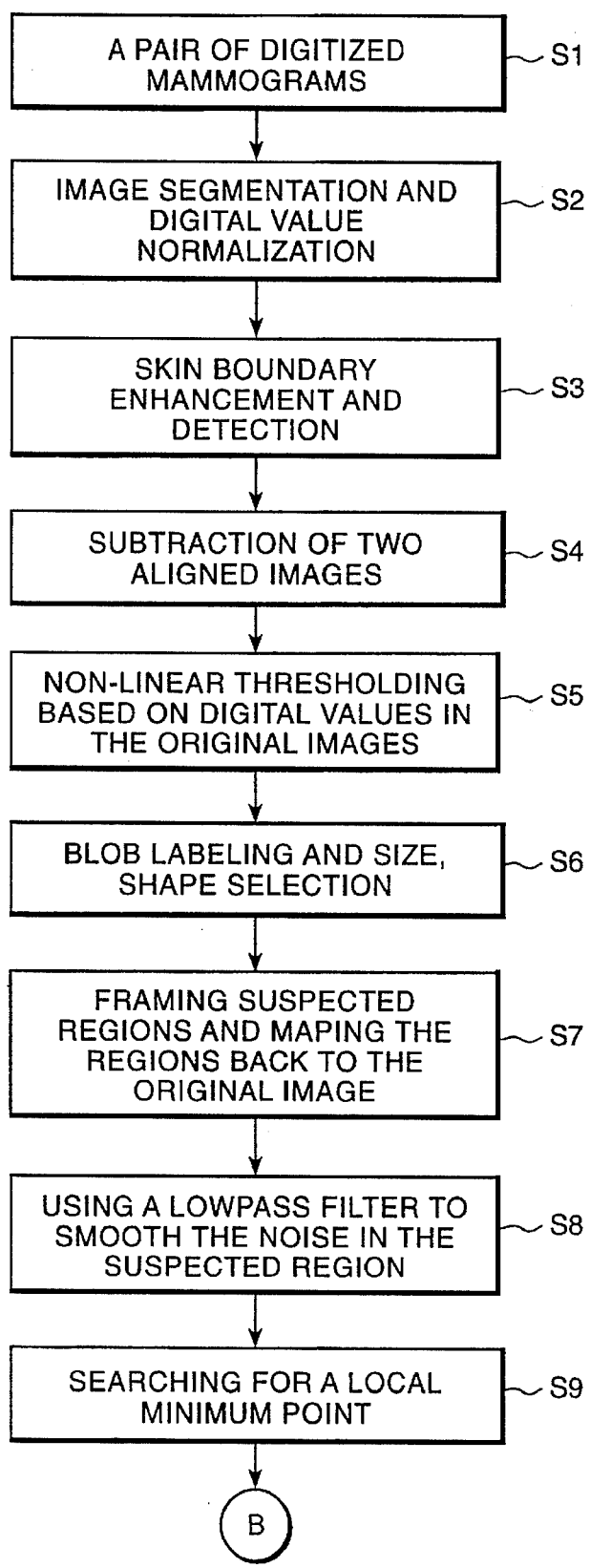
Figure 4B:
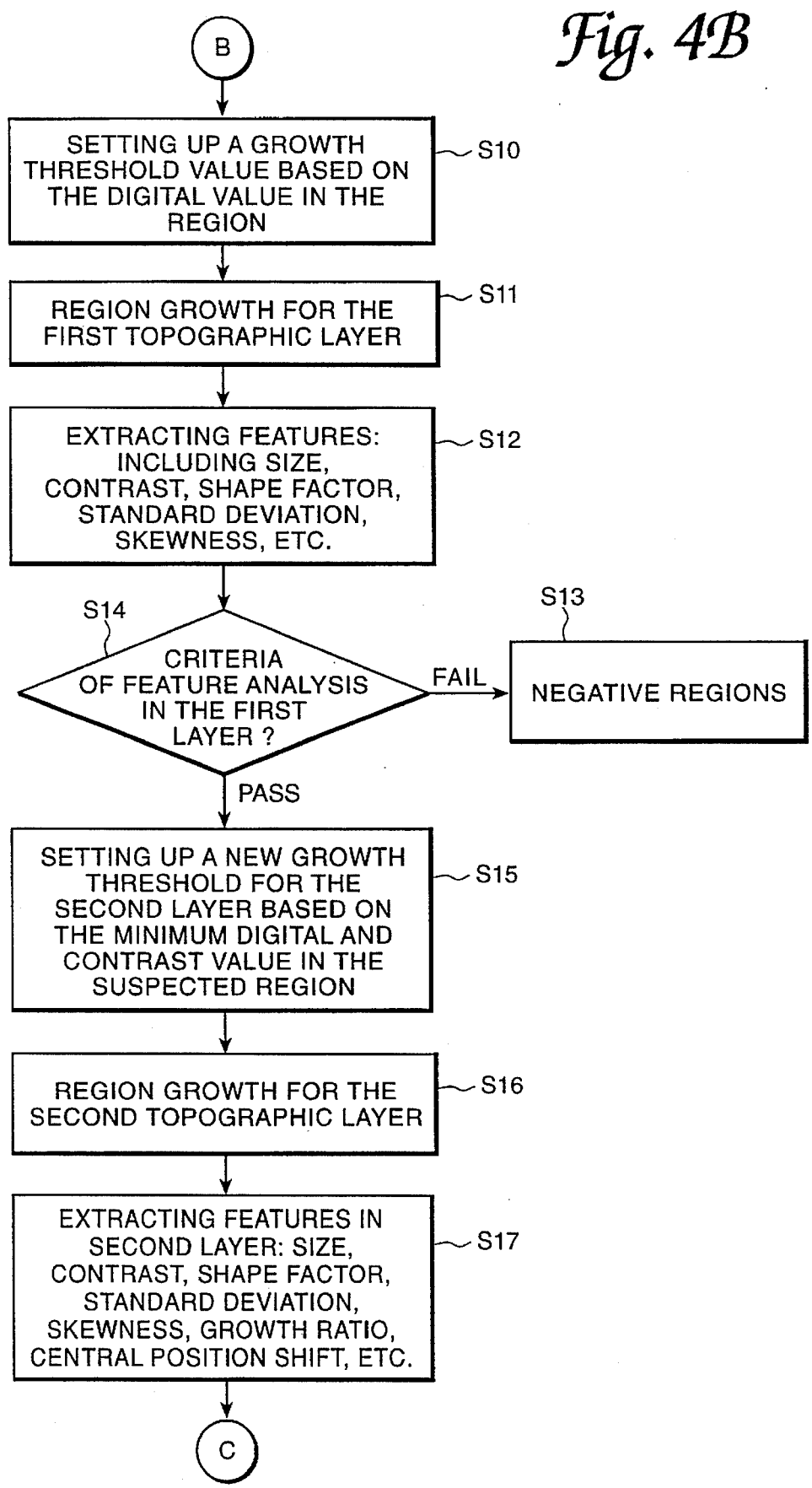
Figure 4C:
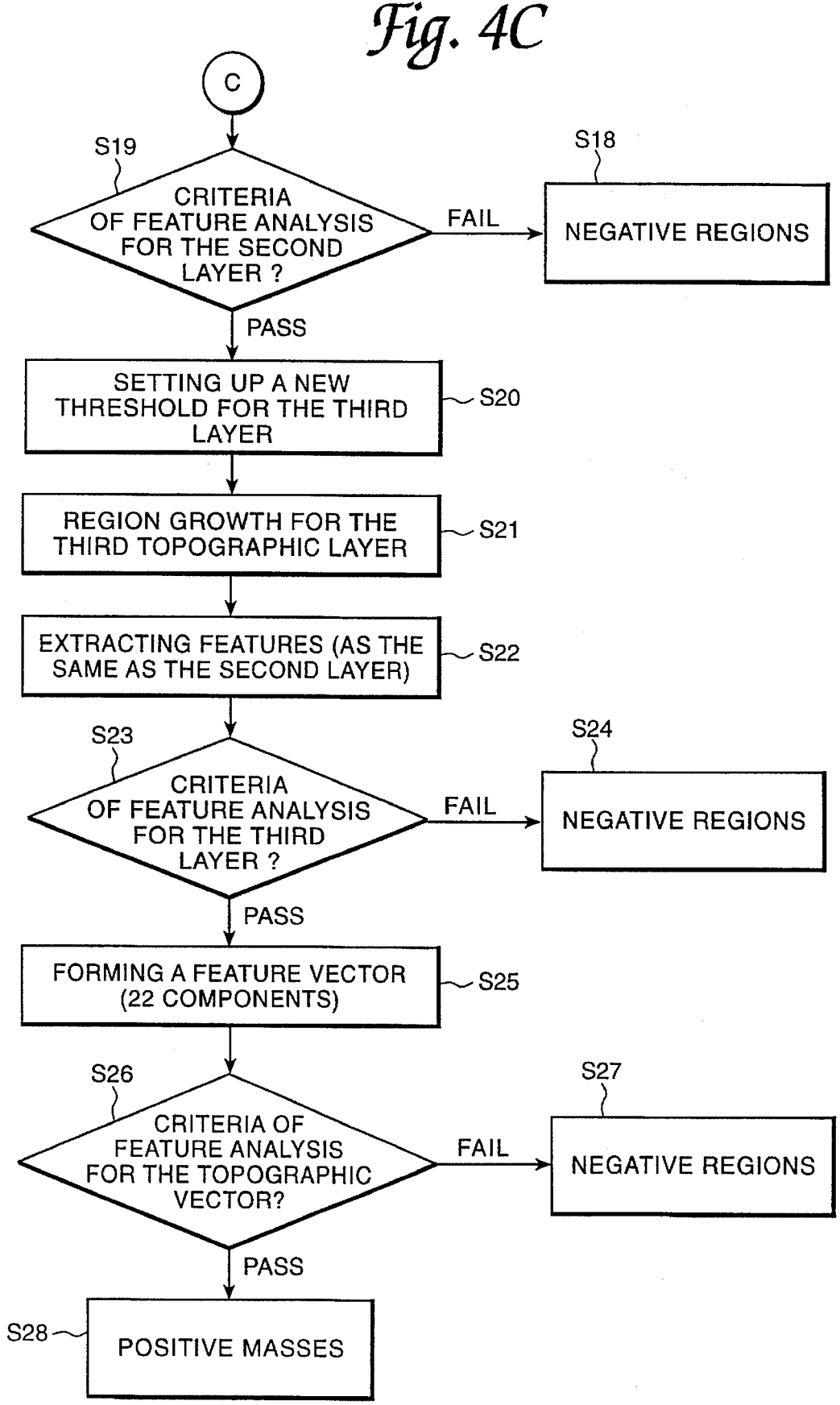

With reference now to the flow diagram in FIG. 4, the operation of a preferred embodiment of the present invention will be explained. In this embodiment bilateral segmentation is performed in the first or segmentation stage, and three (3) layers are used in the second or pruning stage. In the following, it is assumed that the rules database has already been set up and is available for use.

The segmenting stage, that is, the process of finding suspected regions (corresponding to step S100 in FIG. 2) is described first. At the end of this process, a list of suspected regions in an input digital mammogram is produced. This list potentially contains many false-positive regions which will then be removed or pruned from the list in the subsequent stage.

A pair of digital mammograms produced by imaging device 1 and/or digitizer 9 is obtained and input to the system (in step S1). Next the input digital mammograms are segmented and their digital values are normalized (step S2). Then, skin boundary enhancement and detection is performed on the input digital images (step S3), following which (in step S4), the two resulting images are aligned and subtracted. Next (in step S5) non-linear thresholding is performed on the subtracted images (the output of step S4), based on digital values in the original images. Then (in step S6) blob labelling and size selection are performed, following which the suspected regions are framed and mapped back into the original images (step S7). Using low-pass filters, noise in each suspected region is then smoothed (step S8).

In the pruning stage of the process (corresponding to step S150 in FIG. 2), for each suspected region, a point is found with a minimal digital value inside that suspected region (step S9). Then a growth threshold value is set up for that suspected region (the current suspected region), based on the digital value in that region (step S10).

The region growth for the first topographic layer in the current suspected region is then determined (step S11). For the current suspected region, a feature analysis in the first topographic layer is then performed (step S12). This feature analysis includes computing the size, shape factor, contrast, skewness, standard deviation, longest axis and digital value fluctuation for the current suspected region. These features are determined as follows (using the data stored with the images):

The size is measured on a topographic growth layer by counting the number of pixels inside a suspected mass region, and then scaling the measured size (by multiplying by a size coefficient).

The contrast is calculated based on the formula $$C = \frac{I_2 - I_1}{I_2 + I_1}$$

where $I_1$ is the average digital value inside the mass, and $I_2$ is the average digital value of the background.

The intensity fluctuation of the mass is the standard deviation of digital value variation inside the mass. A well-defined mass, such as a circumscribed mass, is usually a medium size mass with higher contrast and lower intensity fluctuation. On the contrary, a subtle or ill-defined mass often demonstrates, the characteristics of small size, lower contrast, and higher intensity fluctuation.

The shape factor of a region is a measure of the circularity of the region. The standard deviation of a region is computed from the second moment of digital value distribution inside the region. The skewness of a region is computed from the third moment of the digital value distribution inside the region.

Once the various features have been determined for the current suspected region (in step S12), these features are analyzed and compared to known features (described below) in order to determine whether or not the suspected region is a true-positive region (step S14).

Criteria for limitations on the determined features and their correlations are set up (not shown), typically in advance, using a set of images (a database) with known distribution of features for true and false positives. These criteria are then examined for the current suspected region for the first layer (step S14). If, based on this examination, the criterion for the first layer of the current suspected region fail, then the current suspected region is considered negative as a mass region, that is, a false positive region has been found (S13). At this point, the current suspected region can be removed from consideration as a suspected region (that is, the current suspected region can be removed from the list of suspected regions). On the other hand, if the criteria for the first layer pass (in step S14), then the current suspect region remains suspected and is examined in the next (second) layer.

For the next (second.) layer of the current suspected region, a new growth threshold is set up for the layer based on the minimum digital value and contrast value in the region (step S15). Then, region growth for the second layer in the current suspected region is considered (step S16).

Growth feature analysis is performed on the second layer (step S17) and between the first and second layers. This feature analysis includes computing the size, shape factor, contrast, skewness, standard deviation, longest axis and digital value fluctuation for the current suspected region, and their changes. These features are computed as described above. The changes in the features, with respect to the first layer, are determined for various features, including the size and central position.

New criteria for the limitation on the changes of the above features between layers and their correlations are set up in advance (step not shown), as follows (for detection of masses—different criteria are set up for microcalcification detection):

1. $10 < SIZE < 1250$ (mm$^2$);
2. $0.05 < CONTRAST\ VALUE < 0.5$;
3. SHAPE FACTOR<6 or, if SIZE<45 mm$^2$, SHAPE FACTOR<4;
4. LONGEST AXIS<SIZE×0.2+6 (mm);
5. STANDARD DEVIATION ON DIGITAL VALUES is less than 200;
6. SKEWNESS>−3 if the region is far from the skin boundary (distance>140/sub, where sub is the sub-sample ratio, typically sub=4);
7. The SIZE GROWTH RATIO (in the second and third layers) is less than 6; and
8. The CENTRAL POSITION SHIFT (in the second and third layers) is less than 20 pixels.

If the criteria, for the current suspected region in the second layer fail (step S19), then a negative mass region, that is, a false positive, is found (step S18), and the region can be removed from consideration as a suspected region.

That is, if the criteria for the current suspected region fail in the second layer then the current suspected region is considered to not contain a mass and it can be removed from the list of suspected regions. Otherwise, if the criteria for the second layer of the current suspected region pass (step S19), then a positive mass region, that is, a true positive, is found and processing continues in the next (third) layer. That is, if the criteria for the second layer of the current suspected region pass (step S19), then the next (third) layer of the current suspected region is considered.

A new threshold is set up for the third topographic layer (step S20) and region growth for the third topographic layer is determined (step S21). Next, for each remaining suspected region, features (as in the second topographic layer) are extracted from the third topographic layer (step S22). These extracted features are subjected to an analysis relative to the criteria for the third layer (step S23). If, based on the criteria for the third topographic layer, it is determined that a region is a negative region (step S24), then that region can be removed from further consideration. Otherwise, if a region passes the criteria for the third topographic layer (step S23), then a twenty-two component topographic feature vector is created for that region (step 25). The topographic feature vector is compared to criteria (step S26) to determine whether the region is a negative region (step S27) or a positive mass region (step S28). If the region is determined to be a negative region, then it can be removed from further consideration.

After the first stage (that is, after step S8), a list of suspected regions has been created. For each region in this list the following information is stored (in computer system 2): the (x, y) coordinate of the minimum point (lowest gray level point.) in each suspected area (blob) and the shape factor of a rectangle frame which covers the blob. This information is used in subsequent processing of the region in order to determine the various features at each layer. The coordinate point is used to indicate the location of the start point for the region growth in the next stage. The shape factor is used to determine whether the blob is accepted as a suspected mass before it is analyzed by the feature analysis in the next stage (long elliptical blobs are considered as negative regions and can be removed from consideration and further processing).

The pruning stage of the process uses topographic multi-layer feature analysis of each suspected region in order to determine with greater accuracy whether or not the region is a true-positive region.

The first stage of filtering and segmentation locates the possible mass regions. This stage usually generates many potential mass regions, from several regions to greater than thirty regions, according to the digital value fluctuation in different images. Typically, there are eight to twenty suspicious regions in one image. In order to detect positive masses and delete as many as possible negative candidates, topographic principles are used in the next pass.

In the second stage of the detection system, before the computer assisted detection system can extract any features, each suspicious region is smoothed using a Gaussian low-pass filter with a small kernel size. In a preferred embodiment, this kernel size is seven (7) pixels, however, in other embodiments kernel sizes of five (5) and nine (9) pixels are used. Next, after searching for the local minimal point in the region, the system selects a threshold value and uses a region growth algorithm to find the region's growth area. The threshold value is automatically adjusted according to the digital value of local minimal point in the region. In general, in order to compensate for the H-D effect of the film exposure and processing, the larger the digital value, the larger the threshold value. The first threshold value helps the computer assisted detection system to measure the image feature in the first layer of the topography. Many features in this first layer, such as, for example, size, contrast, shape factor, long axis length, standard deviation and skewness of digital value distribution, are extracted. Then, second and third layers are generated in order to build a topographic multi-layer feature vector. The threshold value for next layer ($T_j$) is the function of threshold value and contrast value in above layer ($T_{j-1}$ and $C_{j-1}$), namely $T_j=T_{j-1}+256 \times C_{j-1}$.

From above equation, the threshold value in next layer will jump a larger step if the digital value of local minimum point and the contrast value calculated in above layer are higher. Thus, the threshold value of the second layer, $T_2$ is given by $T_2=T_1+256 \times C_1$, and that of the third layer, $T_3$, is given by $T_3=T_2+256 \times C_2$.

The first threshold, $T_1$, of the first layer is determined as follows (to compensate for the H-D effect of film processing):

$$T_1=I_{min}+I_{min}/10, (I_{min} \leq 500);$$

$$T_1=I_{min} \times 1.0246+37.68, (500<I_{min}<2000); \text{ and}$$

$$T_1=I_{min}+I_{min}/23, (I_{min} \geq 2000),$$

where $I_{min}$ is the digital value of the minimum point in the suspected region.

Besides the image features mentioned above with regard to the first layer, some unique features related to the topography, such as the size growth ratio and central position shift of the center of the suspicious region between two adjacent layers are also extracted. Finally, a multi-layer feature vector which contains twenty-two (22) components is created.

The twenty-two components in each feature vector of the preferred embodiment are as follows:

1. The SIZE in the first layer;
2. the SIZE in the second layer;
3. the SIZE in the third layer;
4. the CONTRAST in the first layer;
5. the CONTRAST in the second layer;
6. the CONTRAST in the third layer;
7. the SHAPE FACTOR in the first layer;
8. the SHAPE FACTOR in the second layer;
9. the SHAPE FACTOR in the third layer;
10. the LONGEST AXIS in the first layer;
11. the LONGEST AXIS in the second layer;
12. the LONGEST AXIS in the third layer;
13. the STANDARD DEVIATION of digital values in the first layer;
14. the STANDARD DEVIATION of digital values in the second layer;
15. the STANDARD DEVIATION of digital values in the third layer;
16. the SKEWNESS of digital values in the first layer;
17. the SKEWNESS of digital values in the second layer;
18. the SKEWNESS of digital values in the third layer;
19. the SIZE GROWTH RATIO between the first and second layers;
20. the SIZE GROWTH RATIO between the second and third layers;
21. the CENTRAL POSITION SHIFT between the first and second layers; and 22. the CENTRAL POSITION SHIFT between the second and third layers.

The size in each layer is determined by a count of the number of pixels inside the growth region in the layer. The contrast in each layer (calculated by $C=(I_2-I_1)/(I_2+I_1)$, which is based on the average digital value inside and outside the growth region in this layer. The shape factor of a region in each layer is a measure of the circularity of the growth region in that layer. The standard deviation of a region in a layer is computed from the second moment of digital value distribution inside the region. The skewness in a layer is computed from the third moment of the digital value distribution inside the region. The size growth ratio between two layers $L_1$ and $L_2$ is calculated by dividing the size of layer $L_2$ by the size of layer $L_1$. The central position shift between two layers is the difference between the region's center in the two layers.

Once all of the suspected regions have been processed, as described above, and some have been eliminated, the suspected regions that remain can be displayed by the computer 2 on display 4 for further analysis and evaluation. Alternately, the reduced list of suspected regions can then be subjected to more intensive processing, using the techniques described herein or some other techniques, to prune the list even further.

It is apparent from the above that a suspected region can be determined to be a false positive region by examining the features of only one layer (steps S14, S19, and S23) or by comparing the various features of that region within different layers (step S26). In other words, pruning can be performed both on inter and intra-layer determinations using both the inter and intra layer rule base.

In the embodiment described above, three layers were used in the multilayered topographic analysis of the pruning stage. In other preferred embodiments, two, four or more layers are used. The greater the number of layers used, the greater the chance of finding a false positive.

In the embodiment described above twenty two components were used in the topographic layer feature vector. In other preferred embodiments, more or less components can be used.

The previous embodiment used bilateral-image segmentation in its segmentation stage. A typical bilateral-image segmentation algorithm in a mammographic computer assisted detection system operates as follows:

(1) load left and right image pairs;

(2) find the skin line of both breasts;

(3) align the two breasts according to their skin line by shifting and rotating a mammogram;

(4) divide each mammogram equally into subregions;

(5) normalize the digital values in corresponding subregions in the left and right images;

(6) subtract two images;

(7) threshold the result of the subtracted image to form a binary image;

(8) label all the blobs in the binary image;

(9) remove small isolated or long elliptic blobs in the binary image; and

(10) select remaining blobs as possible mass regions.

Without the reference to another image, important information of asymmetry on left-right image pair is lost. Thus, in performing single-image segmentation, other information in the image is required in order to find possible mass regions. Because the tissue structure of breast may be very complicated, in a mammogram, the digital values form a complex contour structure. A mass may be positioned between different contour lines. In order to search the possible mass regions, the mammogram must be flattened so that the possible mass regions can be protruded on a relative smooth and flat background.

Another preferred embodiment uses single image segmentation instead of bilateral-image segmentation in the segmentation stage (corresponding to step S100 in FIG. 2). That is, in this preferred embodiment, only one image is used as input to the computer assisted detection system (instead of a pair of images). In this preferred embodiment, three (3) layers are used in the topographic feature analysis in the pruning stage (corresponding to step S150 in FIG. 2).

To flatten the background and protrude possible mass regions, two Gaussian low-pass filters are selected to process the original image. Thus, after a single image has been loaded into the computer program, it is processed by two Gaussian low-pass filters respectively, and so two low-passed images are created. One Gaussian filter has a small kernel size of, for example, seven (7) pixels (in order to suppress the isolated random noise in the image), and another one has a large kernel size of, for example, fifty one (51) pixels (in order to flatten possible mass areas). After subtraction of the two filtered images, a binary image is created using thresholding. A global threshold value is used in most of the image, but the threshold value is raised along the skin boundary to compensate the blurring effect of the Gaussian low-pass filter. Then, a labeling algorithm is used to label all of the blobs in the binary image. Every labeled blob is analyzed and accepted as a suspicious region if its size and shape factor satisfy a rule-based criterion. The size is found by counting the pixel number of a blob and the shape factor is defined by computing the ratio between long axis and short axis of a blob. If the size is too small or too large, the blood vessel recorded in the mammogram, and it will be also be erased from the image. Finally, after framing all suspicious regions, the computer assisted detection system counts the total number of possible mass regions selected in the digitized mammogram.

Figure 5:
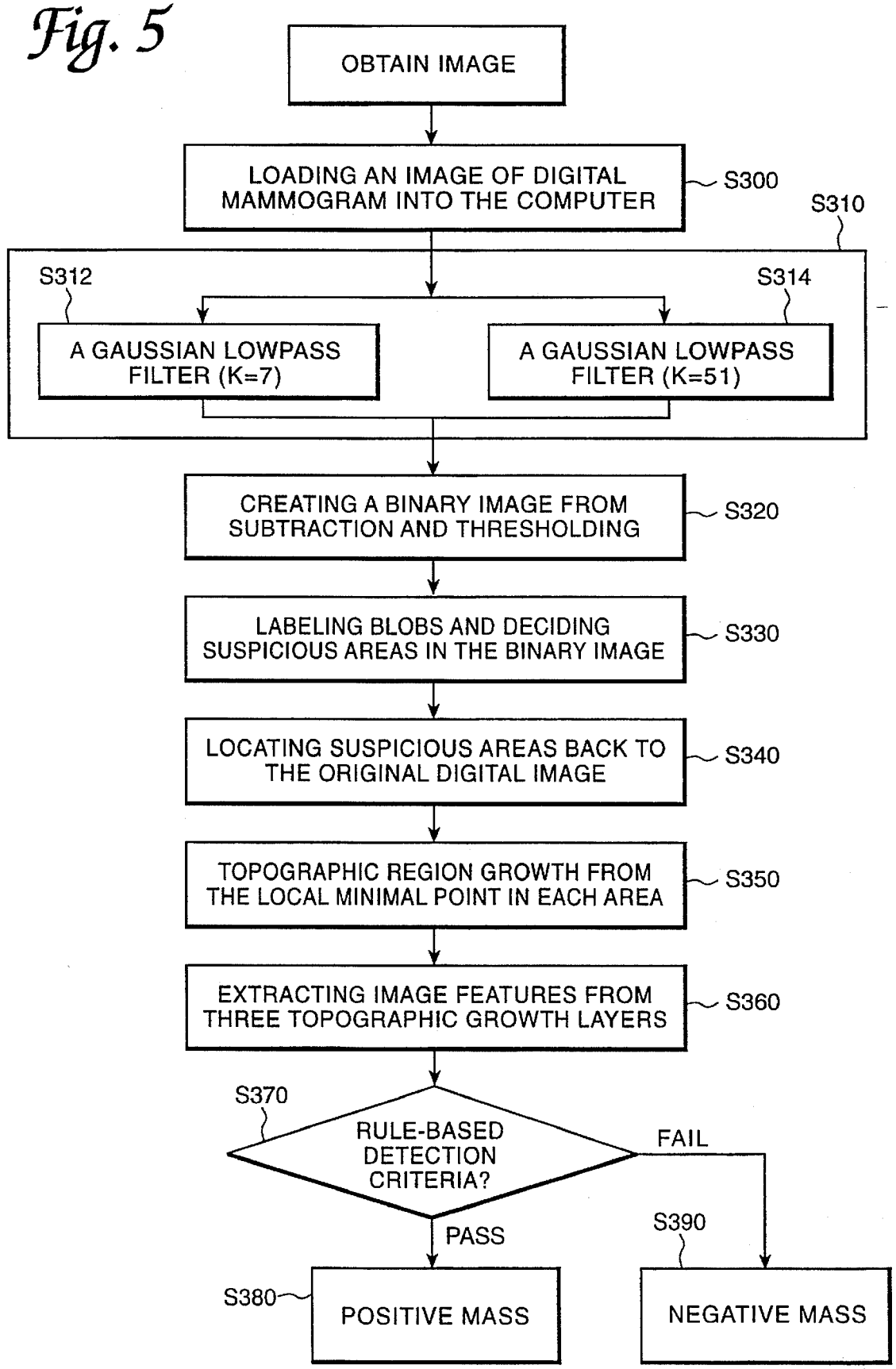

The third preferred embodiment, using single-image segmentation, is now described with reference to FIG. 5

An image of a digital mammogram is obtained and loaded into the computer assisted detection system (step S300). Next (step S310), the loaded image is subjected to two Gaussian low-pass filters, one with K=7 (step S312), and the other with K=51 (step S314). This produces two low-pass filtered images from which a binary image is created (in step S320) by subtraction and thresholding. In the binary image, suspicious regions are determined and blobs are labelled (step S330). These suspicious regions are then located in the original digital image (step S340).

In the pruning stage, for each suspicious region, topographic region growth analysis is determined from the local minimum point in each area (step 350), and then image features are extracted from each of three (3) topographic growth layers (step S360). These features, for each suspicious region, are evaluated in conjunction with rule-based detection criteria (step S370), to determine whether or not that suspected region is a positive mass region (step S380) or a negative mass region (step S390).

Obtaining a Rules Database

As mentioned above, in the pruning stage described herein, when analyzing a suspected region in a radiograph, that region is subjected to rule-based detection criteria (as well as other rules) in order to evaluate whether or not it is a true-positive region. For a region under consideration, various features are calculated and extracted from each of a number of topographic layers for that region. These are then compared to a database of known features and predetermined criteria in order to determine whether or not the region is a true-positive region. This database of detection criteria rules is derived from a large set of verified radiographs which have previously been analyzed. The accuracy, and therefore the effectiveness, of the rules-criteria database is improved each time a new verified case is added to it.

Thus, for each feature, the database contains a rule or rules regarding whether or not that feature indicates that the region under consideration is a true-positive.

For the twenty-two components in each feature vector (described in the above embodiments), the following rules are used:

1. The relationship between the growth ratio between the first and second layers ($V_{19}$) and the central position shift between the first and second layers ($V_{21}$):

$$V_{21} \leq 0.11 \times V_{19}^2 - 0.0834 \times V_{19} + 0.071$$

2. The relationship between the shape factor in the third layer ($V_9$) and the longest axis in the third layer ($V_{12}$):

$$V_{12} > 24 \text{ if } V_9 \leq 3$$

3. The rule between the contrast in the first layer ($V_4$) and the skewness in the first layer ($V_{16}$):

$$V_{16} > 1.25 \times V_4 - 5 \times V_4^2 - 0.775$$

4. The rule between the contrast in the third layer ($V_6$) and the standard deviation of digital values in the third layer ($V_{15}$):

$$V_{15} < 40 \text{ if } V_6 < 0.0875$$

5. The rule between the contrast in the first layer ($V_4$) and the size growth ratio between the first and second layers ($V_{19}$):

$$V_{19} \leq 1.2 + 55.5 \times V_4 - 97.5 \times V_4^2$$

6. The rule between the shape factor in the second layer ($V_8$) and the central position shift between the first and second layers ($V_{21}$):

$$1 < V_{21} < 9, \text{ if } V_8 > 2.7$$

As shown above, the criteria for the features of a layer may include their rate of change with respect to other layers. Note that since a large number of false-positive masses are small in size, the lower limit for the size in each of the three layers is different. For the first layer, size $>10$ mm$^2$, for the second layer, size $>12$ mm$^2$, and for the third layer, size $>14$ mm$^2$.

In the embodiments described above, the list of suspected regions created in the segmentation stage includes regions which may not actually contain any masses or microcalcifications, that is, false positive regions. In the next part of the processing, this list is pruned to remove false-positives found in the first part of the processing. Each suspected region is processed individually. Therefore, in the descriptions herein, the processing takes place for each suspected region produced in the first part, one region at a time. In alternate embodiments, the regions may be processed in parallel, or their processing could be interleaved.

Figure 6:
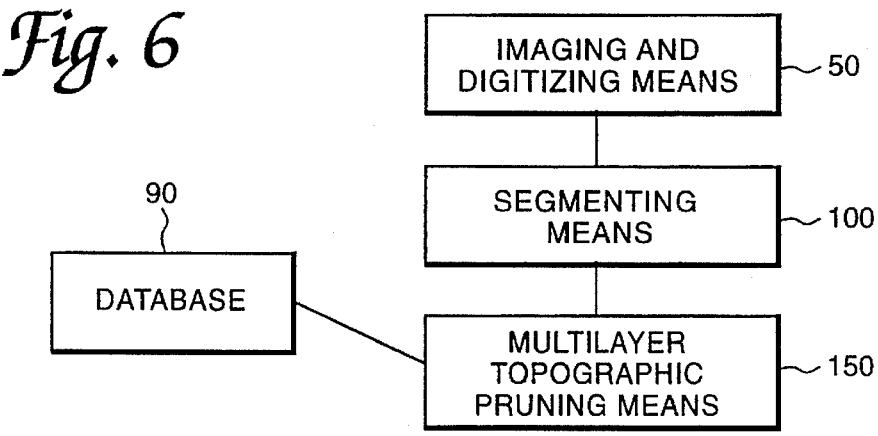

With reference to FIGS. 1 and 6, another embodiment of this invention is described. This embodiment includes imaging and digitizing means 50, segmenting means 100, a database 90, and a multi-layer topographic pruning means 150. The database 90 contains rules and criteria relating to inter and intra-layer determinations. Database 90 is stored on the computer system 2, either in external storage 3 or in the internal memory 8, or in both. Imaging and digitizing means 50 obtains digitized radiographs of an anatomical area of a body. Segmenting means 100 segments into suspected regions, digitized radiographs obtained from the imaging and digitizing means 50. Multi-layer topographic pruning means 150 takes the suspected regions found by the segmenting means 100, along with the original digitized images from the imaging and digitizing means 50, and, in conjunction with the rules in database 90, determines for each suspected region whether that region is a true-positive region. Display 4 can then be used to display the true-positive suspected regions.

While this invention has been described so far largely with respect to finding masses in digital mammograms, it can also be applied to finding other types of abnormalities, for example, microcalcifications, in the mammograms. These can be found in a separate pass, using a different database of rules or they can be found at the same time as the masses are located.

Figure 7A:
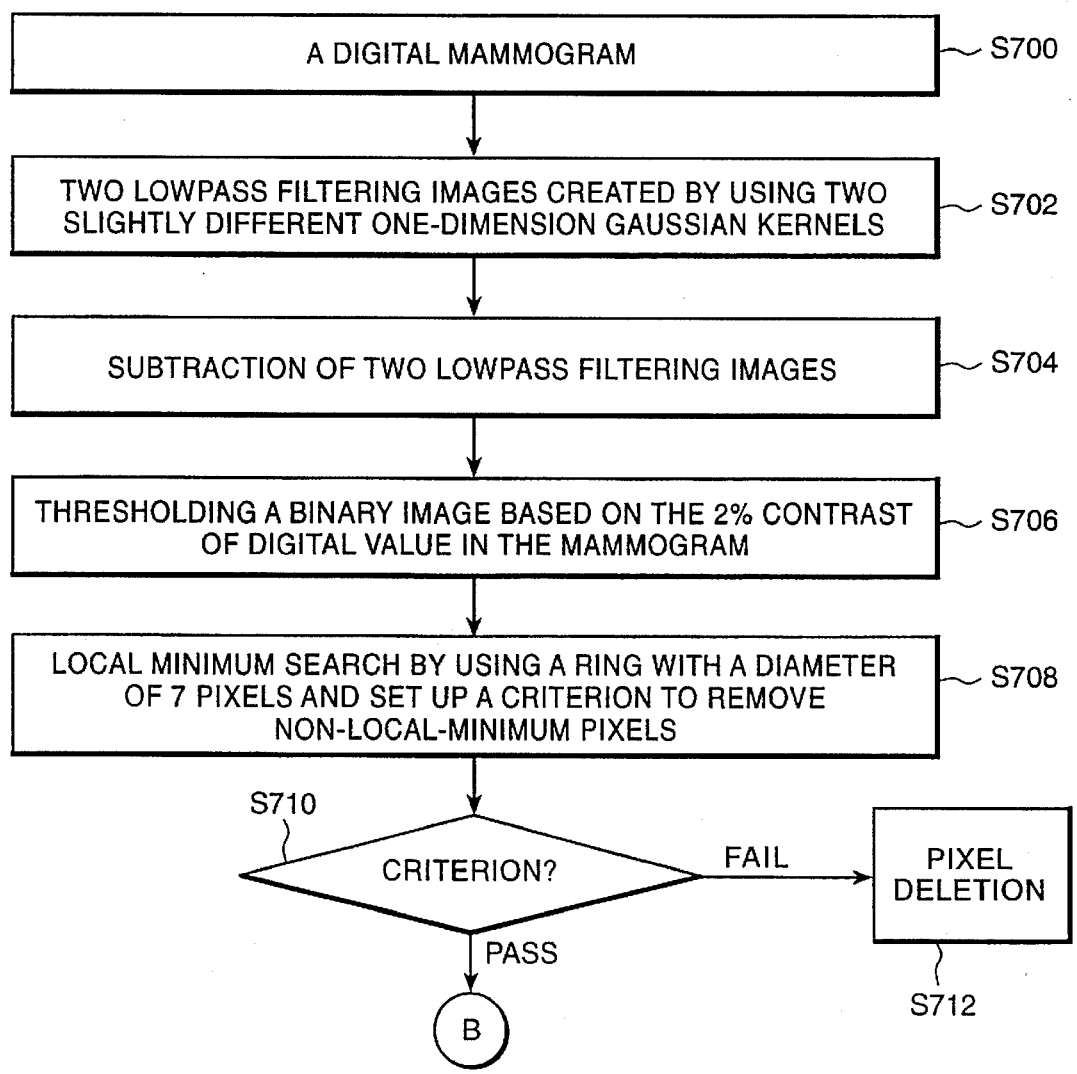
Figure 7C:
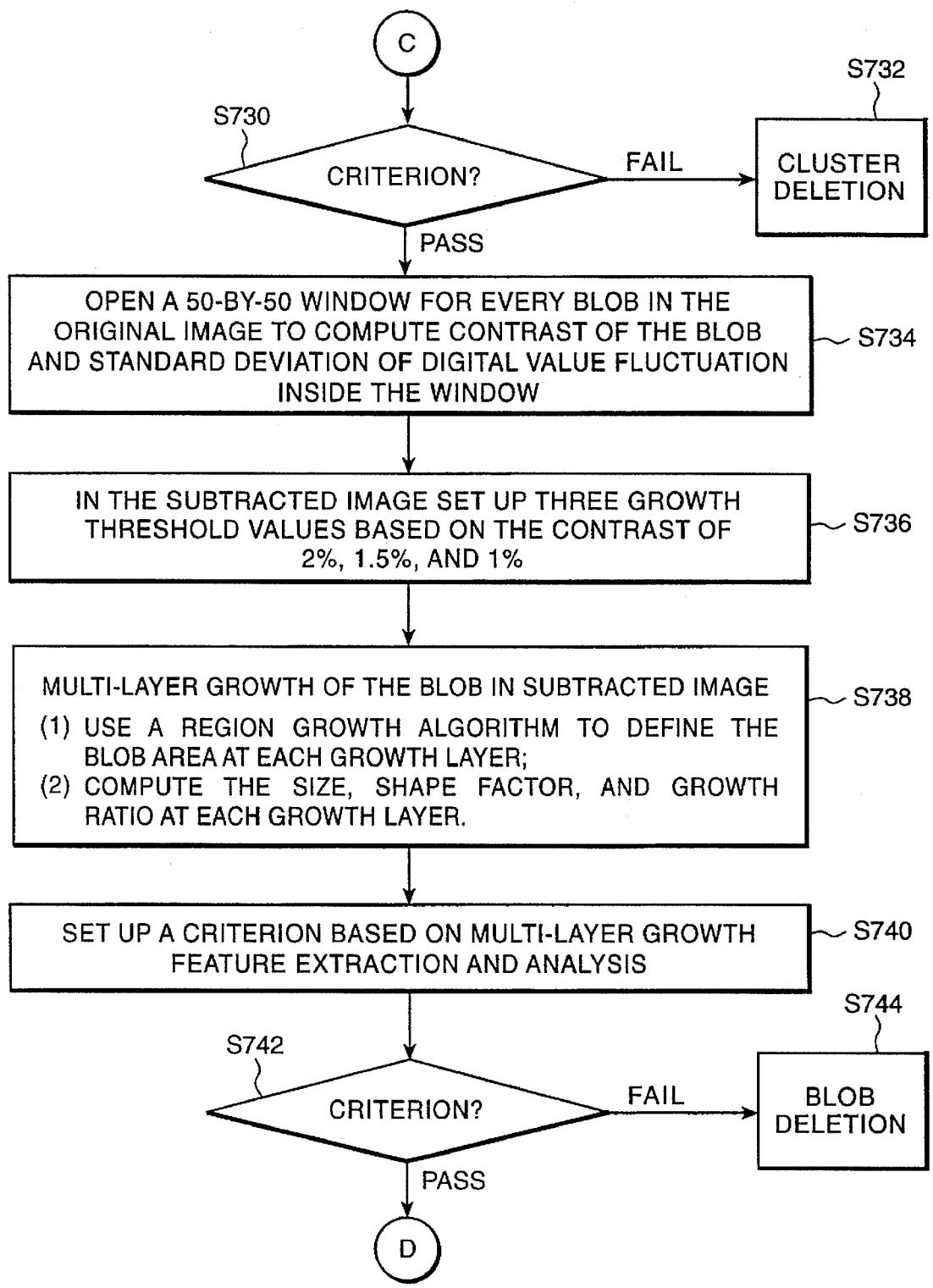
Figure 7D:
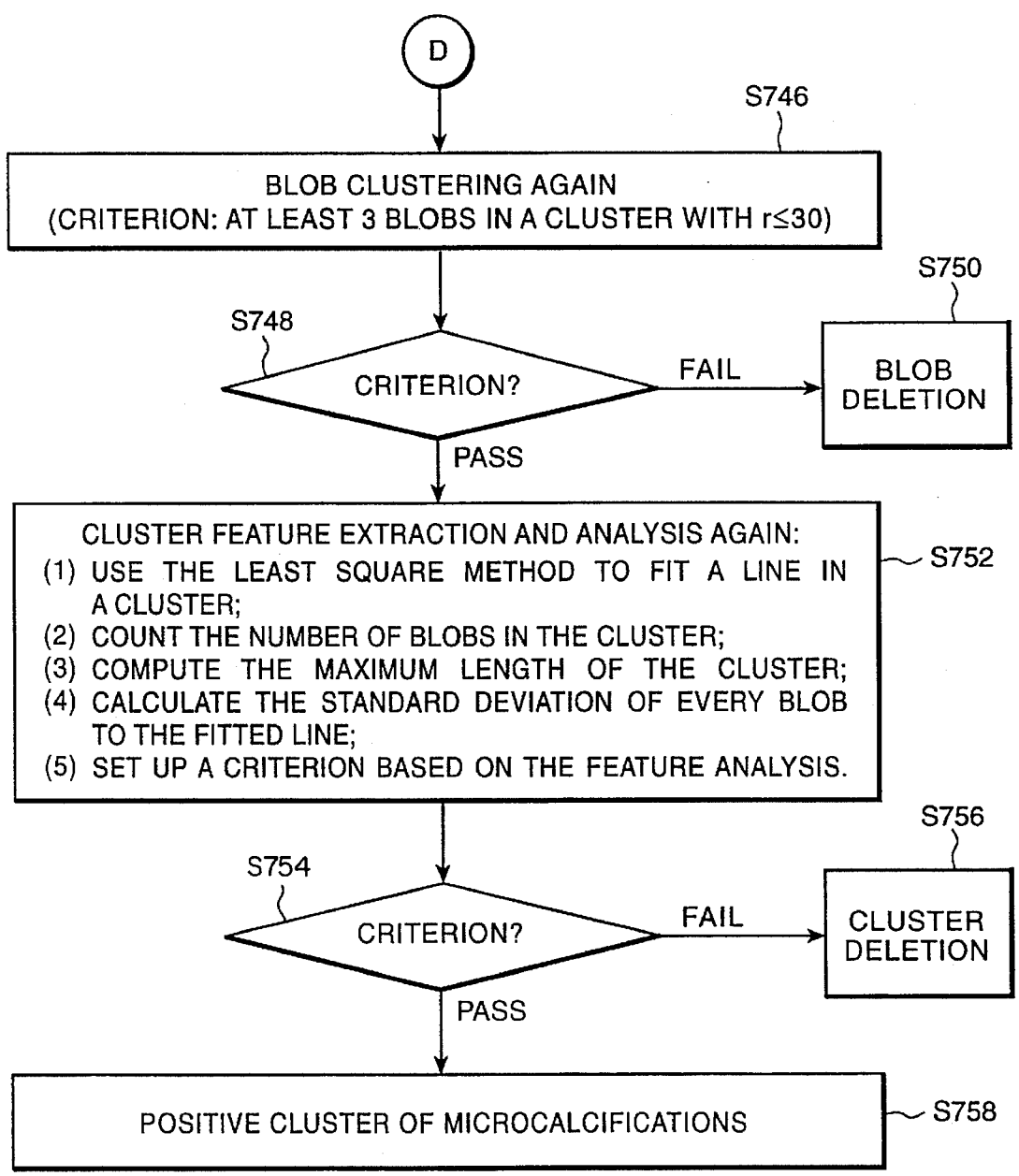

An embodiment for detecting clusters of microcalcifications in digital mammograms is now described with reference to FIG. 7.

This embodiment takes a digital mammogram (step S700) and performs lowpass filtering using two different one-dimensional Gaussian kernels (step S702) to produce two (2) lowpass filtered images. These images are then subtracted (step S704) to produce a subtracted image. The subtracted image is subjected to thresholding (step S708) based on the 2% contrast of digital values in the mammogram. Next, using a ring with a diameter of seven (7) pixels, a local minimum search is performed and criteria are set up to remove non-local-minimum pixels (step S708). The criteria are then used (step S710) to determine whether pixels should be deleted (step S712) or not. Next, the blob is labelled in the binary image (step S714). The labelled blobs are then subjected to size selection using as a criterion 3< size of blob in pixels <30 (step S716, S718). If a blob fails to meet the criterion, then it is not considered a region of microcalcifications and is deleted (step S720). Otherwise, if a labelled blob passes the criterion (in steps S716 and S718), blob clustering is performed (steps S722 and S726). Blobs within a predetermined radius of at least two other blobs are joined to form a cluster. In this embodiment, the predetermined radius is thirty pixels. If a blob fails the clustering criteria (steps S722 and S726), then the blob is deleted (step S724). On the other hand, if a blob passes the clustering criteria (steps S722 and S726), then cluster feature analysis and extraction is performed (in step S728) on the clusters created (in steps S722 and S726).

To perform cluster feature analysis (step S728):

(1) fit a line to the blobs in the cluster using a least squares method;

(2) compute the maximum length, L, of the cluster and the standard deviation (SD) of every blob to the line fitted in (1) above; and (3) Use feature based criteria to remove "calcifications" and other linear "clusters" within the structure. In this embodiment, the criteria for removal is L/SD <30.

If a cluster fails the criteria (steps S730 and S732) then the cluster is deleted. Otherwise, if a cluster passes the criteria (steps S730 and S732) then a window (50×50 pixels) is opened in the original image for every blob and the contrast of the blob and the standard deviation of digital value fluctuation are computed inside the window (step S734). Next, in the subtracted image, three growth threshold values are set up based on the contrasts of 2%, 1.5%, and 1% (step 736). Then multilayer growth of the blob in the subtracted image is evaluated (step S738). This is performed as follows:

(1) A region growth algorithm is used to define the blob area in each growth layer; and (2) the size, shape factor, and growth ratio at each growth layer are determined.

Criteria are then set up based on multilayer growth feature extraction and analysis (step S740), and the blobs are subjected to the criteria (step S742). If a blob fails the criteria (step S742) then it is deleted (step S744), otherwise blob clustering is performed again (step S746). At least three (3) blobs within a radius of thirty (30) pixels form a cluster. Blobs not passing this criterion are deleted (steps S748 and S750). Blobs passing this criterion (step S748) are subjected to further cluster feature extraction and analysis (step S752) as follows:

(1) fit a straight line in the cluster using a least squares analysis;

(2) count the number of blobs in the cluster;

(3) compute the maximum length of the cluster;

(4) calculate the standard deviation of every blob to the fitted line in the cluster; and (5) set up a criterion based on the above feature analysis.

If a cluster of blobs fails the criterion (steps S754 and S756) then the cluster is deleted, otherwise a positive cluster of microcalcifications is found (step S758).

In the computer-aided microcalcification detection scheme described herein, Gaussian bandpass filtering and non-linear global thresholding are used during segmentation. Three feature analysis methods, local minimum search, clustering and topographic multi-layer feature analysis, are then used to reduce the false-positive detections.

With reference to FIG. 8, a simplified flow diagram of the computer-aided detection scheme, the steps are described:

A. Image Filtering and Thresholding

The first step (S802), after loading a digitized mammogram into a computer (in step S800) is to filter the input image and select possible microcalcifications. Here, two Gaussian lowpass filters are used to smooth the image. In order to identify subtle small microcalcifications, both Gaussian filters use small kernel sizes. Based on several empirical experiments, the two preferred kernel sizes selected are five and seven pixels, respectively. After filtering, the two images are subtracted.

To generate a non-linear digital value dependent threshold curve, an empirical experiment was performed. Several digitized mammograms were randomly selected and a large number of small target blobs were added at different regions of the images. Each added blob wets 3×3 Gaussian shaped with a maximum digital value equal to predetermined contrast (e.g., 2 percent). Object (blob) contrast was defined for this purpose as:

$$C = \frac{I_2 - I_1}{I_2 + I_1} \quad (1)$$

where $I_1$ and $I_2$ are the digital values for the object and the background, respectively.

After the images are filtered and subtracted (step S802), different threshold values were used to determine the threshold required to detect all the blobs in the subtracted image with a certain contrast in the original image. Finally, a digital value dependent threshold curve is generated. Using this thresholding method, the CAD system identifies all pixels whose contrast is above a predetermined value (e.g., 2 percent) and generates a binary image which indicates the location of all points identified as possible microcalcifications in the mammogram.

B. Local Minimum Searching

Figure 9:
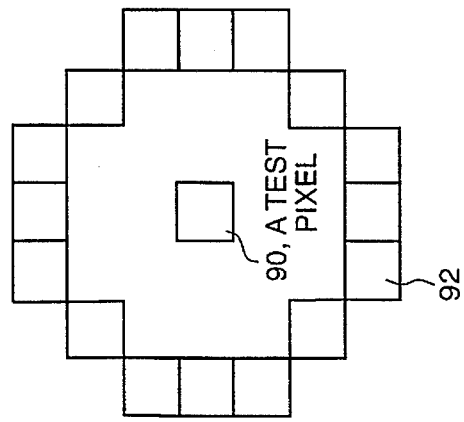
FIG. 9 is a diagram of the reference ring used in local minimum search.

The previous steps (S800–S804) typically result in a large number of pixels being identified as possible microcalcifications. A local minimum search is then applied to reduce the number of pixels segmented as suspicious points in the binary image (step S806). Because a typical true-positive microcalcification is small and contains a local minimum digital value, a reference ring is used to test every point segmented in the binary image. The preferred ring configuration is shown in FIG. 9. From the location of the pixel provided by the binary image, the original digitized image is used in the local minimum search. The CAD system detects the digital values of the test pixel (point) 90 and every pixel of the reference ring 92. If the test pixel 90 has the lowest (minimum) or the second lowest digital value of the pixels tested, it remains a suspected pixel, otherwise it is removed (step S808). This process serves two functions. First, it reduces the number of suspected regions in the image. In addition, it helps to reduce the size of many blobs, hence aiding in the size selection step of the CAD system.

C. Labeling and Clustering

Figure 10:
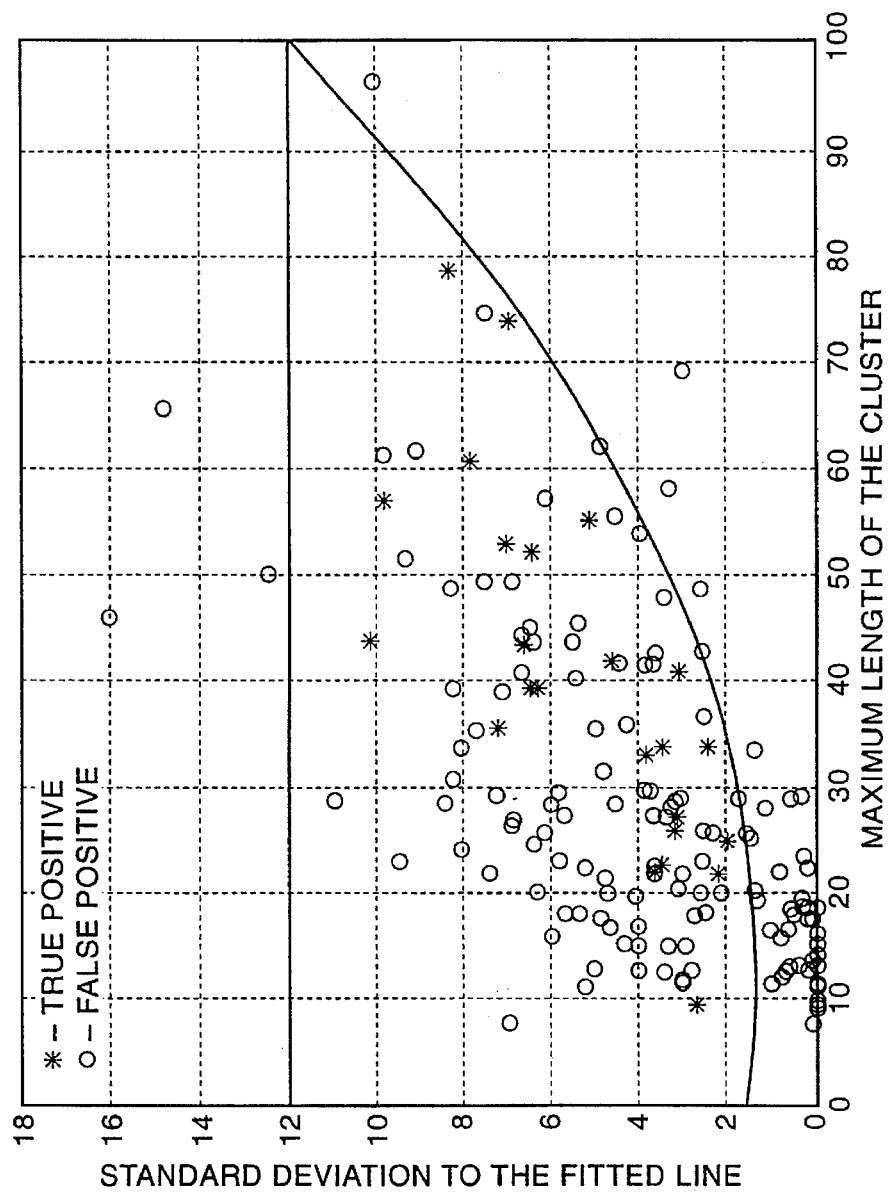
FIG. 10 shows the feature distribution of clusters of microcalcifications and boundary conditions to remove long elliptical shaped clusters.

After local minimum search (step S806), all the remaining blobs in the binary image are labelled (step S810). If a blob involves less than four pixels, it is considered to be an isolated noise region and is deleted from the image. All remaining blobs are then grouped (clustered) together using the rule that if the distance between any two blobs is less than thirty (30) pixels, they are grouped into the same cluster. In order to find out whether a series of blobs belong to a vessel like structure, after grouping, a least squares fitting routine is used to fit all central points in every blob assigned to a cluster to a straight line. A rule-based criterion is used to remove clusters whose standard deviation is below a certain threshold as shown in FIG. 10. Most of the deleted clusters in FIG. 10 have a linear or long elliptical shape, namely the majority of blobs in the cluster lie on or close to a straight line.

D. Topographic Feature Analysis

Figure 11:
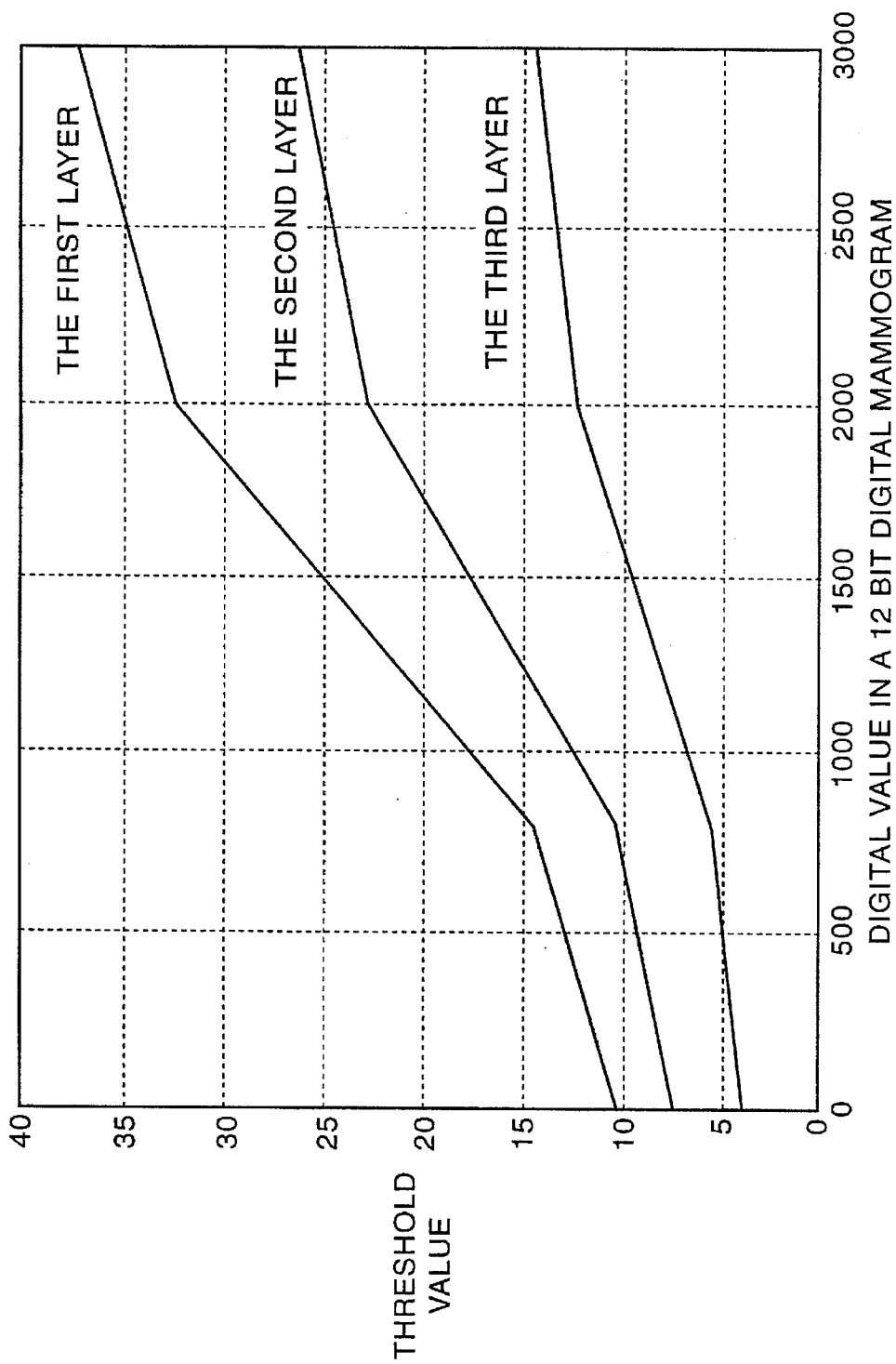
FIG. 11 shows the non-linear digital threshold values implemented to detect all pixels with original contrast of 1, 1.5, and 2 percent, respectively.

All three images, the original digitized mammogram, the subtracted image, and the binary labeled image are required in this process. For every remaining blob in the binary image, a multi-layer structure is constructed from the digital values in the same location of subtracted image. Features of each blob are then extracted from the subtracted image and original digitized mammogram. Based on the same principle of non-linear thresholding discussed above, and using different contrast targets, two additional non-linear digital value dependent threshold values at 1.5% and 1% are generated. Three non-linear thresholding curves used in experiments presented here are demonstrated in FIG. 11. Using the three curves from FIG. 11 to threshold the subtracted image, the CAD system identifies blob regions with the contrast values above 2%, 15% and 1% in the original digitized image. Then, applying a region growth algorithm at the three topographical layers (threshold curves), a series of image features are computed. Some features are calculated from the subtracted image, while others are calculated from the original image. Among the features extracted from the subtracted image are the cross-sectional size, shape factor, longest axis, and size growth ratio of the blob at the three layers. At each layer, the size is counted by the number of pixels in the blob, the shape factor is a ratio between long axis and short axis of the blob. The contrast of the blob is calculated from the original digitized mammogram. The CAD system also computes the standard deviation of the background in every suspected region of a microcalcification.

Figure 12:
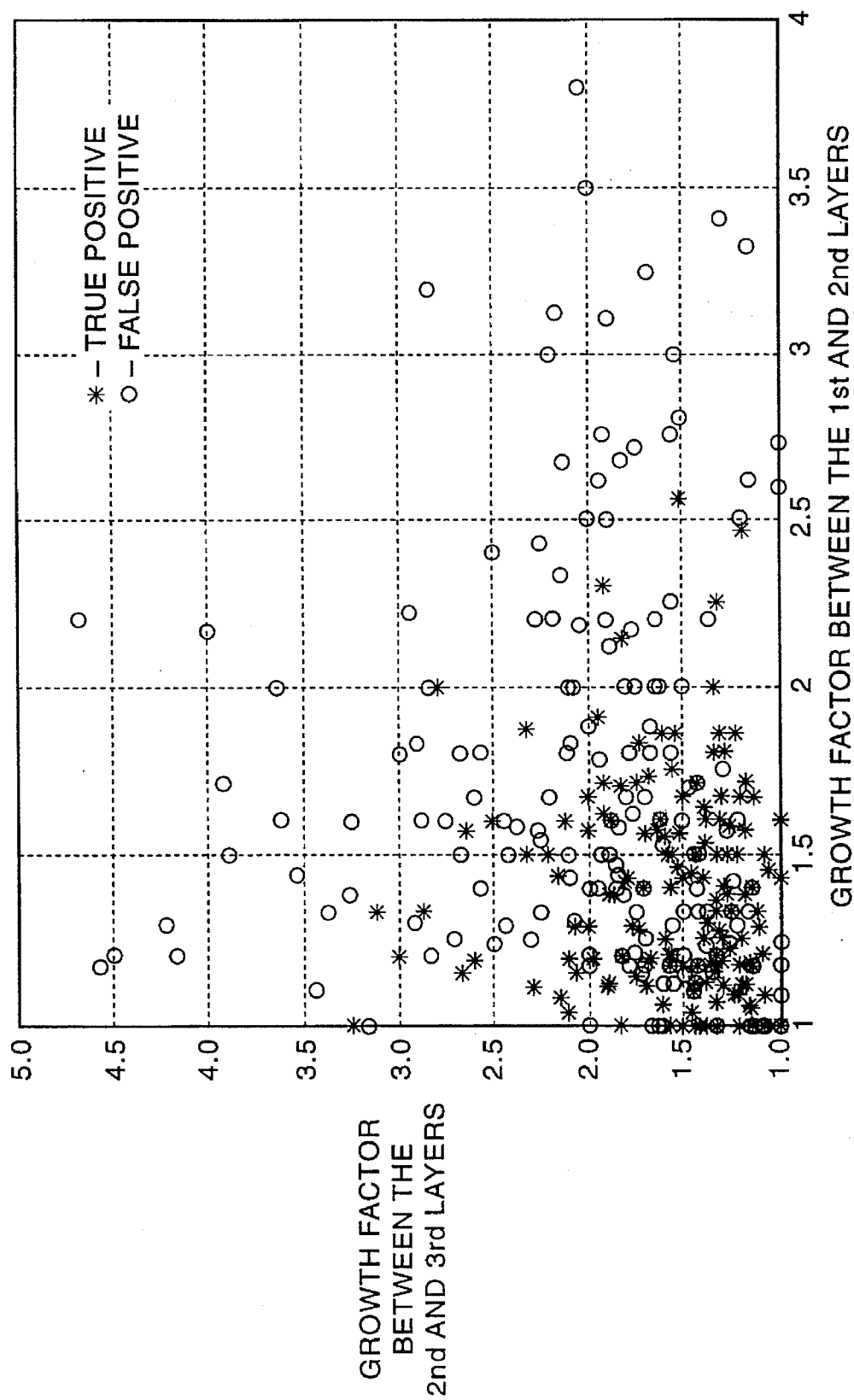
FIG. 12 shows the feature distribution of size growth factors between different layers for single blobs (possible microcalcifications)
Figure 13:
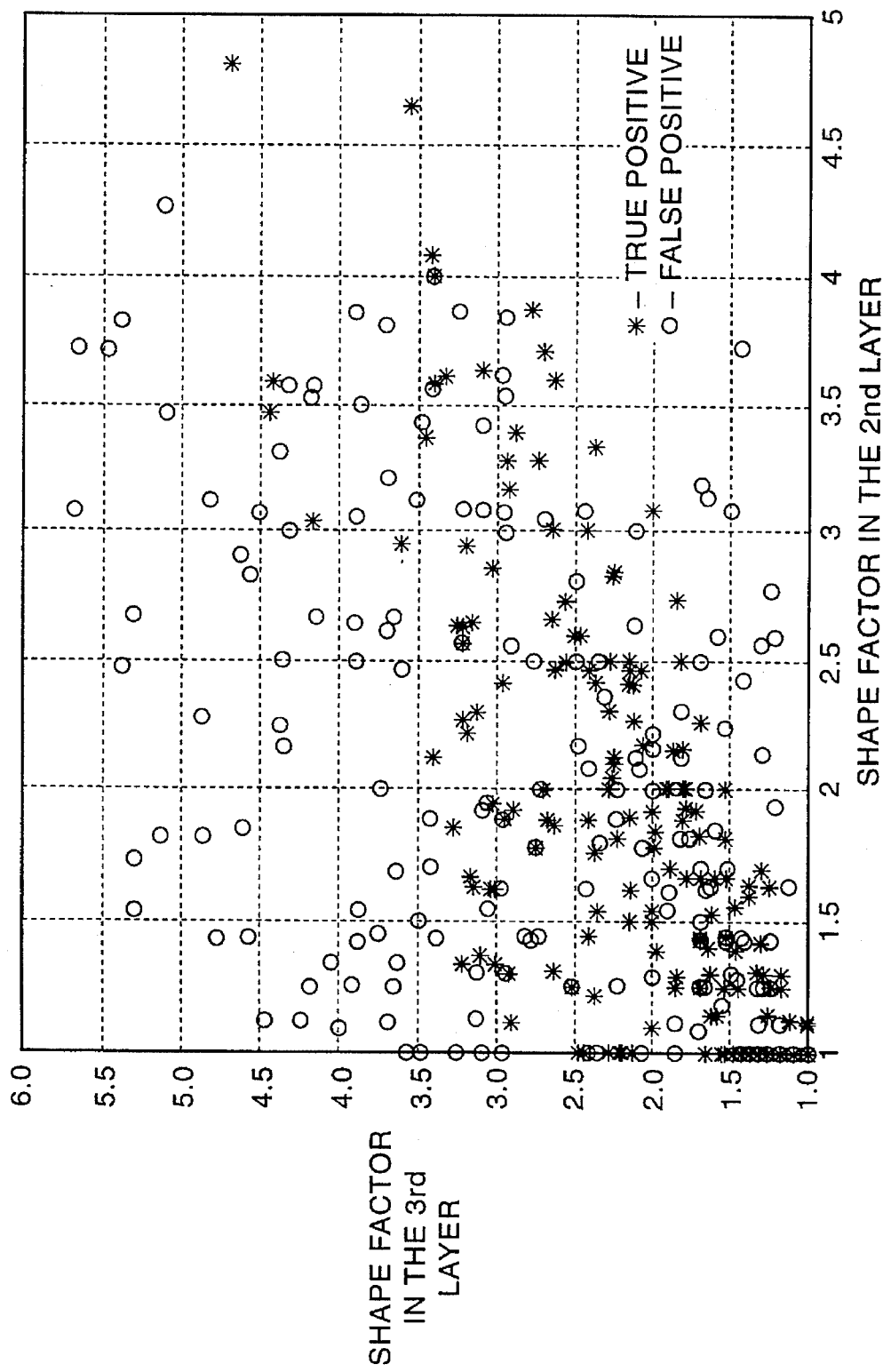
FIG. 13 shows the feature distribution of shape factors in different layers for single blobs (possible microcalcifications).

Once a set of features is computed for each blob at each layer, a rule based on boundary conditions can be imposed based on the data obtained from the image test set by analyzing the feature distribution in true and false positive regions. This is done for individual features and the relationship of certain features between layers. For example, noise in false-positive regions usually increases much faster than in true-positive regions. FIGS. 12 and 13 present examples of the interlayer distribution of the features used to classify true-positive microcalcifications. In these examples, 360 regions were randomly selected from the experimental results. Half of them (180) are true-positive microcalcifications, and the rest are false-positive blobs. FIG. 12 shows the distribution of growth ratio between different layers, and FIG. 13 demonstrates the distribution of shape factor in different layers. From these Figs., it can be seen that a variety of rule-based criteria from these topographic feature distributions can be applied to reduce the number of false-positive classifications while preserving the sensitivity to the true-positive microcalcifications.

E. Clustering After Topographic Analysis

Following the topographic feature analysis, many previous clustered blobs become isolated blobs, thus a second clustering procedure is employed, and any cluster with less than three blobs is deleted.

Following this procedure, an output data file may be generated in which all related detection parameters are recorded, and an output image which shows any remaining positive clustered microcalcifications is constructed. If there are some detected clustered microcalcifications, the locations of the detected microcalcifications are highlighted in the original digitized mammogram and displayed on the computer monitor.

In preferred embodiments, Imaging and Digitizing means is an X-ray mammogram device and a high quality laser film digitizer.

Analysis of results

The above-described embodiments have been applied and used on real-world data with the results described below.

Acquisition of digitized mammograms

A large image set has been established for computer assisted detection studies and tests. The image set used for detecting mammographic masses contains a total of 238 cases (476 images), where each case involves two digitized mammograms. The cases have been verified by mammographic experts and pathological findings in 136 cases. Although other cases do not contain a mass, most of these mammograms show many asymmetric tissue structures, due to architectural distortion, radial scars, cysts, parenchymal deformities, and very dense fiber glandular tissues. Involving so-called normal cases in testing helps to evaluate the performance and effectiveness of a computer assisted detection system in reducing the false-positive detection rate. All the cases examined come from two sources: eighty (80) cases are from the University of Pittsburgh Medical Center (UPMC), and the other one hundred and fifty eight (158) cases are from a research group at the University of Chicago (UC). The mammographic films selected from UPMC were digitized by a high quality laser film digitizer (LUMISYS, model 100). The scanning pixel size of the LUMISYS digitizer can be chosen from 50×50 μm² to 400×400 μm², and the gray level of the digitization is twelve (12) bits. For the results reported herein, the size of the laser focal spot and scanning pixel were set to 100×100 μm². After film digitization, each image was sub-sampled four (4) times, so that the final image size of every digitized mammogram is approximately 512×512 pixels. The size of every digitized image provided by UC is 512×512 pixels with ten (10) bit gray level. The UC images were normalized into twelve (12) bit gray level images by multiplying every pixel in the image by four (4).

Although the digitized mammograms in the test set come from different sources and were digitized by different film digitizers, after normalization our computer assisted detection system can detect no obvious differences in the image features between these two sets of images. Therefore, all 476 images were combined into one testing group.

Figure 14:
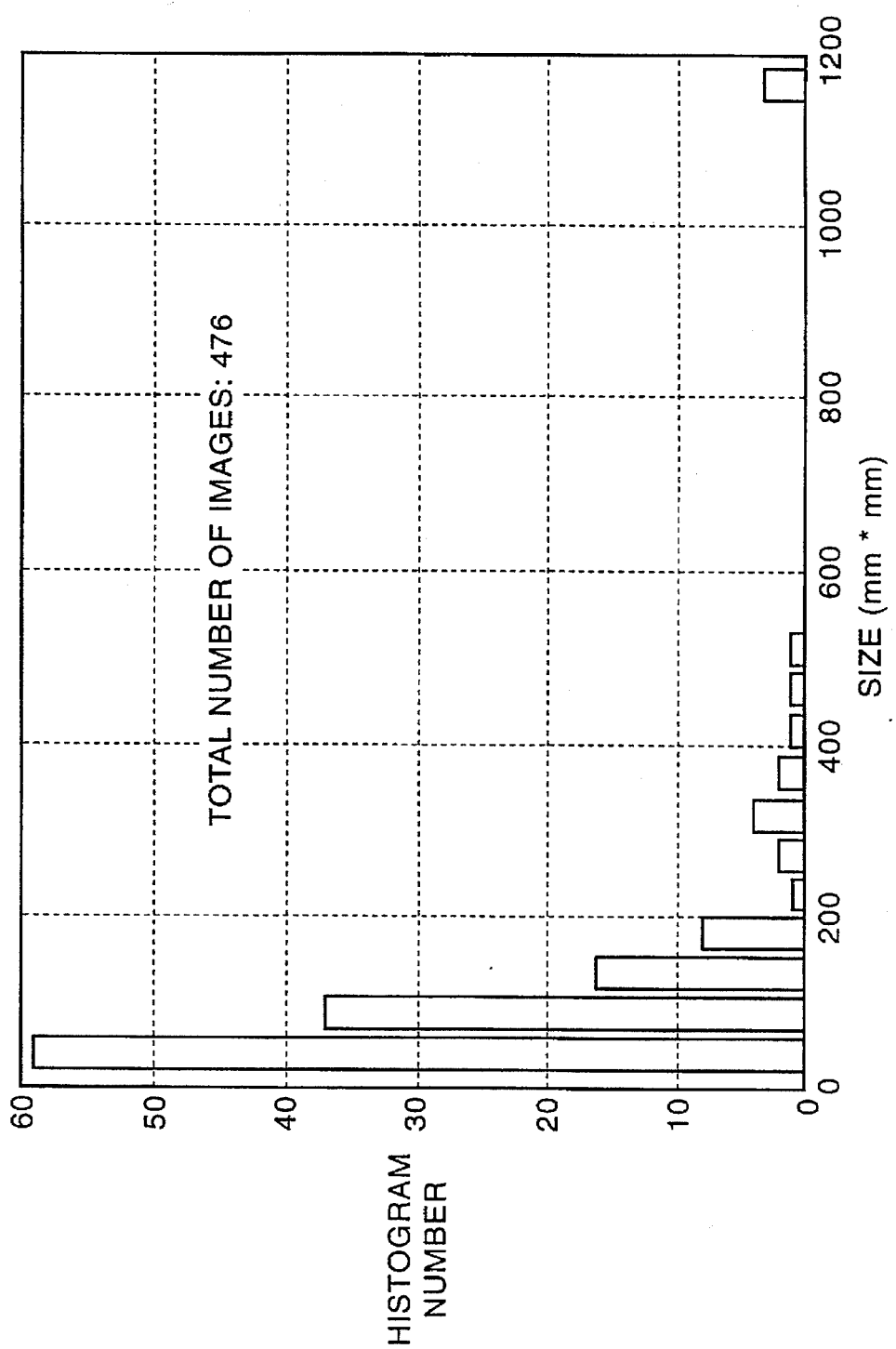
FIGS. 14–23 are graphs showing the results of this invention on various data.
Figure 15:
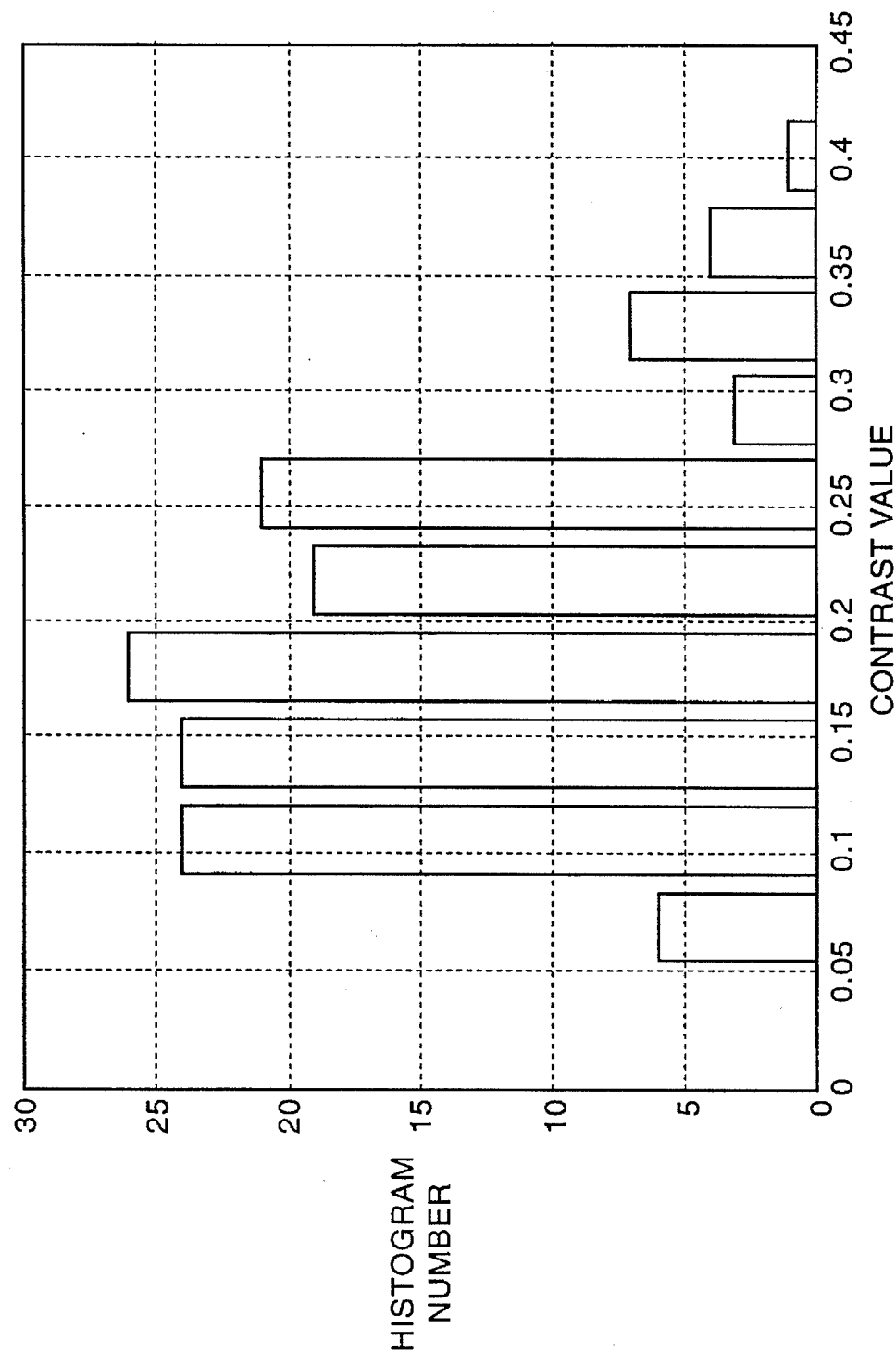
Figure 16:
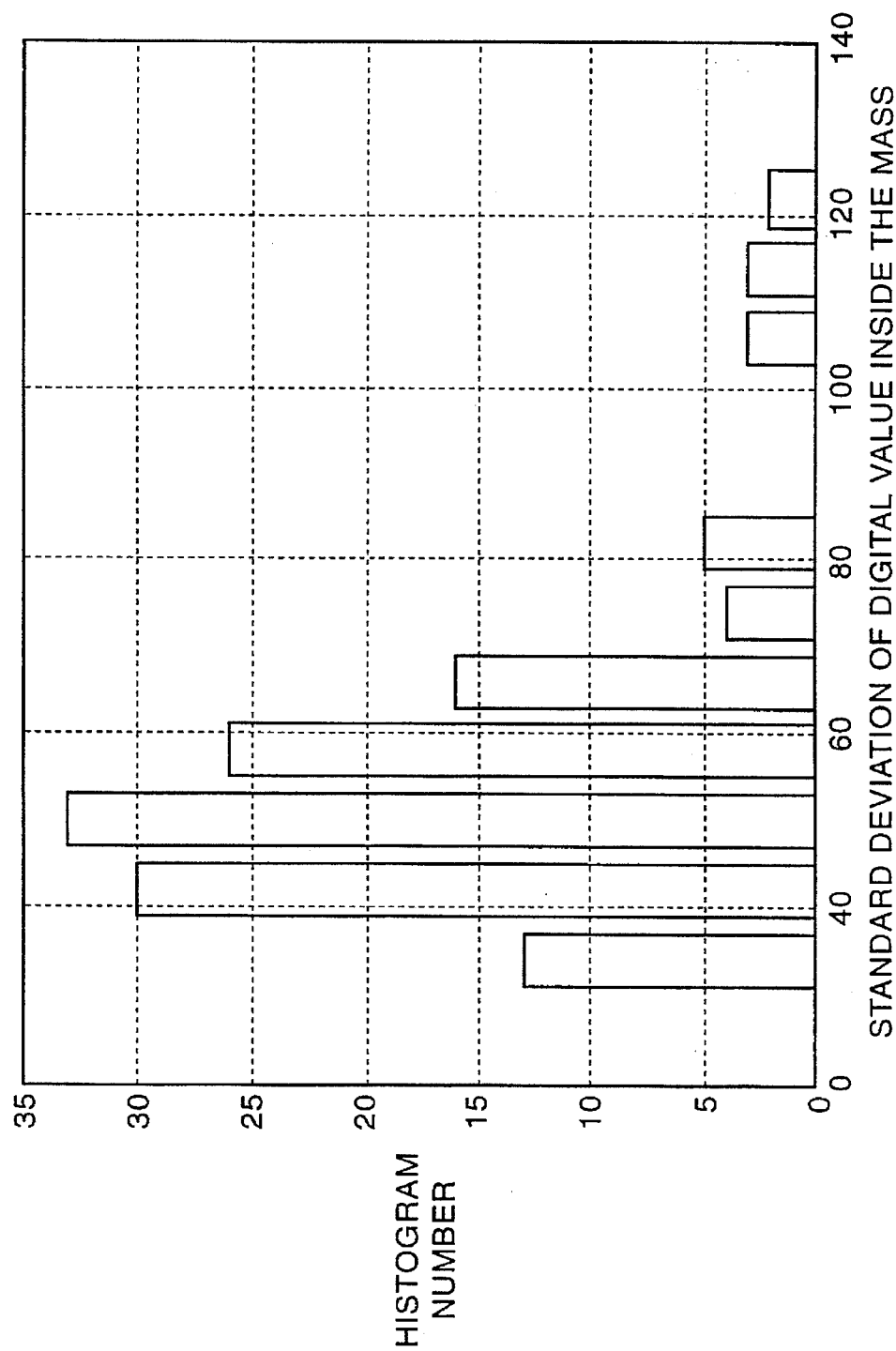

The distribution of size, contrast, and intensity fluctuation of true-positive masses in this one testing group are shown in FIGS. 14–16. (1–3), respectively. All of the parameters shown in the figures were measured by the computer assisted detection system of a preferred embodiment of the present invention. The size was measured on the third topographic growth layer by counting the number of pixels inside a suspected mass, and then scaling (by multiplying by a size coefficient of 0.01 mm²). The contrast was calculated based on the following $$C = \frac{I_2 - I_1}{I_2 + I_1}$$

where $I_1$ is the average gray level inside the mass, and $I_2$ is the average gray level of the background. The intensity fluctuation of the mass is represented by the standard deviation of digital value variation inside the mass. A large portion of the cases in the testing set are considered subtle or very subtle for diagnosis purposes (*Effect of case selection on the performance of computer-aided detection schemes*, Nishikawa, R. M., et al., *Med. Phys.*, Vol. 21, 265–269, 1994).

EXAMPLE I (Using the above-described combined data set):

Image Segmentation

Each digitized mammogram from the combined data set was loaded into a computer system of this invention. First two Gaussian low-pass filters were used in order to search suspicious regions in the digitized mammogram. One of the Gaussian filters has a small one-dimensional kernel size of seven (7) pixels, and the other filter has a large one-dimensional kernel size covering fifty one (51) pixels. Each original digitized mammogram was filtered by these two Gaussian low-pass filters, and two corresponding low-pass images were created. Next, these two filtered images were subtracted and a binary image was created using thresholding on the resultant subtracted image. A global threshold value was used in most areas of the image, but the threshold value was raised along the skin boundaries in order to compensate for the blurring effect of the Gaussian low-pass filter along these boundaries in the mammogram. After the thresholding, many isolated small or large blobs appear in the binary image. All of the blobs were then labelled according to the labeling algorithm. Every labeled blob was analyzed and accepted as a suspicious region if its size and shape satisfy the rule-based criterion. For each blob, the size was found by counting the number of pixels in the blob, and the shape was determined by computing the ratio between the long axis and short axis of the blob. Blobs whose size was too small or too large were eliminated from the image.

Likewise, blobs whose shape factor is too large were eliminated from the image. Finally, all suspicious regions in the image were framed. The central coordinate points and the sizes of all regions were stored in a data array.

Topographic Feature Extraction

For the mammogram being processed, the originally digitized mammogram was loaded back into the computer program for analyzing image features in each suspicious region found in the segmentation step. First, a Gaussian low-pass filter with a kernel size of seven (7) pixels was used to smooth each suspicious region. Next, after searching for the local minimal point in the region, the computer program selected a threshold value and used a region growth algorithm to find the regions growth area. The threshold value was adjusted according to the digital value of local minimal point in the region. The size, contrast, shape factor, long axis length, standard deviation and skewness of the digital value distribution in this layer of the mammogram were extracted. Then, the second layer and the third layer of the mammogram were generated in order to build a topographic multi-layer feature vector for each region. The threshold value $T_j$ for next layer is a function of threshold value and contrast value in above layer (that is, $T_{j-1}$ and $C_{j-1}$), as given by:

$$T_j = T_{j-1} + 256 \times C_{j-1}$$

The computer assisted detection system then extracted the following unique features which are related to the topography between two adjacent layers: contrast, standard deviation, skewness, shape factor, and longest axis. From the second layer two more features are extracted: the size growth ratio and central position shift of the suspicious region between two adjacent layers. Finally, a multi-layer feature vector containing the following twenty-two (22) components was created for each suspected region:

1. The Size in the first layer;
2. the Size in the second layer;
3. the Size in the third layer;
4. the Contrast in the first layer;
5. the Contrast in the second layer;
6. the Contrast in the third layer;
7. the Shape factor in the first layer;
8. the Shape factor in the second layer;
9. the Shape factor in the third layer;
10. the Longest axis in the first layer;
11. the Longest axis in the second layer;
12. the Longest axis in the third layer;
13. the Standard deviation of digital values in the first layer;
14. the Standard deviation of digital values in the second layer;
15. the Standard deviation of digital values in the third layer;
16. the skewness of digital values in the first layer;
17. the Skewness of digital values in the second layer;
18. the Skewness of digital values in the third layer;
19. the Size growth ratio between the first and second layers;
20. the Size growth ratio between the second and third layers;
21. the Central position shift between the first and second layers; and
22. the Central position shift between the second and third layers.

Mass Detection

The combined digitized mammograms including the 476 images described above (from both the University of Pittsburgh and University of Chicago), were used to build a database of rule-based detection criteria in topographic feature analysis.

Serial rule-based detection criteria are set up to identify positive and negative masses. Some basic boundary conditions are apposed to each layer. For example, in order to eliminate thick vessels in the image, a condition on the shape factor is set up to be smaller than five (5); and in order to distinguish widely spread normal tissue and the mass, the size growth ratio between two adjacent layers is limited to be less than six (6).

Figure 17:
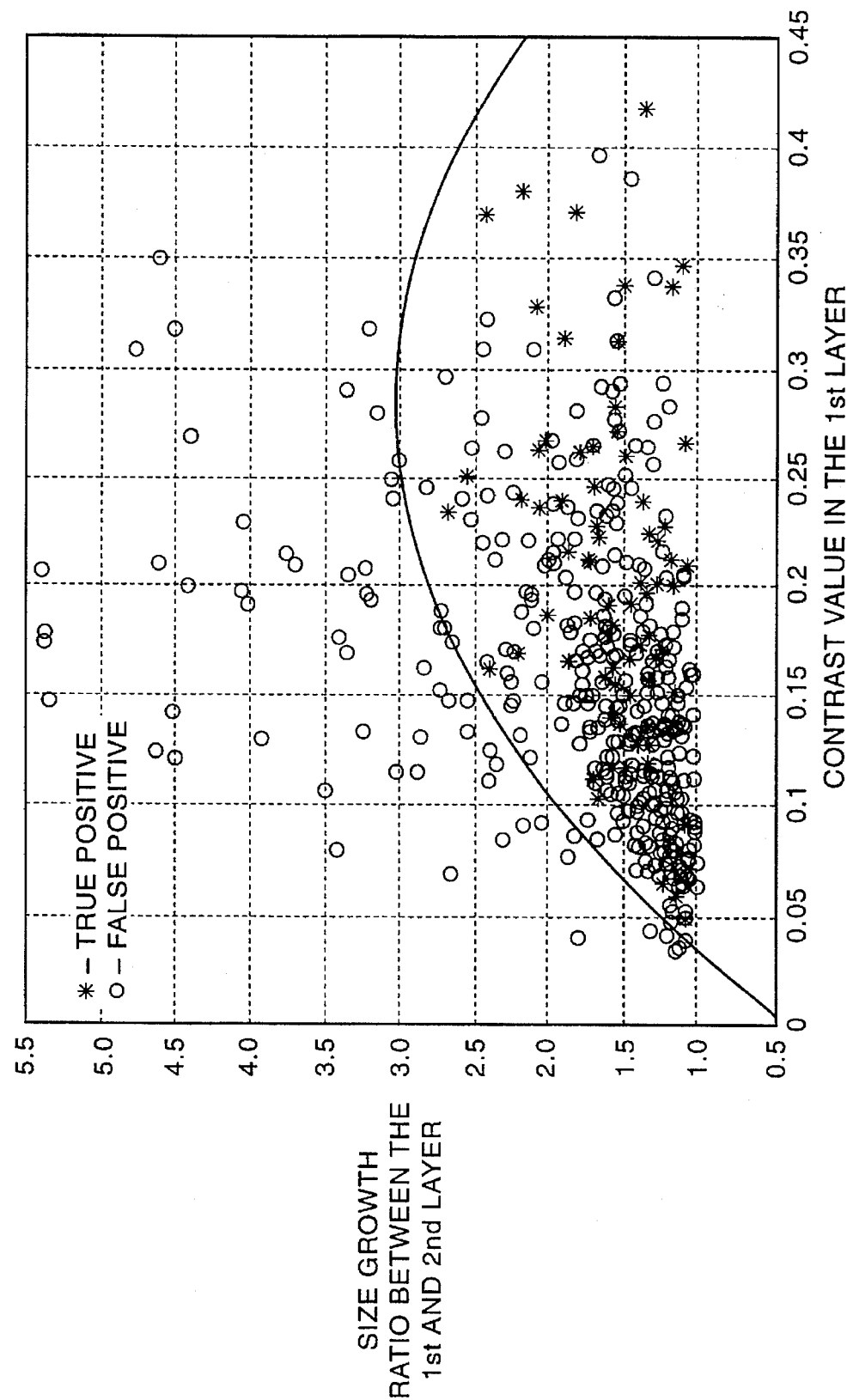
Figure 18:
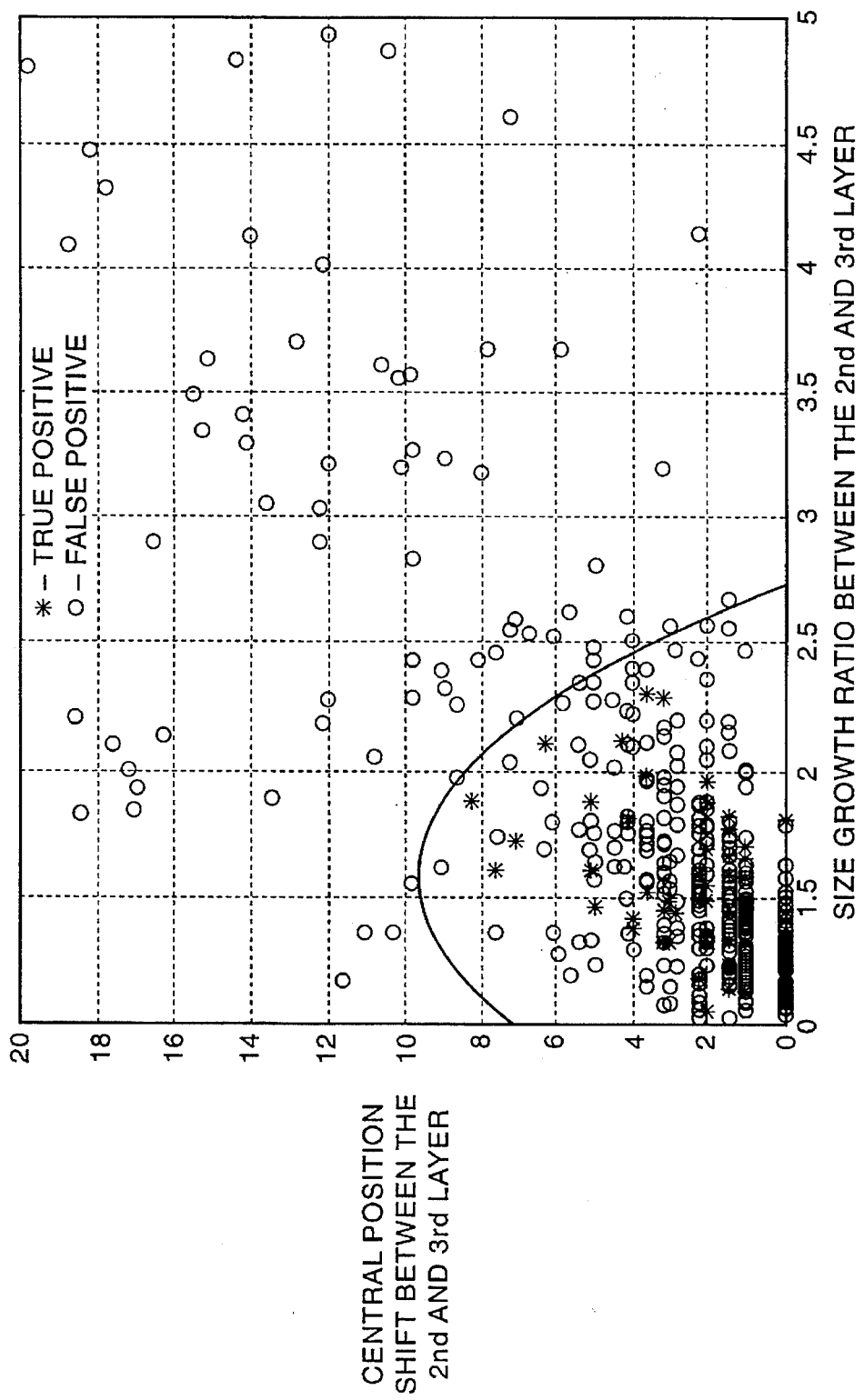

If the image features extracted by the computer passed all the criteria in three layers, a feature vector containing twenty-two (22) components was formed. Then, the feature vector was tested by several rule-based detection criteria, including those shown above. In this case, all of the rules are based on the relationship between two components of the feature vector in the same layer or between components in two adjacent layers. After plotting and analyzing the feature distribution of true-positive and false-positive masses in many combinations, several useful feature separations between true-positive and false-positive masses are selected. Thus, a boundary curve can be drawn on every selected feature pair. FIGS. 17 and 18 show examples of two rule-based criteria. From these figures, it can be seen that if any feature points fall outside the separation boundary, they will be deleted. The suspicious regions represented by these feature points are released as negative regions and no mass will be detected in such regions. The figures show that one criterion can only eliminate at least twenty to thirty false-positive detections in the image testing set. In the current stage, it is preferable to tolerate more false-positive detections and not to put too many detection criteria which make very limited contributions to reduce false-positive detection. Finally, if a feature vector passes all the detection criteria, a positive mass is detected in the image. The feature data of this mass is saved on a result data file. The area of mass is highlighted on the digitized mammogram and displayed in the computer monitor.

Results

Results for mass detection

As noted above, the performance of a computer assisted detection system depends heavily on the case selection. It is often difficult or even meaningless to compare the performance of different computer assisted detection systems by using different image sets without fully describing the image feature distribution in these image sets. Therefore, before the complicated problem of case selection can be solved in the computer assisted detection studies, this computer assisted detection system uses a large number of images for testing.

The combined image set was divided into two subsets, the first one containing only the digitized mammograms from the University of Pittsburgh Medical Center (UPMC), and the second one having only the images from the University of Chicago. The computer assisted detection performance of image subset from the University of Chicago has been previously described (see *Effect of case selection on the performance of computer-aided detection schemes*, Nishikawa, R. M., et al., *Med. Phys.*, Vol. 21, 265–269, 1994; *Computer-aided detection of and diagnosis of masses and clustered microcalcifications from digital mammograms*, Nishikawa, R. M., et al., *Proc. SPIE*, 1905, pp. 422–432, 1993; and *CAD in digital mammography: computerized*

*detection and classification of masses, Int'l Workshop on Digital Mammography*, Royal York Hotel, York, U.K., 1994).

Separating the combined image training set into two subsets makes it easier to evaluate the general performance of the computer assisted detection system and its sensitivity to the condition changes in future clinical environments, The results of the testing are described with reference to FIGS. 19-23.

Figure 19:
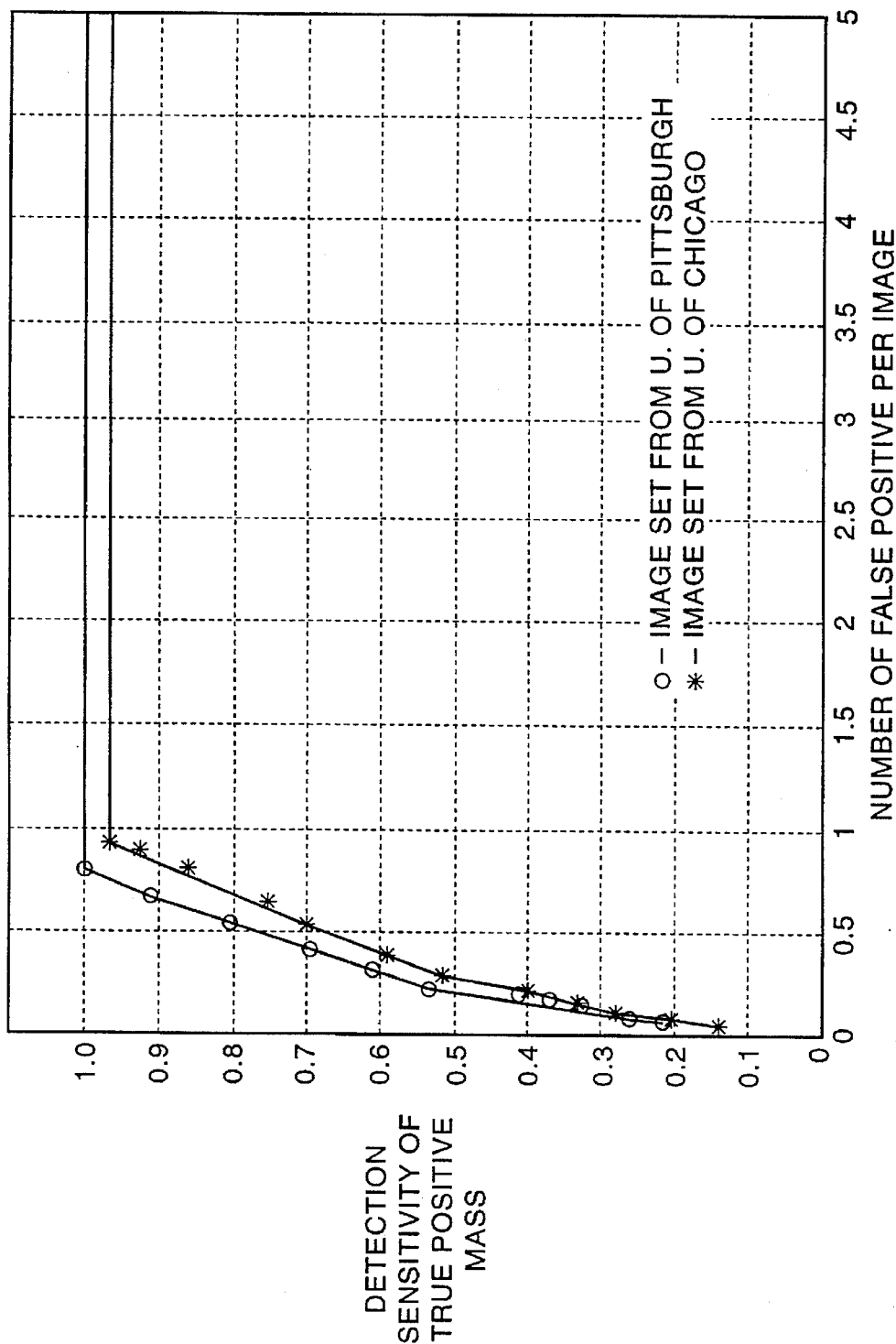

FIG. 19 demonstrates performance curves of using the computer assisted detection system described herein in order to detect masses, including benign and malignant masses, in these two images subsets. Although the two image subsets involve different numbers of digitized mammograms and they use different digitization formats, the computer assisted detection system performance on these two image subsets is very similar, as can be seen in the figure.

Figure 20:
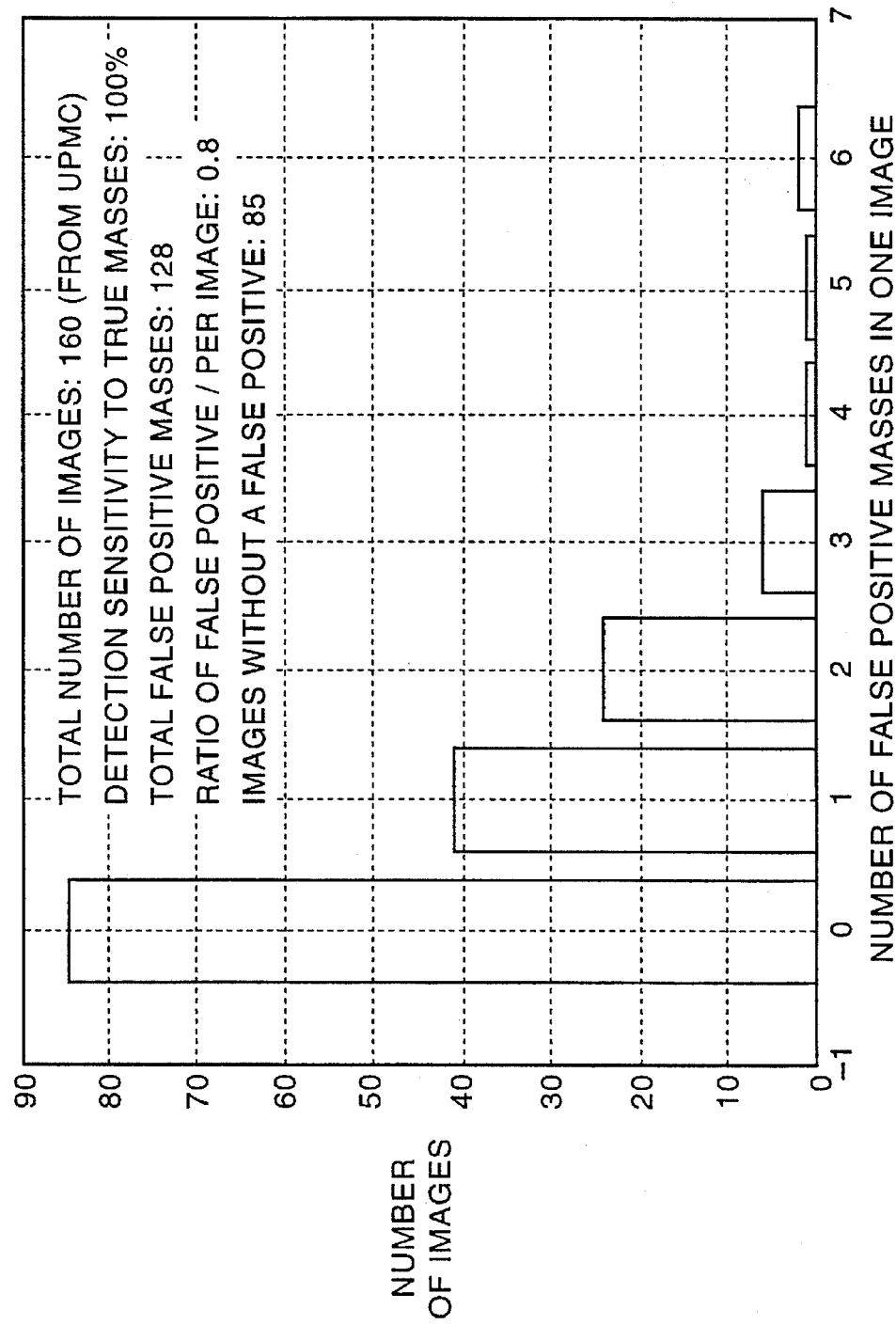
Figure 21:
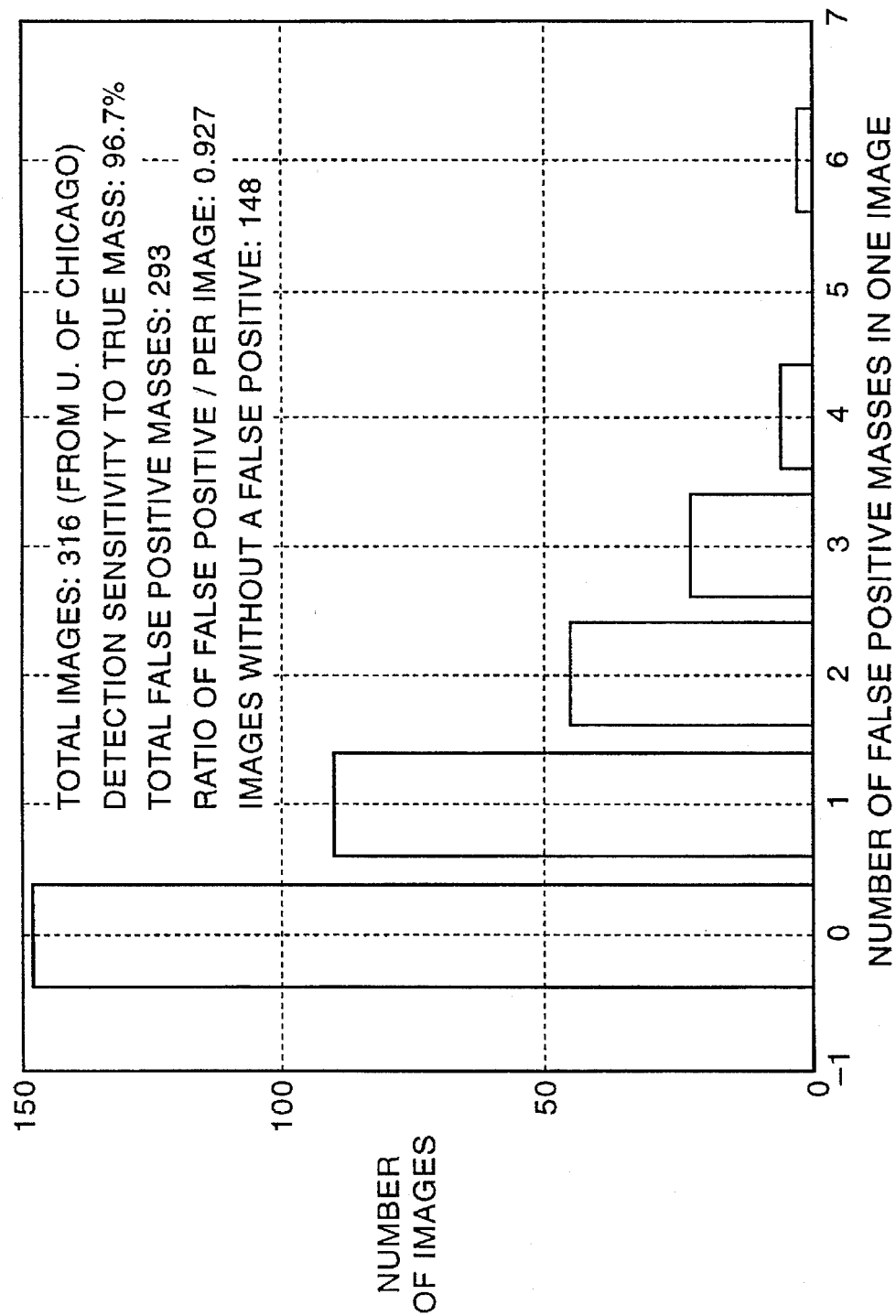

In the UPMC image subset, the preferred embodiment computer assisted detection system detects all forty six (46) true-positive masses, and the false-positive detection rate is 0.8 per image on average. Among the one hundred and sixty (160) images, no single false-positive mass is detected in more than half of images (as shown in FIG. 20). In the image subset from the University of Chicago, there are a total of ninety (90) mass cases, forty six (46) of which are malignant masses and forty four (44) of which are benign masses. When using the computer assisted detection system of the second preferred embodiment to test this image subset, the system detected eighty seven (87) true cases and failed to detect three (3) small benign masses. At the same time 293 false-positive masses were detected in this image subset. The performance of the computer assisted detection system in this image subset obtained a 96.7% true-positive detection sensitivity, with a false-positive rate of 0.98 per image. Among the total 316 images, there was no false-positive detection in 148 images. FIG. 21 shows the histogram distribution of false-positive detections. The slightly higher rate of false-positive detection in this image subset is mainly due to more false-positive detections being made in the category of the normal images. One hundred and thirty one (131) false-positive masses are picked up among the total (180) malignant and benign images, giving a rate of 0.73 false-positives per image in these two categories. However, 162 false-positive masses are found in a total of 136 normal images, giving a false-positive detection rate higher than one per image. This is because, as previously noted, by viewing the images, it is obvious that many images in the normal category contain more complicated and more fluctuant tissue structure, namely, they represent a "difficult" control group.

The results of using the second preferred embodiment show improvements in the first or segmentation stage, that is, the stage of finding possible mass regions, over other techniques. For example, after image segmentation, the computer assisted detection system detects a total of 1,965 suspicious mass regions in the subset images from UPMC and 4,262 regions in the subset images from the University of Chicago. Thus, on average 12.3 and 13.5 suspicious regions per image are found in two subsets, respectively. The criteria for feature analysis in the first layer, which is similar to what other computer-aided detection systems do in their feature analysis, reduce the number of false-positives to 860 and 1,738 in the two image subsets or 5.4 and 5.5 false positives per image, respectively. Following the topographic feature analysis, final results show that 128 and 293 false-positive masses pass through the multi-layer detection criteria in these two image subsets, respectively. Thus, the false-positive detection rates are reduced to 0.8 and 0.93 per image in the two image subsets, respectively. From the above test data, approximately 85% of the false-positive detections passed the single layer feature analysis and were eliminated, and the high sensitivity to true-positive detection is maintained in the final detection results.

The function of topographic feature analysis in the second stage of the computer assisted detection system is the same as other feature analyses, namely to classify or identify the positive or negative mass regions provided by the previous image segmentation. Therefore, the topographic feature analysis described herein is independent of the image segmentation technique used. Thus, the topographic feature analysis can follow any kind of image segmentation, whether it is based on single image filtering or bilateral image subtraction.

Figure 22:
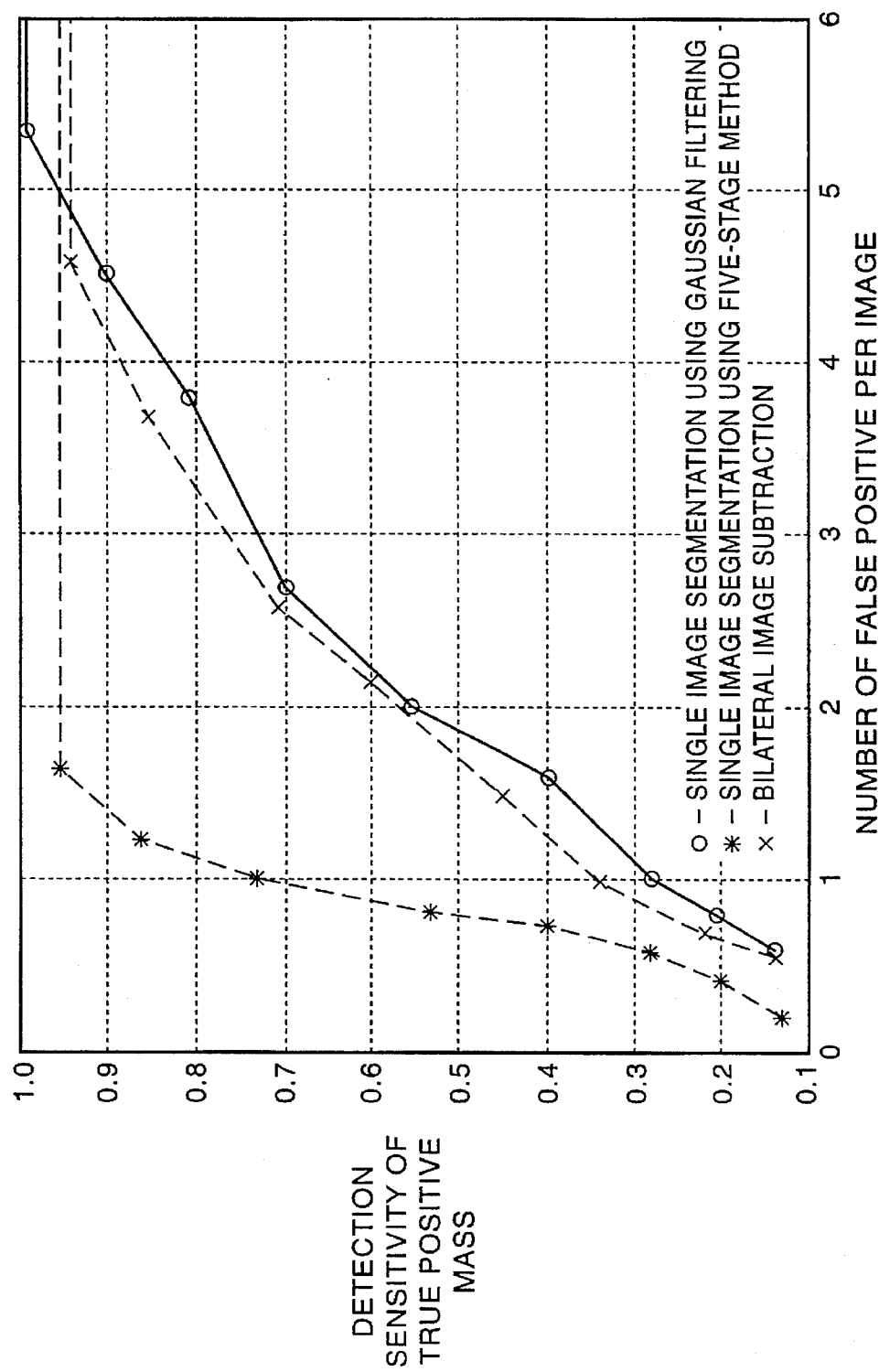
Figure 23:
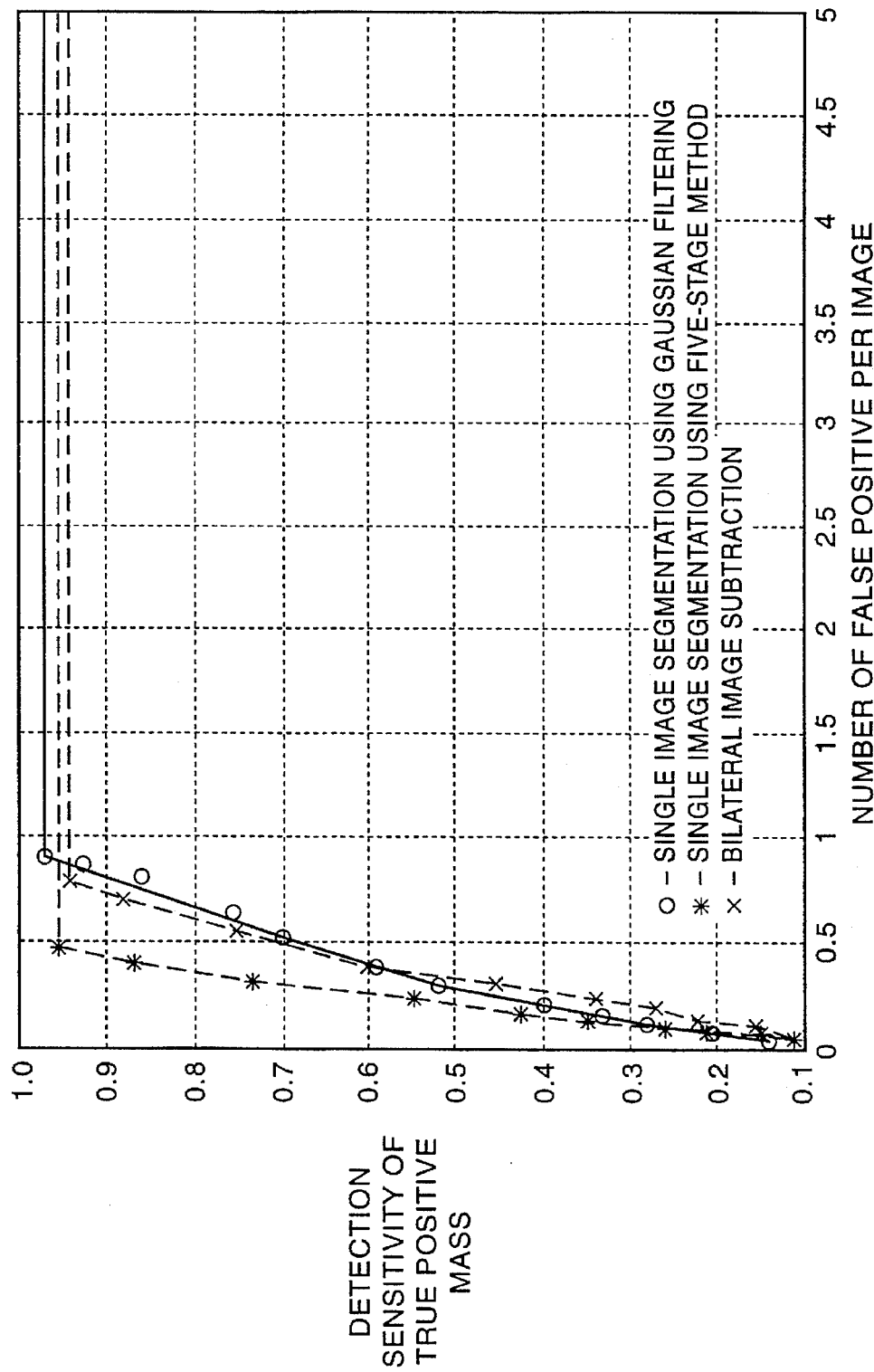

Several alternate methods of image segmentation to find the possible mass regions have been investigated. These methods include single-image segmentation using Gaussian filtering, single-image segmentation using a five-stage approach, and bilateral image subtraction. As examples, FIGS. 22 and 23 demonstrate the performance difference between using single-layer feature analysis and topographic multi-layer feature analysis. The combined digitized mammogram set was used in this evaluation. FIG. 22 shows three performance curves from single-layer feature analysis, while FIG. 23 displays three performance curves after using topographic multi-layer feature analysis. From the results in FIGS. 22 and 23, it is clear that regardless of the kind of image segmentation used in the first step of the computer assisted detection system, topographic feature analysis significantly improves the overall computer assisted detection performance. The detection rates of false-positive masses in all three curves are greatly reduced.

The results of comparing single-image segmentation with bilateral image subtraction are summarized below.

Using the two image sets described above (UC and UPMC), Table I summarizes a comparison of the two techniques. In Table I, "One-Image" represents the single-image segmentation, and "Bilateral" represents bilateral-image subtraction. These results summarize an experiment which tested only the first stage of a computer assisted detection system to find possible mass regions in a mammogram. These results show that no matter what kind of segmentation method is used, a computer assisted detection system picks up a large number of suspicious regions in every image. The priority in the segmentation stage is to find every true-positive mass region in the image. If a true-positive mass region is missed at this stage, then there is no possibility of detecting it in subsequent stages of computer assisted detection. Improvement and progress made in subsequent stages of any computer assisted detection system can only reduce the false-positive mass regions in any image set.

As can be seen from the summary in Table I, the bilateral-image subtraction misses three (3) and five (5) true-positive mass regions, respectively, in the UPMC and UC image sets. Therefore, in order to achieve high detection sensitivity of true-positive masses in digitized mammograms, single-image segmentation has an advantage.

The reason why bilateral-image subtraction misses true-positive mass regions is discussed below.

|           | Total True-Positive Regions Detected | | Average Positive Mass Regions/per image | | | |
|-----------|-----------|-----------|-----------|-----------|-----------|-----------|
|           | | | Before Feature Analysis | | After Feature Analysis | |
| Image Set | One-image | Bilateral | One-Image | Bilateral | One-Image | Bilateral |
| UPMC      | 46 | 43 | 24.7 | 20.3 | 12.4 | 10.6 |
| U. of Chicago | 90 | 85 | 27.2 | 21.6 | 13.7 | 11.0 |

From Table I, it can be seen that, in general, the number of possible mass regions selected by the bilateral-image subtraction is less than the single-image subtraction. However, this difference is not very significant. Reducing the false-positive detection rate relies on the effective methods of feature analysis and identification in the next stage of a computer assisted detection system.

The asymmetry of left-right image pair is very useful for radiologists in diagnosis of masses in mammograms. Bilateral-image subtraction is designed to simulate this human behavior in the diagnosis of mammograms. In order to extract the asymmetric features from the images, a computer needs to align two images. Unlike a chest image, there are no significant signs which can be used as alignment targets in mammograms. Currently, only skin line and nipple position are used as alignment aids in different computer assisted detection systems. However, in some cases, which can be found in the two sample image sets, because of the image quality of a real clinical image, it is impossible to accurately locate the nipple position in a mammogram by the computer. The skin line therefore becomes the only reliable source in the alignment of a left-right image pair. The alignment accuracy will directly affect the detection accuracy of the computer assisted detection system. Breast positioning and compression will also affect the results.

In comparison with the single-image segmentation, there are two major reasons for missing true-positive mass regions using bilateral-image subtraction. In a clinical environment, the size, viewing direction, compression, and skin condition of left-right breasts recorded in two mammograms are often quite different. Unfortunately, unlike human eyes, a computer often cannot compensate for the wide range of the differences or distortions in the left-right mammograms. The inaccurate alignment of the skin boundary and inaccurate normalization of digital intensity in the left-right image pair causes the loss of selecting true-positive mass regions in the first segmentation stage of the computer assisted detection system.

Five true-positive regions are missed in the image set from the University of Chicago and three are missed in the UPMC image set. Among these eight missing cases, five of them appear close to the skin line. They were missed because the shape and retraction of skin line in the left-right images is quite different. In such a situation, a small mass which is close to the skin line is very difficult to be identified as a possible mass region in bilateral-image subtraction. The true-positive mass regions in another three cases, one in the image set from the University of Chicago and two in the image set from UPMC, are lost due to the normalization of digital value. The distribution of digital values in left-right image pairs may be very different, due to the condition change in breast positioning and compression of left-right image pair. Normalization of digital values in the two images before subtraction is also an important step required in the bilateral-image subtraction. In the typical bilateral-image subtraction algorithm (shown above), both left and right images are equally divided into 12 subregions. Then, the average digital value in each subregion is calculated. Normalization is made in each corresponding pair of the subregions according to intensity distribution in these subregions. This method improves the detection sensitivity of true-positive mass regions. However, in three cases of the image sets, the dense tissue pattern in their opposite images still overlap the true-positive mass regions. These true-positive mass regions are deleted after bilateral subtraction. Thus, the computer assisted detection system fails to identify them.

Comparing the number of possible mass regions selected by these two methods, bilateral-image subtraction shows some theoretical advantages over some methods of single-image segmentation. Theoretically, bilateral-image subtraction may produce fewer suspected regions. However, because of imperfect alignment and size, and the contrast variation in the mammographic masses, bilateral-image subtraction still selects a large number of possible mass regions in the image. From Table I it can be seen that the difference of number of possible mass regions generated by the two methods is not significant. Reducing the false-positive mass detection rate cannot rely on this step in both methods.

Because of differences in human and computer vision, the approach of a computer assisted detection system to mammography may differ from the approach of the human eye in the diagnosis of mammogram. Even in the cases of left-right images are very different in the breast size, image density, and skin conditions, mammographic experts may still prefer bilateral-image comparison in their diagnosis of breast cancer. However, computer assisted detection systems often miss these cases, because their capability of compensating for distortions is limited. In comparison, skin line alignment and digital value normalization, two key processes in bilateral subtraction (and causes of loss of the subtle cases), are not required in single-image segmentation. Thus, several true-positive mass regions missed in the bilateral image subtraction can be recovered in the single-image segmentation.

Finally, the single-image segmentation method has the advantage of flexibility. In a real clinical environment, due to surgery or for other reasons, left-right image pairs may not always be available. Without restriction on left-right image pairs, computer assisted detection of mammography will be much more versatile. Therefore, a computer assisted detection system using single-image segmentation may be used to screen all types of digitized mammograms which could not be done with systems requiring two images, and thereby provides useful information to help radiologists improve diagnostic accuracy.

Results for Microcalcification Detection

The Clinical Data Set

A total of ninety (90) mammograms were used in this study. Thirty-five of them are visually demonstrated and are verified true-positive clustered microcalcifications, which were classified by an expert mammography reader as being clinically subtle. Since minimization of false-positive detections in a wide variety of mammograms is an important parameter to evaluate in this type of study, the image set also includes fifty-five (55) normal mammograms. Many of these normal mammograms were considered to be difficult controls since they demonstrated dense breast parenchyma and have very fluctuated image features. All of the mammograms were digitized using a high quality film digitizer (Lumisys, Sunnyvale, Calif.). Images were digitized at 100× 100 µm² pixel size at 12 bit depth.

From the ninety (90) digitized mammograms available in the image data base, half of the images, i.e., forty-five (45) images, were randomly selected as the subset group for system rule base setting. Of these forty-five subset group images, eighteen (18) images contain true-positive clustered microcalcifications. After setting up the detection and classification criteria, all ninety (90) images were used to evaluate the performance of the detection scheme.

Result

The computer-aided detection system includes multiple steps to detect and classify the clusters of microcalcifications. Prior to presenting the results of the whole data set, table II (below) summarizes the results after each step of the computer-aided detection system, as applied to one typical image.

TABLE II

Computerized detection and classification procedures of clustered microcalcifications. Step-by-step result of the scheme as applied to one specific image.

| CAD Algorithm | Pixel Selected | No. of Blobs | No. of Clusters |
| --- | --- | --- | --- |
| Non-linear thresholding | 18,461 | | |
| Local minimum searching | 13,585 | | |
| Blob labeling | | 7,083 | |
| Size selection | | 677 | |
| Grouping (≧ 3 blobs) | | 301 | 52 |
| Clustering analysis | | 263 | 45 |
| Topographic feature analysis | | 84 | |
| Grouping (≧ 3 blobs) | | 25 | 3 |
| Clustering analysis | | 14 | 1 |

The size of the digitized image is 1850×1250 pixels and it has one true-positive cluster. Table II clearly demonstrates that the large number of suspected pixels (18,461) are initially selected by non-linear thresholding. Using local-minimum searching, more than a quarter of the pixels (4,876) are deleted. It also helps to reduce the size of many suspected blobs. Thus, although more than seven thousand blobs are grouped by labeling, most of them (6,406) involve less than four pixels and are eliminated by size selection. The clustering routine which follows the size selection reduces the number of blobs significantly by either eliminating the isolated blobs (from 677 to 301) or deleting the clusters with a linear shape (from 301 to 263 blobs or from 52 to 45 potential clusters). The remaining blobs are classified individually by the topographic feature analysis scheme. This procedure eliminates more than two thirds of the blobs (from 263 to 84) and also changes the distribution of the remaining blobs. After this step, the majority of the remaining 84 blobs become isolated. After re-clustering, three clusters are identified and the number of blobs is reduced from 84 to 25. Finally, from the clustering feature analysis, two clusters with linear shape are removed, and only one true-positive cluster which contains 14 microcalcifications remains in this example.

In order to demonstrate the performance of the computer-aided detection system, we present two experimental results, one relates to the forty-five (45) images used to determine all the rule-based detection and classification criteria used in the computer-aided detection system, and another one involves all ninety (90) images in the database.

Figure 24:
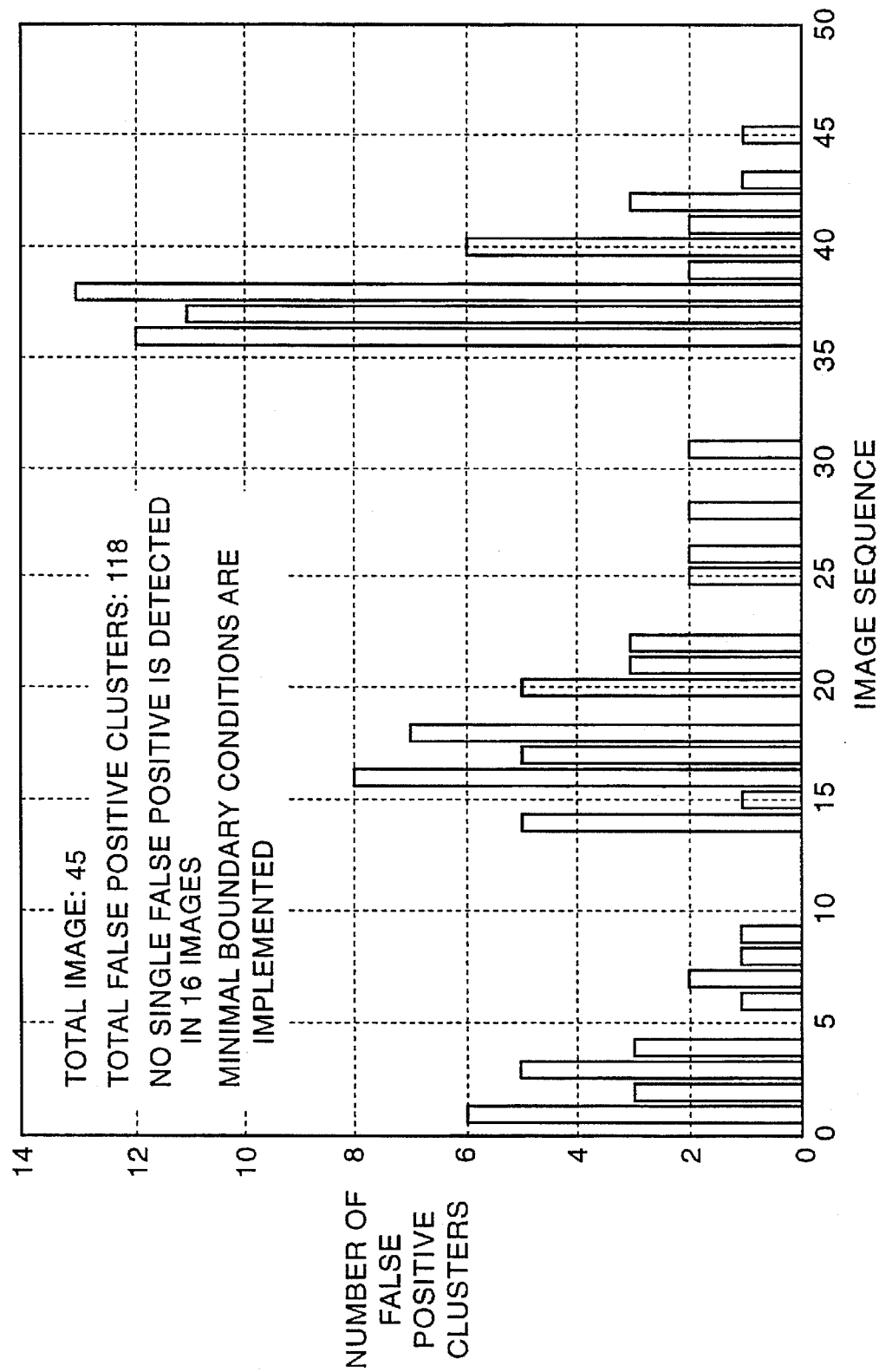
FIG. 24 shows the distribution of false-positive clusters segmented when only minimal rule-based conditions are implemented in the scheme.
Figure 25:
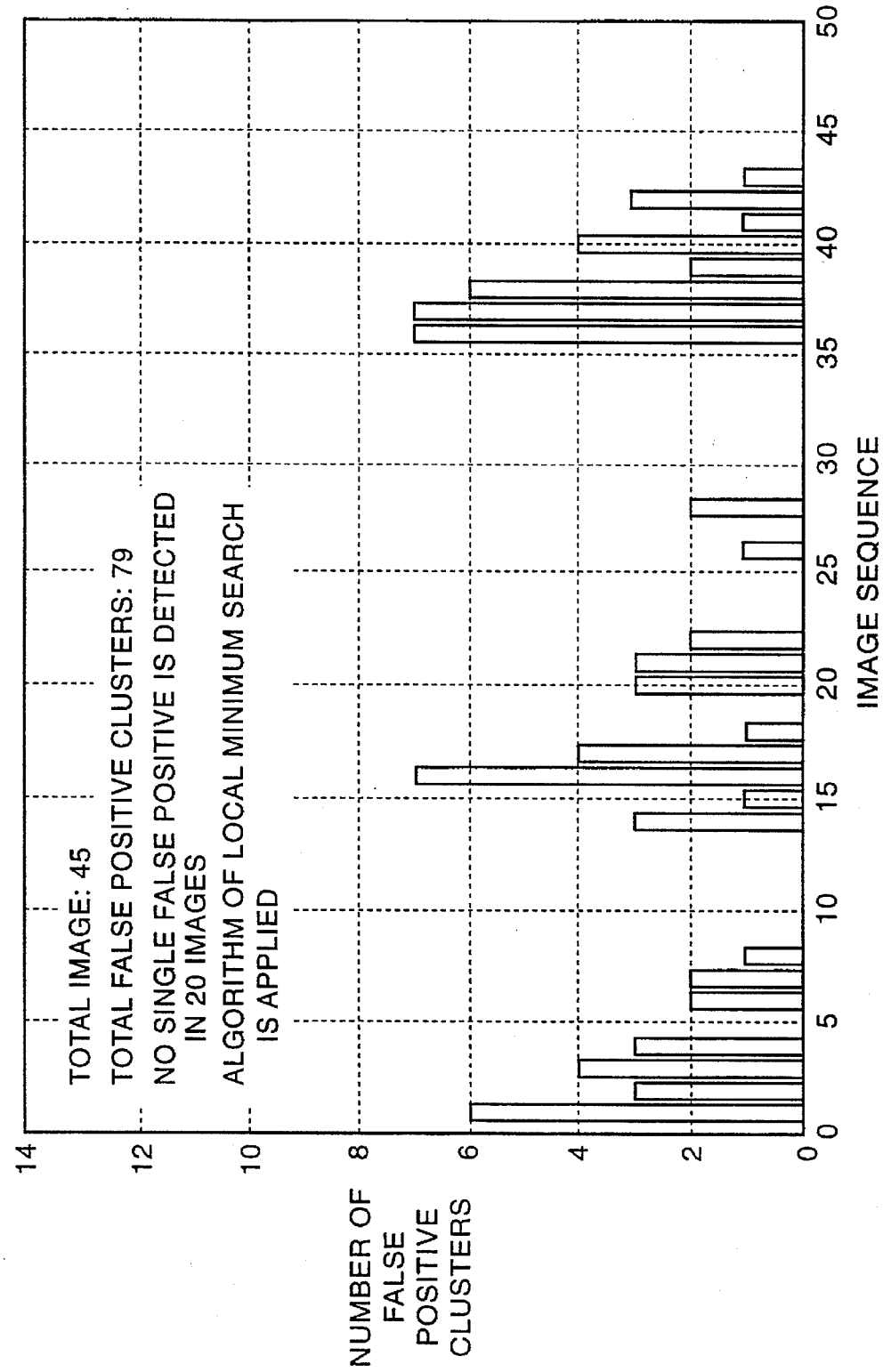
FIG. 25 shows the distribution of false-positive clusters detected by image number after the method of local minimum search is added to the scheme used in FIG. 24.
Figure 26:
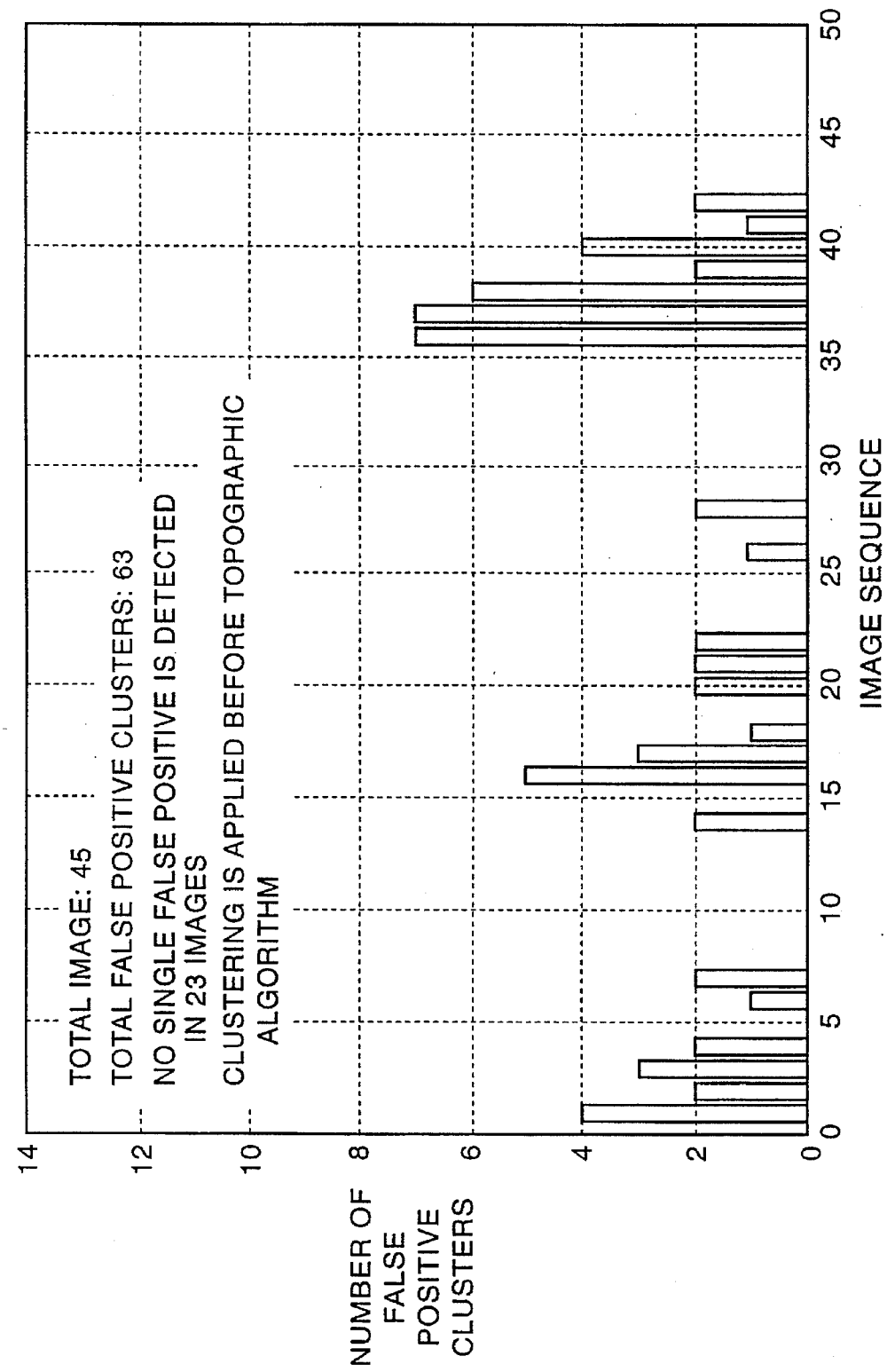
FIG. 26 shows the distribution of false-positive clusters detected after clustering analysis is employed to the results presented in FIG. 25.
Figure 27:
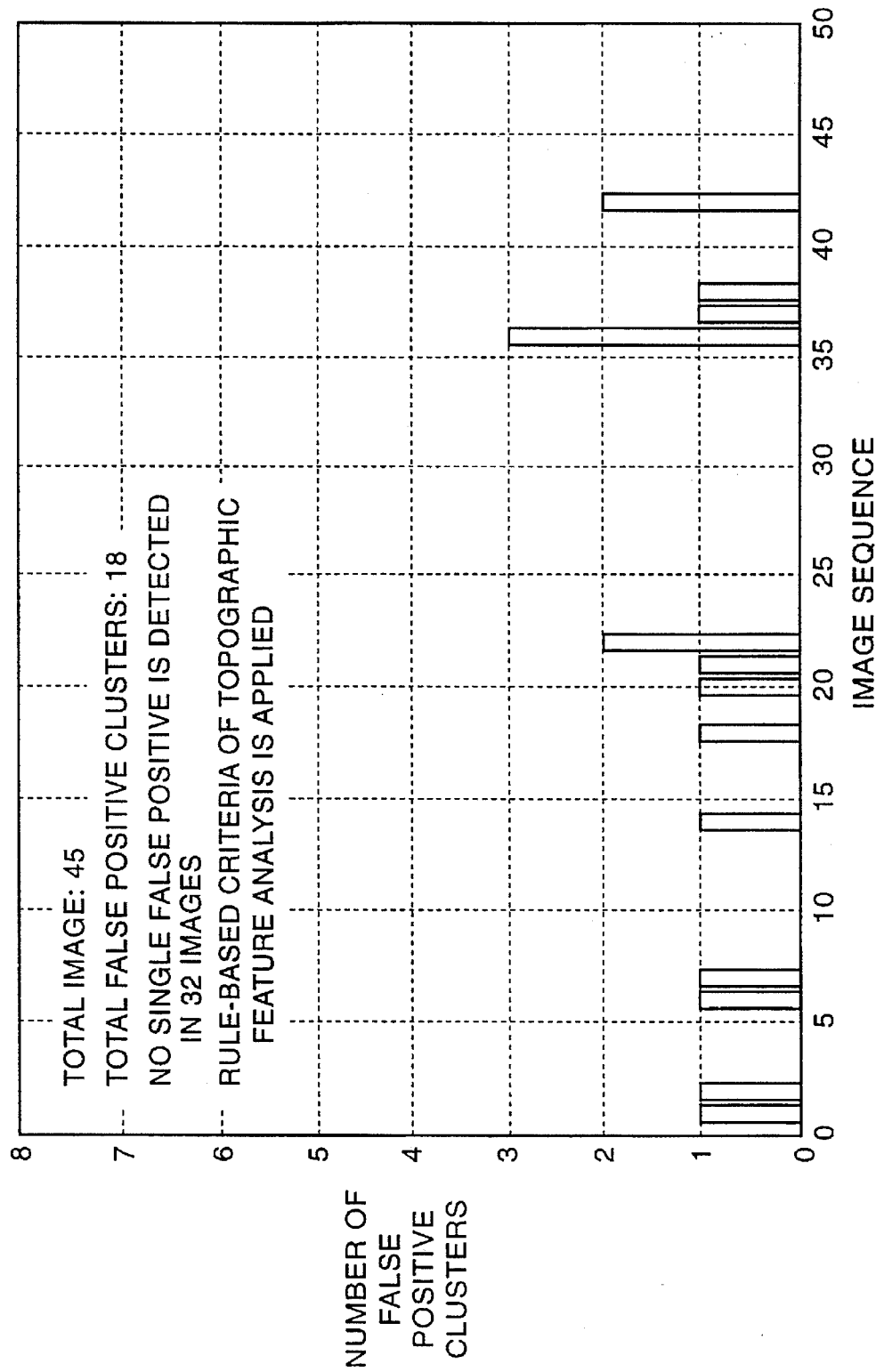
FIG. 27 shows the distribution of false-positive clusters identified after the method of topographic feature analysis is added to the scheme used in FIG. 26.
Figure 28:
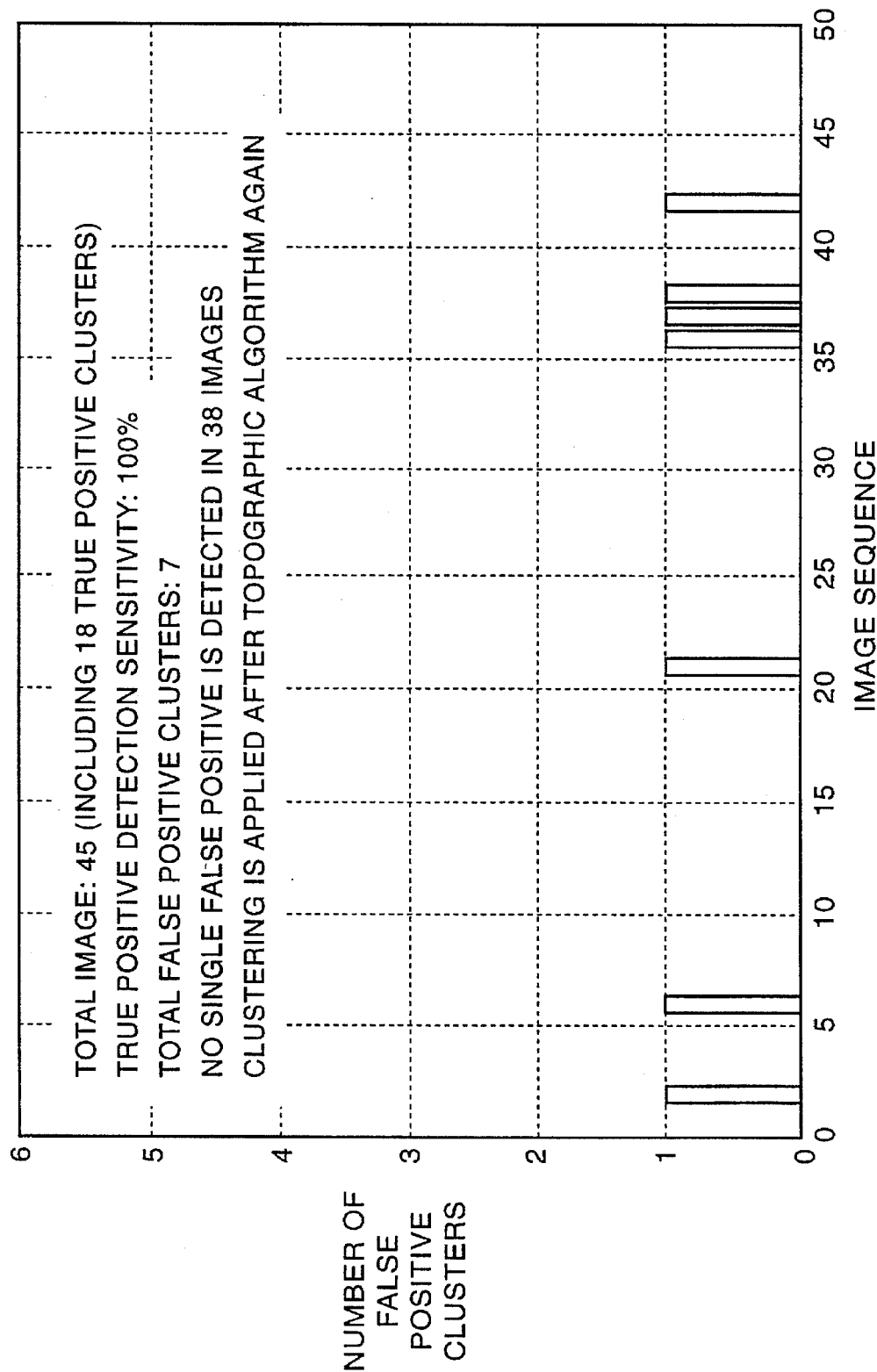
FIG. 28 shows the distribution of false-positive clusters detected after reclustering the blobs identified during the topographic analysis presented in FIG. 27.

First, to assess the impact of various processes (steps) on false-positive detection, experimental results when the image subset was processed with most boundary conditions and rules left unimplemented are presented in FIG. 24. Note that all of the true-positive clustered microcalcifications in the subset are detected (i.e., 100 percent sensitivity). However, the basic computer-aided detection system with minimal boundary conditions identifies a total of 118 false-positive clusters of microcalcifications. The false-positive cluster detection rate is 2.6 per image. FIGS. 25–28 demonstrate the contribution of different processes and boundary conditions to the reduction of the false-positive detection rate without losing any true-positive detection (i.e., sensitivity is not affected). FIG. 25 demonstrates how the local minimum search reduces the total false-positive detections to 79 or an average of 1.76 per image. FIG. 26 shows that clustering eliminates 16 false-positive detections in the image test set. The false-positive detection rate is reduced to 1.4 per image, and there is no single false-positive detection in more than half of the images. Then, the topographic growth feature analysis removes 45 additional false-positive clusters in the image test set, as shown in FIG. 27. The false-positive detection rate is decreased to 0.4 per image. Because the topographic feature analysis is used to identify every single possible microcalcification in the image, it removes all the blobs that fail to pass its criteria. Thus, after topographic analysis, the number and the distribution of the blobs in each cluster may change. In particular, this is true in the false-positive clusters. Therefore, after regrouping the blobs, clustering is re-applied in order to identify all the remaining clusters in the image. FIG. 28 demonstrates the final performance of the computer-aided detection system in the testing image set. All of the true-positive clustered microcalcifications are detected (i.e., 100% sensitivity) together with 8 false-positive clusters which are identified in a total of 45 images.

Figure 29:
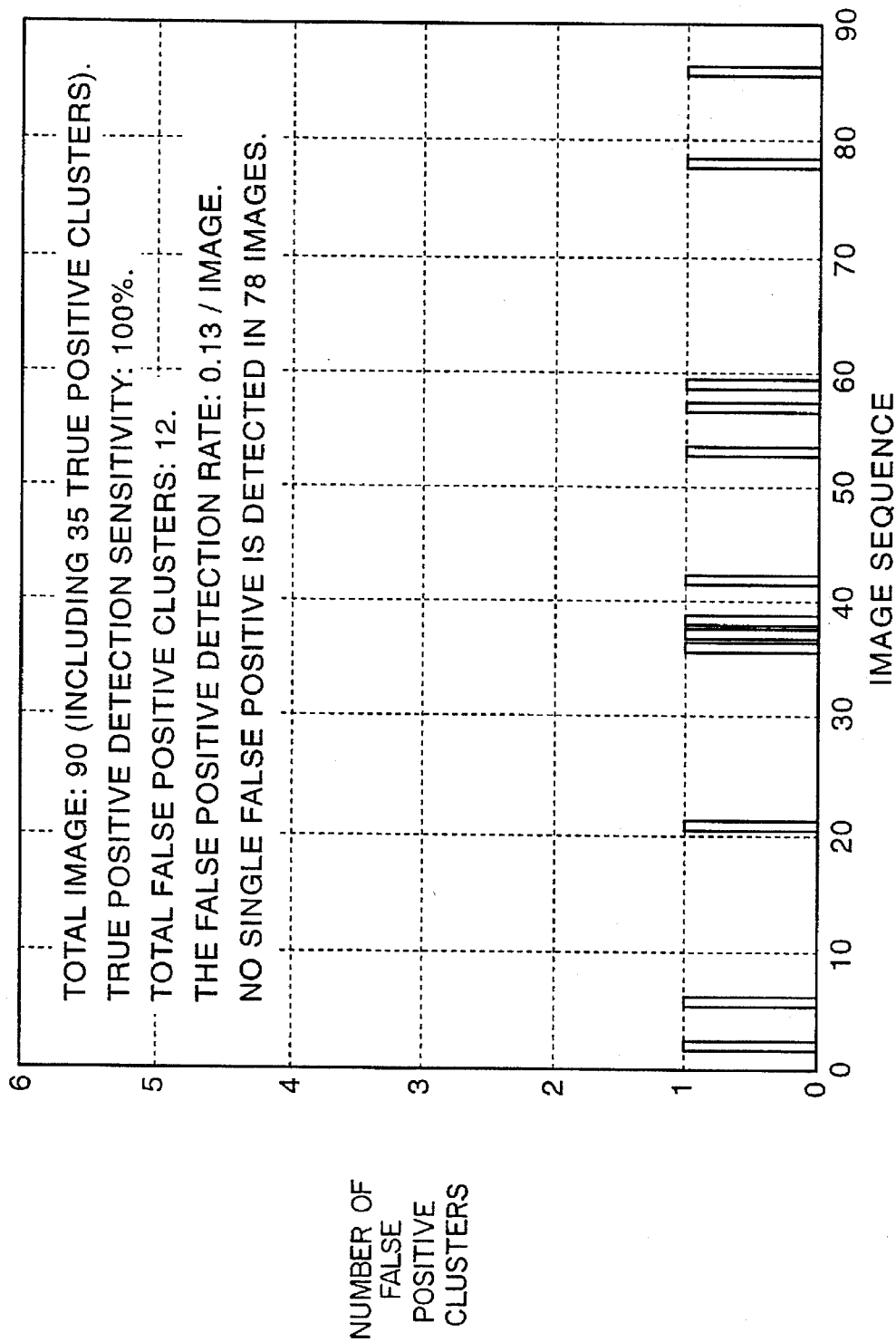
FIG. 29 shows the final distribution of false-positive clusters detected in the complete image set (90 images) using the computer-aided detection system.

Finally, all the images in the data base are used to test this computer-aided detection system. The results show that the procedure classifies forty-seven (47) positive clusters of microcalcifications in ninety (90) digitized mammograms. Among them, thirty-five (35) are true-positive clusters of microcalcifications and twelve (12) are false-positive classifications. The distribution of false-positive detections in the image set is summarized in FIG. 29. It should be noted that system performance was comparable on the subset of images which were used to establish detection and classification criteria. In the current image set, all true-positive clustered microcalcifications diagnosed by mammographers are detected by the computer-aided detection system with an average false-positive detection rate of 0.13 per image.

From the above it can be seen that topographic feature analysis is an effective tool for reducing the false-positive detection rate of microcalcifications in the computer-aided detection system. Appropriate criteria of topographic feature analysis identify and classify each blob in the image. In this study, it helped to remove most of the false-positive blobs. As a result, many remaining false-positive clusters were easily removed by re-clustering. As shown in Table II, after the local minimum search, labeling, size selection, grouping, and clustering analysis, there are still forty-five (45) clusters identified in the image including 263 blobs. The topographic feature analysis classified 179 blobs as negative and removed them from the image. Although 84 blobs remained, these were scattered throughout the image. By regrouping, the number of clusters decreased from forty-five (45) to three (3). Finally, re-clustering criteria (i.e. cluster shape) removed the remaining two false-positive clusters.

Although there are some indications that digitization at high resolution ($\leq 35$ μm) may be required for this purpose (Chan, H. P., et al., *Digitization requirements in mammography: Effects on computer-aided detection of microcalcifications*, Med Phys, 1994; 21:1203–1210), these results are in agreement with actual observer performance studies which indicate high performance when images are digitized at 100 μm/pixel (Karssemeijer N. et al., *Spatial resolution in digital mammography*, Invest. Radiol, 1993; 28:413–419) .

While the above invention has been described with respect to digital mammograms, it can also be applied to any digital radiographs of any part of the body.

While the above invention has been described with reference to particular segmentation schemes and techniques, the multi-layered topographic analysis can also be used with any other initial segmentation scheme.

While the above invention has been described with respect to a rules database, certain rules can also be programmed or hard-wired directly into the system.

While the above invention has been described with respect to a rule-based pruning scheme, the multi-layer feature vector (set) can also be used as an input parameter in a neuronet based classification scheme.

What is claimed is:

1. A method of detecting abnormal regions in living tissue depicted in a radiograph, the method comprising the steps of:
   (a) digitizing the radiograph to produce a digitized radiograph;
   (b) identifying, according to predetermined criteria, suspected abnormal regions in the radiograph; and
   (c) for each identified suspected abnormal region,
      (i) extracting multiple topographic layers of the suspected abnormal region from the digitized radiography, the multiple topographic layers being extracted from the same radiograph; and
      (ii) evaluating the extracted multiple topographic layers of the suspected abnormal region to determine whether the suspected region is an abnormal region.

2. A method as in claim 1, wherein the step of evaluating comprises the steps of:
   for each layer of the multiple topographic layers, determining features of the suspected abnormal region in the layer, and
   analyzing the determined features for different topographic layers of the multiple topographic layers.

3. A method as in claim 1, wherein the step of evaluating comprises the steps of:
   for at least two topographic layers of the extracted multiple topographic layers, determining features of the suspected abnormal region in the at least two topographic layers, and
   analyzing the determined features for different topographic layers of the at least two topographic layers.

4. A method of claim 2, wherein the different topographic layers are adjacent topographic layers.

5. A method of claim 3, wherein the different topographic layers are adjacent topographic layers.

6. A method as in claim 2, wherein the step of determining features comprises, determining at least one of a size, contrast, shape factor and digital value fluctuation of the suspected abnormal region, and wherein the step of analyzing the determined features comprises comparing ratios between the determined features of different ones of the topographic layers and evaluating changes between the determined features of different ones of the topographic layers.

7. A method as in claim 1, wherein the step of evaluating the extracted multiple topographic layers comprises the steps of:
   determining, for each region, the rate of change in elevation of the region in a plurality of directions; and
   selecting, based on said determining, whether the region includes an abnormal region.

8. A method as in claim 1, further comprising the step of generating a rule-based criteria database, and wherein the step of evaluating evaluates suspected regions based on rule-based selection criteria from the database.

9. A method as in claim 1, wherein the step of identifying comprises the steps of, in the digitized radiograph:
   detecting and enhancing skin boundaries;
   non-linear thresholding, based on digital values in the digitized radiograph;
   blob labelling and size selecting of suspected regions; and
   framing and locating suspected regions in the digitized radiograph.

10. A method as in claim 1, wherein the radiograph is an X-ray mammogram, and wherein the multiple topographic layers comprise top-view radiographic topographic layers.

11. A method as in claim 10, wherein the multiple topographic layers comprises three topographic layers.

12. A method as in claim 1, wherein the radiograph is an X-ray mammogram, and wherein the abnormal regions are masses.

13. A method as in claim 1, wherein the radiograph is an X-ray mammogram, and wherein the abnormal regions are microcalcifications.

14. A method of detecting masses in living tissue depicted in a mammogram, the method comprising the steps of:
   (a) digitizing the mammogram to produce a digitized mammogram;
   (b) identifying, as suspected regions, according to predetermined criteria, suspected masses in the radiograph; and
   (c) for each identified suspected region,
      (i) extracting multiple topographic layers of the suspected region from the digitized mammogram, the multiple topographic layers all being extracted from the same mammogram; and
      (ii) evaluating the extracted multiple topographic layers to determine whether the suspected region is a mass.

15. A method as in claim 14, wherein the multiple topographic layers comprise top-view radiographic topographic layers.

16. A method as in claim 14, wherein the step of identifying comprises one of the steps of, in the digitized mammogram,
   single-image segmentation and bilateral-image subtraction.

17. A method as in claim 14 wherein the step of identifying comprises the steps of:
obtaining first and second low-pass filtered images of the digitized mammogram;
creating a binary image from subtraction and thresholding of the first and second low-pass filtered images; and
labelling blobs and determining suspicious areas in the binary image.

18. An apparatus for detecting abnormal regions in living tissue depicted in a radiograph, comprising:
a digitizer for digitizing the radiograph to produce a digitized radiograph;
means for identifying, according to predetermined criteria, suspected abnormal regions in the radiograph;
extracting means for extracting multiple topographic layers of identified suspected abnormal region from the digitized radiograph; and
means for evaluating the extracted multiple topographic layers of a suspected abnormal region, the multiple topographic layers extracted from the same radiograph, to determine whether the identified suspected abnormal region is an abnormal region.

19. An apparatus for detecting masses in living tissue regions depicted in a mammogram, comprising:
a digitizer for digitizing the mammogram to produce a digitized mammogram;
means for identifying, as suspected abnormal regions, according to predetermined criteria, suspected masses in the radiograph;
extracting means for extracting multiple topographic layers of identified suspected abnormal regions from the digitized mammogram; and
means for evaluating the extracted multiple topographic layers, the multiple topographic layers being extracted from the same mammogram, to determine whether the suspected region depicts a mass.

20. An apparatus for locating abnormal regions in living tissue depicted in a radiograph comprising:
imaging means for obtaining a radiographic image of an anatomical area of a body;
digitizing means for digitizing the obtained radiographic image to produce a digitized radiograph;
segmenting means for segmenting into suspected regions the digitized radiograph obtained from the digitizing means; and
multi-layer topographic pruning means for pruning the suspected regions found by the segmenting means to locate the abnormal regions in the radiograph, said pruning being based on multiple topographic layers of the suspected regions, the layers all extracted from the radiograph.

21. An apparatus in claim 20, further comprising a database having rules and criteria relating to determinations made by the pruning means.

22. A method of detecting clusters of microcalcifications in living tissue depicted in a mammogram, the method comprising the steps of:
(a) digitizing the mammogram to produce a digitized mammogram;
(b) identifying, as suspected regions, according to predetermined criteria, suspected clusters of microcalcifications in the digitized mammogram; and
(c) for each identified suspected region,
(i) extracting multiple topographic layers of the suspected region from the digitized mammogram, the layers being extracted from the mammogram; and
(ii) evaluating the multiple topographic layers extracted from the same mammogram to determine whether the suspected region depicts microcalcifications.

23. A method as in claim 22, wherein the step of evaluating comprises the steps of:
for each layer of the multiple topographic layers, determining features of the region in the layer, and
analyzing determined features of the region for different topographic layers of the multiple topographic layers.

24. A method as in claim 22, wherein the step of evaluating comprises the steps of:
for at least two topographic layers of the multiple topographic layers, determining features of the region in the at least two topographic layers, and
analyzing the determined features of the region for different topographic layers of the at least two topographic layers.

25. A method of claim 24, wherein the different topographic layers are adjacent.

26. A method of claim 24, wherein the different topographic layers are adjacent.

27. A method as in claim 22, wherein the step of evaluating multiple topographic layers comprises the steps of:
determining, for each region, a rate of change in elevation of the region in a plurality of directions; and
selecting, based on said determining, whether the region depicts microcalcifications.

28. A method as in claim 22, further comprising the step of generating a rule-based criteria database, and wherein the step of evaluating evaluates suspected regions based on rule-based selection criteria from the database.

29. A method as in claim 22, wherein the step of identifying comprises the steps of:
lowpass filtering the digital mammogram using two different filters to produce two lowpass filtered images;
subtracting the two lowpass filtered images;
non-linear thresholding the subtracted image, based on digital values in the digital mammogram;
blob labelling and size selecting of suspected regions;
blob clustering and blob selecting of selected suspected regions.

30. A method as in claim 22, wherein the step of identifying comprises the steps of:
dual Gaussian filtering the digitized mammogram to produce two filtered mammograms;
subtracting the two filtered mammograms to produce a subtracted mammogram;
local minimum searching in the subtracted mammogram, and, based on the local minimum searching, blob labelling and first clustering to produce blobs and clusters;
performing cluster analysis of the clusters, and based on the analysis, deleting some clusters;
extracting topographic features;
evaluating the extracted features based on feature criteria, and based on the evaluating, deleting some blobs;
second clustering positive blobs;
determining the number of blobs in a cluster, and, based on the determining, deleting some clusters; and
highlighting positive detections on the digitized mammogram.

31. The method of claim 30, wherein the step of cluster analysis of a cluster comprises the steps of:

(b) determining a maximum length of the cluster;

(c) determining a standard deviation of every blob in the cluster to the line; and (d) based on a relationship between the determined maximum length and the determined standard deviation, removing some clusters from consideration.

32. The method of claim 31, wherein the relationship is whether the length divided by the standard deviation is less than a predetermined value.

33. The method of claim 1, wherein the topographic layers are extracted by thresholding the digital radiograph at a particular threshold value for each topographic layer.

34. The method of claim 33, wherein the threshold value for each other layer is based on the threshold and contrast values in a previous layer.

35. The method of claim 33, wherein the threshold value $T_j$ for layer j is a function of threshold value $T_{j-1}$ and contrast value $C_{j-1}$ in layer j-1 as given by:

$$T_j = T_{j-1} + 256 \times C_{j-1}.$$

36. The method of claim 14, wherein the topographic layers are extracted by thresholding the digital radiograph at a particular threshold value for each topographic layer.

37. The method of claim 36, wherein the threshold value for each other layer is based on the threshold and contrast values in a previous layer.

38. The method of claim 36, wherein the threshold value $T_j$ for layer j is a function of threshold value $T_{j-1}$ and contrast value $C_{j-1}$ in layer j-1 as given by:

$$T_j = T_{j-1} + 256 \times C_{j-1}.$$

39. The method of claim 22, wherein the topographic layers are extracted by thresholding an image formed by subtracting two lowpass filtered versions of the digital radiograph at a particular threshold value for each topographic layer.

40. The method of claim 39, wherein the threshold value for each other layer is based on a digital value of a pixel in the digitized mammogram and on a predetermined contrast value.

41. The method of claim 39, wherein the predetermined contrast value is one of 1%, 1.5%, and 2%.

42. The method of claim 33, wherein the threshold value of the first layer is a function of a digital value of a minimum point in the suspected region.

43. The method of claim 42, wherein the threshold value of the first layer is given by:

$$T_1 = I_{min} + I_{min}/10, \text{ when } I_{min} \leq 500;$$

$$T_1 = I_{min} \times 1.0246 + 37.68, \text{ when } (500 < I_{min} < 2000); \text{ and}$$

$$T_1 = I_{min} + I_{min}/23, \text{ when } I_{min} \geq 2000,$$

where $I_{min}$ is the digital value of the minimum point in the suspected region.

44. An apparatus as in claim 18, wherein the extracting means extracts layers based on a threshold value and a contrast value for a previous layer.

45. A method of detecting an abnormal region in living tissue depicted in a radiograph, the method comprising the steps of:

(a) digitizing the radiograph to produce a digitized radiograph;

(b) identifying, according to predetermined criteria, a suspected abnormal region in the radiograph;

(c) extracting multiple topographic layers of the suspected abnormal region from the digitized radiograph, all layers being extracted from the radiograph; and (d) evaluating the extracted multiple topographic layers of the suspected abnormal region to determine whether the suspected region is an abnormal region.

46. A method as in claim 45, wherein the step of evaluating comprises the steps for each layer of the multiple topographic layers, determining features of the suspected abnormal region in the layer, and analyzing the determined features for different topographic layers of the multiple topographic layers.

47. A method as in claim 45, wherein the step of evaluating comprises the steps of:

for at least two topographic layers of the extracted multiple topographic layers, determining features of the suspected abnormal region in the at least two topographic layers, and analyzing the determined features for different topographic layers of the at least two topographic layers.

48. A method of claim 46, wherein the different topographic layers are adjacent topographic layers.

49. A method of claim 47, wherein the different topographic layers are adjacent topographic layers.

50. A method as in claim 46, wherein the step of determining features comprises, determining at least one of a size, contrast, shape factor and digital value fluctuation of the suspected abnormal region, and wherein the step of analyzing the determined features comprises comparing ratios between the determined features of different ones of the topographic layers and evaluating changes between the determined features of different ones of the topographic layers.

51. A method as in claim 45, wherein the step of evaluating the extracted multiple topographic layers comprises the steps of:

determining the rate of change in elevation of the region in a plurality of directions; and selecting, based on said determining, whether the region includes an abnormal region.

52. A method as in claim 45, further comprising the step of generating a rule-based criteria database, and wherein the step of evaluating evaluates a suspected region based on rule-based selection criteria from the database.

53. A method as in claim 45, wherein the step of identifying comprises the steps of, in the digitized radiograph:

detecting and enhancing skin boundaries;

non-linear thresholding, based on digital values in the digitized radiograph;

blob labelling and size selecting of suspected regions; and framing and locating suspected regions in the digitized radiograph.

54. A method as in claim 45, wherein the radiograph is an X-ray mammogram, and wherein the multiple topographic layers comprise top-view radiographic topographic layers.

55. A method as in claim 54, wherein the multiple topographic layers comprises three topographic layers.

56. A method as in claim 45, wherein the radiograph is an X-ray mammogram, and wherein the abnormal regions are masses.

57. A method as in claim 45, wherein the radiograph is an X-ray mammogram, and wherein the abnormal regions are microcalcifications.

58. The method of claim 45, wherein the topographic layers are extracted by thresholding the digital radiograph at a particular threshold value for each topographic layer.

59. The method of claim 58, wherein the threshold value for each other layer is based on the threshold and contrast values in a previous layer.

60. The method of claim 58, wherein the threshold value $T_j$ for layer j is a function of threshold value $T_{j-1}$ and contrast value $C_{j-1}$ in layer j-1 as given by:

$$T_j = T_{j-1} + 256 \times C_{j-1}.$$

61. The method of claim 58, wherein the threshold value of the first layer is a function of a digital value of a minimum point in the suspected region.

62. The method of claim 61, wherein the threshold value of the first layer is given by:

$$T_1 = I_{min} + I_{min}/10, \text{ when } I_{min} \leq 500;$$

$$T_1 = I_{min} \times 1.0246 + 37.68, \text{ when } (500 < I_{min} < 2000); \text{ and}$$

$$T_1 = I_{min} + I_{min}/23, \text{ when } I_{min} \geq 2000,$$

where $I_{min}$ is the digital value of the minimum point in the suspected region.

63. A method of detecting a mass in living tissue depicted in a mammogram, the method comprising the steps of:
   (a) digitizing the mammogram to produce a digitized mammogram;
   (b) identifying, as a suspected region, according to predetermined criteria, a suspected mass in the mammogram;
   (c) extracting multiple topographic layers of the suspected region from the digitized mammogram, wherein all layers are extracted from the same mammogram; and
   (d) evaluating the extracted multiple topographic layers to determine whether the suspected region is a mass.

64. A method as in claim 63, wherein the multiple topographic layers comprise top-view radiographic topographic layers.

65. A method as in claim 63, wherein the step of identifying comprises one of the steps of, in the digitized mammogram,
   single-image segmentation and
   bilateral-image subtraction.

66. A method as in claim 63, wherein the step of identifying comprises the steps
   obtaining first and second low-pass filtered images of the digitized mammogram;
   creating a binary image from subtraction and thresholding of the first and second low-pass filtered images; and
   labelling a blob and determining a suspicious area in the binary image.

67. The method of claim 63, wherein the topographic layers are extracted by thresholding the digital radiograph at a particular threshold value for each topographic layer.

68. The method of claim 67, wherein the threshold value for each other layer is based on the threshold and contrast values in a previous layer.

69. The method of claim 67, wherein the threshold value $T_j$ for layer j is a function of threshold value $T_{j-1}$ and contrast value $C_{j-1}$ in layer j-1 as given by:

$$T_j = T_{j-1} + 256 \times C_{j-1}.$$

70. An apparatus for detecting an abnormal region in living tissue depicted in a radiograph, the apparatus comprising:
   a digitizer for digitizing the radiograph to produce a digitized radiograph;
   means for identifying, according to predetermined criteria, a suspected abnormal region in the radiograph;
   means for extracting multiple topographic layers of the identified suspected abnormal region from the digitized radiograph, all layers being extracted from the same radiograph; and
   means for evaluating the multiple topographic layers extracted from the same radiograph to determine whether the identified suspected abnormal region is an abnormal region.

71. An apparatus as in claim 70, wherein the extracting means extracts layers based on a threshold value and a contrast value for a previous layer.

72. An apparatus for detecting a mass in living tissue regions depicted in a mammogram, the apparatus comprising:
   a digitizer for digitizing the mammogram to produce a digitized mammogram;
   means for identifying, as a suspected abnormal region, according to predetermined criteria, a suspected mass in the mammogram;
   means for extracting multiple topographic layers of the identified suspected abnormal region from the digitized mammogram, all layers being extracted from the same mammogram; and
   means for evaluating the multiple topographic layers extracted from the same mammogram to determine whether the suspected region depicts a mass.

73. A method of detecting a cluster of microcalcifications in living tissue depicted in a mammogram, the method comprising the steps of:
   (a) digitizing the mammogram to produce a digitized mammogram;
   (b) identifying, as a suspected region, according to predetermined criteria, a suspected cluster of microcalcifications in the digitized mammogram;
   (c) extracting multiple topographic layers of the suspected region from the digitized mammogram, wherein all layers are extracted from the same mammogram; and
   (d) evaluating the extracted multiple topographic layers to determine whether the suspected region depicts a cluster of microcalcifications.

74. A method as in claim 73, wherein the step of evaluating comprises the steps of:
   for each layer of the multiple topographic layers, determining features of the region in the layer, and
   analyzing determined features of the region for different topographic layers of the multiple topographic layers.

75. A method as in claim 73, wherein the step of evaluating comprises the steps of:
   for at least two topographic layers of the multiple topographic layers, determining features of the region in the at least two topographic layers, and
   analyzing the determined features of the region for different topographic layers of the at least two topographic layers.

76. A method of claim 75, wherein the different topographic layers are adjacent.

77. A method of claim 75, wherein the different topographic layers are adjacent.

78. A method as in claim 73, wherein the step of evaluating multiple topographic layers comprises the steps of:

determining, for each region, a rate of change in elevation of the region in a plurality of directions; and selecting, based on said determining, whether the region depicts a cluster of microcalcifications.

79. A method as in claim 73, further comprising the step of generating a rule-based criteria database, and wherein the step of evaluating evaluates a suspected region based on rule-based selection criteria from the database.

80. A method as in claim 73, wherein the step of identifying comprises the steps of:

lowpass filtering the digital mammogram using two different filters to produce two, lowpass filtered images;

subtracting the two lowpass filtered images;

non-linear thresholding the subtracted image, based on digital values in the digital mammogram;

blob labelling and size selecting of a suspected regions;

blob clustering and blob selecting of selected suspected regions.

81. The method of claim 73, wherein the topographic layers are extracted by thresholding an image formed by subtracting two lowpass filtered versions of the digital radiograph at a particular threshold value for each topographic layer.

82. The method of claim 81, wherein the threshold value for each other layer is based on a digital value of a pixel in the digitized mammogram and on a predetermined contrast value.

83. The method of claim 81, wherein the predetermined contrast value is one of 1%, 1.5%, and 2%.

* * * * *